US008156222B2

(12) United States Patent
Gingell, Jr. et al.

(10) Patent No.: US 8,156,222 B2
(45) Date of Patent: *Apr. 10, 2012

(54) AUTONOMIC CONTROL OF A DISTRIBUTED COMPUTING SYSTEM USING FINITE STATE MACHINES

(75) Inventors: Robert A. Gingell, Jr., Sunnyvale, CA (US); James D. Engquist, Colorado Springs, CO (US); David A. Henseler, Maplewood, MN (US); Jerry R. Jackson, Colorado Springs, CO (US); Michael John Lamb, Rosemount, MN (US); Sanjay Radia, Fremont, CA (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/031,533

(22) Filed: Feb. 21, 2011

(65) Prior Publication Data
US 2011/0145404 A1    Jun. 16, 2011

Related U.S. Application Data

(63) Continuation of application No. 11/823,174, filed on Jun. 27, 2007, now Pat. No. 7,895,317.

(51) Int. Cl.
*G06F 15/16* (2006.01)
*G06F 15/173* (2006.01)
(52) U.S. Cl. ........ 709/224; 709/223; 709/225; 709/227; 709/229
(58) Field of Classification Search .................. 709/200, 709/223, 224, 226; 705/37; 717/103
See application file for complete search history.

(56) References Cited

U.S. PATENT DOCUMENTS

| 6,775,829 | B1 | | 8/2004 | Kroening | |
| 6,865,737 | B1 | | 3/2005 | Lucas et al. | |
| 7,058,704 | B1 | * | 6/2006 | Mangipudi et al. | 709/223 |
| 7,284,054 | B2 | * | 10/2007 | Radhakrishnan | 709/226 |
| 7,292,957 | B1 | * | 11/2007 | Schell | 709/223 |

(Continued)

FOREIGN PATENT DOCUMENTS
WO    WO/03/085526    10/2003
(Continued)

OTHER PUBLICATIONS

Notification of Transmittal of the International Search Report and the Written Opinion of the International Searching Authority for PCT patent appln. No. PCT/US08/007298, mailed Dec. 18, 2008 (14 pgs).

(Continued)

*Primary Examiner* — Quang N. Nguyen
(74) *Attorney, Agent, or Firm* — Baker Botts L.L.P.

(57) ABSTRACT

In general, this disclosure describes techniques of managing resources in a service-oriented distributed computing system. As described in this disclosure, one or more control nodes provide for the efficient and automated allocation and management of resources within the distributed computing system. In order to provide automated allocation and management of computing functions and resources, a control node uses a set of governors. This set of governors includes a set of service governors to govern services used in the distributed computing system. The set of governors also includes a set of resource governors that govern individual resources of the services in the distributed computing system. The service governors and the resource governors may be implemented using finite state machines.

47 Claims, 18 Drawing Sheets

U.S. PATENT DOCUMENTS

| | | | |
|---|---|---|---|
| 7,350,186 B2 * | 3/2008 | Coleman et al. | 717/103 |
| 7,610,233 B1 * | 10/2009 | Leong et al. | 705/37 |
| 7,660,887 B2 * | 2/2010 | Reedy et al. | 709/224 |
| 2002/0156877 A1 | 10/2002 | Lu et al. | |
| 2002/0194251 A1 * | 12/2002 | Richter et al. | 709/105 |
| 2003/0046396 A1 * | 3/2003 | Richter et al. | 709/226 |
| 2003/0177176 A1 | 9/2003 | Hirschfeld et al. | |
| 2004/0030777 A1 * | 2/2004 | Reedy et al. | 709/224 |
| 2004/0088694 A1 | 5/2004 | Ho | |
| 2004/0181794 A1 | 9/2004 | Coleman | |
| 2004/0187104 A1 | 9/2004 | Sardesai et al. | |
| 2004/0205101 A1 * | 10/2004 | Radhakrishnan | 709/200 |
| 2004/0260734 A1 | 12/2004 | Ren et al. | |
| 2005/0005200 A1 | 1/2005 | Matena et al. | |
| 2005/0114439 A1 | 5/2005 | Hodges et al. | |
| 2005/0114860 A1 | 5/2005 | Lin et al. | |
| 2005/0165921 A1 | 7/2005 | Abadir et al. | |
| 2005/0165925 A1 | 7/2005 | Dan et al. | |
| 2005/0193265 A1 | 9/2005 | Lin et al. | |
| 2006/0173895 A1 | 8/2006 | Engquist et al. | |
| 2006/0173993 A1 | 8/2006 | Henseler et al. | |
| 2006/0174238 A1 | 8/2006 | Henseler et al. | |
| 2006/0200494 A1 | 9/2006 | Sparks | |

FOREIGN PATENT DOCUMENTS

| | | |
|---|---|---|
| WO | WO/2006/081503 | 8/2006 |
| WO | WO/2006/106142 | 10/2006 |
| WO | WO/2007/064799 | 6/2007 |

OTHER PUBLICATIONS

PCT International Search Report and PCT Written Opinion from PCT appln. No. PCT/US06/045938, mailed Mar. 30, 2007 (13 pgs.).

U.S. Appl. No. 11/607,820, filed Dec. 1, 2006 entitled "Automated Deployment and Configuration of Applications in an Autonomically Controlled Distributed Computing System", Gingell et al.

Office Action dated Jul. 15, 2009 for U.S. Appl. No. 11/823,356 (34 pgs).

Notification of Transmittal of the International Search Report and the written Opinion of the Internatonal Searching Authority for corresponding PCT appln No. PCT/US08/007264 mailed Oct. 24, 2008 (12 pgs).

*Preinstalling Microsoft Windows XP by Using the OEM Preinstallation Kit, Part 1*, xp-002301441, Apr. 4, 2003, 24 pgs, 2003.

U.S. Appl. No. 11/823,356, filed Jun. 27, 2007 entitled "Autonomic Control of a Distributed Computing System Using Dynamically Assembled Resource Chains", Gingell et al.

Designing Web Services with the J2EE™ 1.4 Platform; 8.5 Managing Complex Web Service Interactions, 7 pgs, 2004.

USPTO Office Action, U.S. Appl. No. 11/823,356, filed Jun. 27, 2007, Inventor Robert A. Gingell, Jr.. 35 pgs USPTO Advisory Action, U.S. Appl. No. 11/823,356, filed Jun. 27, 2007, Inventor Robert A. Gingell, Jr.. 3 pgs, May 24, 2010.

* cited by examiner

AUTONOMIC CONTROL OF A DISTRIBUTED COMPUTING SYSTEM USING FINITE STATE MACHINES

CROSS-REFERENCE TO RELATED APPLICATION

This application is a continuation of U.S. application Ser. No. 11/823,174 filed Jun. 27, 2007 and titled "Autonomic Control of a Distributed Computing System Using Finite State Machines", now issued as U.S. Pat. No. 7,895,317.

TECHNICAL FIELD OF THE INVENTION

The invention relates to computing environments and, more specifically, to distributed computing systems.

BACKGROUND OF THE INVENTION

Distributed computing systems are increasingly being utilized to support business as well as technical applications. Typically, distributed computing systems are constructed from a collection of computing nodes that combine to provide a set of processing services to implement the distributed computing applications. Each of the computing nodes in the distributed computing system is typically a separate, independent computing device interconnected with each of the other computing nodes via a communications medium, e.g., a network.

One challenge with distributed computing systems is the organization, deployment and administration of such a system within an enterprise environment. For example, it is often difficult to manage the allocation and deployment of enterprise computing functions within the distributed computing system. An enterprise, for example, often includes several business groups, and each group may have competing and variable computing requirements.

SUMMARY OF THE INVENTION

In general, this disclosure describes techniques of managing resources in a service-oriented distributed computing system. As described in this disclosure, one or more control nodes provide for the efficient and automated allocation and management of resources within the distributed computing system. In order to provide automated allocation and management of computing functions and resources, a control node uses a set of governors. This set of governors includes a set of service governors to govern services used in the distributed computing system. The set of governors also includes a set of resource governors that govern individual resources of the services in the distributed computing system. The service governors and the resource governors may be implemented using finite state machines.

In one embodiment, a distributed computing system comprises a first set of resources. Resources in the first set of resources are capable of providing a flux service. A service is a defined set of functionality. The distributed computing system also provides a second set of resources. Resources in the second set of resources are capable of providing interpreting services. In addition, the distributed computing system comprises a control node that autonomically controls the distributed computing system. The control node comprises a first set of resource governors, each of which implement a finite state machine that governs a process by which an individual one of the resources in the first set of resources starts providing or stops providing the flux service. The control node also comprises a first service governor. The first service governor implements a finite state machine that controls whether resource governors in the first set of resource governors initiate the processes by which resources in the first set of resources start providing or stop providing the flux service. The control node also comprises a service-level agreement (SLA) governor that receives monitoring data that indicate a current service level of the flux service provided by the distributed computing system and causes the first service governor to enhance the service level of the flux service when the current service level of the flux service does not satisfy a service-level agreement.

In another embodiment, a method comprises receiving, with a control node of the distributed computing system, input that defines a service-level agreement. The method also comprises receiving status data from resources that provide services in the distributed computing system, wherein a service is a defined set of functionality. In addition, the method comprises using the status data to determine whether a current service level of a flux service provided by the distributed computing system satisfies the service-level agreement. Furthermore, the method comprises initiating, when a finite state machine of first service governor is in a first state and when the current service level of a flux service does not satisfy the service-level agreement, a process of a first resource governor by which a first resource in a first set of resources starts providing the flux service. Each resource in the first set of resource is capable of providing the flux service. The method also comprises controlling, with a finite state machine of the first resource governor, the process by which a first resource in the first set of resources starts providing the flux service.

In another embodiment, a computer-readable medium comprises instructions. The instructions cause a programmable processor to receive, with a control node of the distributed computing system, input that defines a service-level agreement. The instructions also cause the processor to receive status data from resources in the distributed computing system. In addition, the instructions cause the processor to use the status data to determine whether a current service level of the flux service satisfies the service-level agreement. Furthermore, the instructions cause the processor to initiate, when a finite state machine of first service governor is in a first state and when the current service level of a flux service does not satisfy the service-level agreement and when a current state of a finite state machine of the first service governor allow such initiation, a process of a first resource governor by which a first resource in a first set of resources starts providing the flux service, wherein each resource in the first set of resource is capable of providing the flux service. The instructions also cause the processors to control, with a finite state machine of the first resource governor, the process by which a first resource in the first set of resources starts providing the flux service.

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Figure 1:
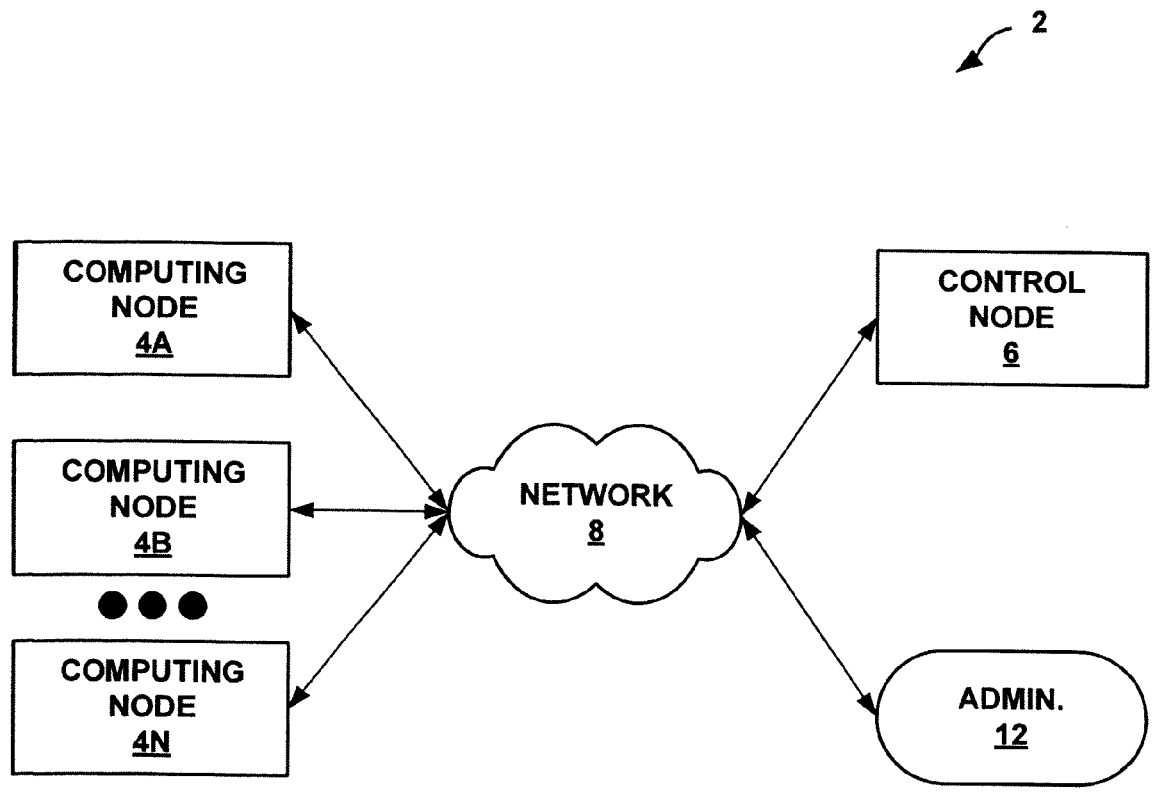
FIG. 1 is a block diagram illustrating an exemplary distributed computing system.

FIG. 1 is a block diagram illustrating an exemplary distributed computing system 2. As illustrated in the example of FIG. 1, distributed computing system 2 includes a communications network 8 that facilitates communication among a control node 6 and set of computing nodes 4A through 4N (collectively, "computing nodes 4"). Network 8 may comprise, for example, direct connections between one or more of computing nodes 4, one or more customer networks maintained by an enterprise, one or more local-area networks (LANs), one or more wide-area networks (WANs) or a combination thereof. For example, network 8 may comprise a local-area Ethernet network or a wide-area network such as the Internet. Although not illustrated in the example of FIG. 1, network 8 may include a number of switches, routers, firewalls, load balancers, and the like.

Computing nodes 4 may operate in cooperation with each other to provide distributed processing services. The number of computing nodes 4 within distributed computing system 2 may be dependent on the processing requirements of distributed computing system 2. For example, distributed computing system 2 may include 8 to 512 computing nodes or more. Each of computing nodes 4 may be a physical computing device that includes one or more programmable processors that are capable of executing software instructions stored on one or more computer-readable media. For example, computing nodes 4 may be personal computers, mainframe computers, supercomputers, servers, server blades, or other types of physical computing devices.

Control node 6 controls computing nodes 4 in distributed computing system 2. For example, control node 6 may control which software resources operate on each of computing nodes 4. Although not shown in the example of FIG. 1, distributed computing system 2 may include one or more optional control nodes in addition to control node 6. These additional control nodes may assist control node 6 with the management functions. Moreover, such additional control nodes provide primary and backup administration functions, thereby allowing for graceful failover in the event that control node 6 fails.

Control node 6 may automatically discover computing nodes 4. For example, control node 6 may monitor Dynamic Host Configuration Protocol (DHCP) leases to discover the connection of a computing node to network 8. Once detected, control node 6 may automatically inventory the attributes for the discovered computing node. The node attributes identified during the inventory process may include a CPU count, a CPU speed, an amount of memory (e.g., random access memory), local disk characteristics or other computing resources. Control node 6 may also receive input identifying node attributes not detectable via the automatic inventory, such as whether the node includes I/O, such as Host Bus Adapter (HBA). Further details with respect to the automated discovery and inventory processes are described in U.S. patent application Ser. No. 11/070,851, entitled "AUTOMATED DISCOVERY AND INVENTORY OF NODES WITHIN AN AUTONOMIC DISTRIBUTED COMPUTING SYSTEM," filed Mar. 2, 2005, the entire content of which is hereby incorporated by reference.

An administrator 12 may access administration software executing on control node 6 to configure distributed computing system 2 to provide one or more services. As used in this disclosure, the term "service" refers to a set of functionality provided by a "resource." As used herein, a "resource" is something that provides a set of functionality. A "resource" may be a hardware unit, a software unit, a collection of one or more hardware units, a collection of one or more software units, or a collection of one or more hardware units and one or more software units. For example, an individual one of computing nodes 4 is a "resource" that provides the capacity to execute instructions in an x86 instruction set. In this example, a service S may be defined as the capacity to execute instructions in an x86 instruction set. Therefore, the individual computing node provides service S. In another example, distributed computing system 2 may be a "resource" that provides e-commerce applications. In this example, a service T may be defined as these e-commerce applications. Hence, distributed computing system 2 may provide service T.

In order to configure distributed computing system 2 to provide a service, administrator 12 may access the administration software on control node 6 to input a service definition that defines the service. A service definition may specify a set of "export facilities" and may specify a set of "import facilities." As used in this disclosure, an "export facility" of a service is a type of functionality provided by resources associated with the service. Furthermore, an "import facility" of a service is a type of functionality provided by another service that resources associated with the service require in order to operate. As used herein, a resource "is associated with" a service when the resource conforms to the service definition of the service. For example, a service definition of service S may specify an export facility of executing x86 assembly language instructions and may specify no import facilities. In this example, a computing node that implements an x86 architecture provides (i.e., exports) the functionality to execute instructions in the x86 instruction set and does not require any import facilities may be associated with service S. Continuing this example, an x86 emulator software application may provide the same set of export facilities as a computing node that implements the x86 architecture. However, the x86 emulator software application may utilize (i.e., import) a facility that provides a PowerPC architecture.

After administrator 12 installs one or more services for use in distributed computing system 2 and configures one or more resources associated with these services, administrator 12 may configure control node 6 to use the resources to bring distributed computing system 2 into compliance with one or more service-level agreements. A service-level agreement describes an expected level of service for a service provided by distributed computing system 2. For example, a service-level agreement may specify a level of performance of a top-level service that distributed computing system 2 is expected to provide. A top-level service may be a service that provides functionality to a user of distributed computing system 2. In this disclosure, a top-level service may also be referred to as a "flux service." In contrast, a service that provides functionality to another service within distributed computing system 2 may be referred to as an "interpretation service." For example, an information technology (IT) department of a large corporation may operate distributed computing system 2 on behalf of the corporation. An e-commerce division of the corporation may make a service-level agreement with the IT department that distributed computing system 2 will provide the functionality of an e-commerce web site to the public. Furthermore, the service-level agreement may specify that the web site should respond to a request for a credit card transaction in no more than five seconds. In this example, the functionality of the e-commerce website may be a top-level service. Services, such as database access services, operating system services, and other types of services, that enable the e-commerce website service to operate may be interpretation services.

Distributed computing system 2 may utilize one or more resource chains in order to provide a top-level service. A "resource chain" is a set of one or more resources that are ordered according to the relation "a first resource provides a service to a second resource." The resources in a resource chain may work together to provide a service. For example, a service definition of a top-level service may specify that the first service exports web server functionality and may specify that the top-level service imports Windows operating system functionality. A service definition of a second service may specify that the second service exports Windows operating system functionality and may specify that the second service imports x86 assembly language execution functionality. A service definition of a third service may specify that the third service exports x86 assembly language execution functionality and does not specify any imports. In this example, distributed computing system 2 may utilize a resource chain in order to provide web server functionality. This resource chain may include a first resource that is associated with the top-level service (web serving), a second resource that is associated with the second service (operating system), and a third resource that is associated with the third service (instruction execution). The first resource, the second resource, and the third resource may work together to provide the web serving functionality of the top-level service.

Control node 6 may dynamically assemble or disassemble resource chains in order to bring the service levels at which distributed computing system 2 provides services into compliance with one or more service-level agreements. To assemble a resource chain that provides a top-level service, control node 6 may identify one or more "service chains." A "service chain" is a set of one or more services that are ordered by the relation "resources associated with a first service provide a service to resources associated with a second service." As described in detail below, control node 6 may then, for each service in the identified service chain, identify a resource associated with the service. Control node 6 may then assemble the identified resources into a resource chain. When control node 6 assembles the identified resources to a resource chain, control node 6 may cause each of the identified resources to start operating with the other resources in the resource chain. When each of the resources in the resource chain is operating, the resource chain provides the top-level service.

Control node 6 may use status data from resources in distributed computing system 2 to determine whether distributed computing system 2 is currently providing services at levels required by the service-level agreements. For example, control node 6 may receive status data from a resource associated with a first service (i.e., x86 computing node), a resource associated with a second service (i.e., Windows operating system), and a resource of a third service (i.e., web server application). The status data from the x86 computing node may indicate that the temperature of the processor of the x86 is 35 degrees Celsius. The status data from the operating system may indicate that the operating system is making extensive use of virtual memory. The status data from the web server application may indicate that the web server application has received ten thousand requests in the last ten minutes. Based on the status data from these three resources, control node 6 may determine that distributed computing system 2 is not capable of responding to a request for a credit card transaction within five seconds, as required by the service-level agreement. In this situation, control node 6 may dynamically assemble one or more resource chains that enhance the ability of distributed computing system 2 to handle requests for credit card transactions. As a result, distributed computing system 2 may return to compliance with the service-level agreement. Alternatively, control node 6 may determine, based on the status data, that distributed computing system 2 has more than sufficient capacity to respond to requests for credit card transactions within five seconds. In this situation, control node 6 may automatically identify one or more of the resource chains that provide the credit card transaction service and disassemble one or more of the resource chains. In this way, the resources in the disassembled resource chains may be available for subsequent use in other resource chains.

Potential advantages of this approach may include the flexibility in being able to install and configure software services dynamically rather than rely on fixed sets of software services. In addition, the advantages may include being able to choose a different computer on which to execute a software resource based on various factors at the time the software resource is to be executed. Further, this approach may reduce the number of preconfigured combinations of software services that control node 6 manages.

Figure 2:
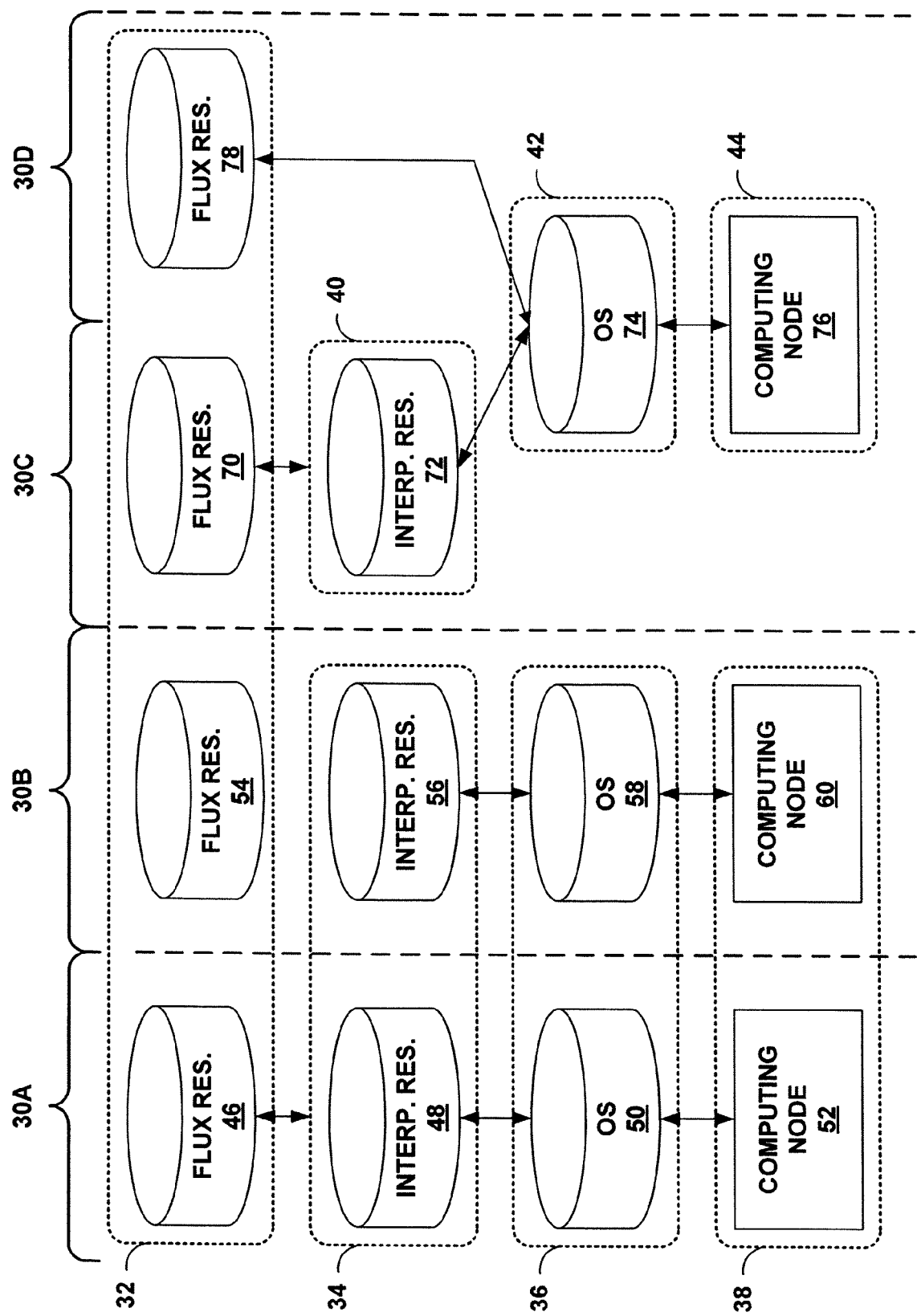
FIG. 2 is a block diagram illustrating a set of example resource chains.

FIG. 2 is a block diagram illustrating a set of example resource chains 30A through 30D. This disclosure refers collectively to resource chains 30A through 30N as "resource chains 30."

When control node 6 determines that a level of service provided by distributed computing system 2 does not comply with a service-level agreement because distributed computing system 2 does not have sufficient capacity to provide a top-level service 32 associated with the service-level agreement, control node 6 may need to enhance the capacity of distributed computing system 2 to provide top-level service 32. In order to enhance the capacity of distributed computing system 2 to provide top-level service 32, control node 6 may dynamically assemble resource chains 30.

In order to assemble resource chains 30, control node 6 may first identify one or more service chains whose associated resources may work together to provide top-level service 32. As illustrated in the example of FIG. 2, services are illustrated as dotted rectangles. In this example, control node 6 may identify three different service chains. A first one of these service chains includes top-level service 32, a first interpretation service 34, an operating system service 36, and a first type of computing node service 38. A second one of these service chains includes top-level service 32, a second interpretation service 40, a second type of operating system service 42, and a second type of computing node service 44. A third one of these service chains includes top-level service 32, operating system service 42, and computing node service 44. In this example, top-level service 32 may be a Java-based payroll application, interpretation service 34 may be an Java application server service, operating system service 36 may be a Linux operating system, computing node service 38 may be a type of computing node based on an x86 architecture, interpretation service 40 may be an application server service, operating system service 42 may be a Macintosh operating system, and computing node service 44 may be a type of computing node based on a PowerPC architecture.

After identifying the service chains, control node 6 may identify one or more resource chains for each of the identified service chains. No resource chain may include more than one resource of one service. As illustrated in the example of FIG. 2, control node 6 may identify resource chains 30A through 30D for the identified resource chains. For example, resource chain 30A includes a resource 46 that is associated with top-level service 32, a resource 48 that is associated with interpretation service 34, a resource 50 that is associated with operating system service 36, and a computing node resource 52 that is associated with computing node service 38.

Resources in resource chains 30 may provide services required by higher-level resources in the resource chains. In other words, each resource in a resource chain, other than a hardware resource, operates within an operating environment provided by a lower-level resource in the resource chain. For example, resource 46 of top-level service 32 may operate within an operating environment provided by resource 48 of interpretation service 34. Furthermore, resource 48 of interpretation service 34 may operate within an operating environment provided by resource 50 of operating system service 36. Resource 50 of operating system service 36 may operate within an operating environment provided by resource 52 of computing node service 38.

Multiple resources may operate within a single operating environment provided by a resource. In other words, a single resource may provide a service to multiple resources. For example, in resource chain 30C, a resource 70 associated with top-level service 32 may operate within an operating environment provided by a resource 72 associated with interpretation service 40. Resource 72 of interpretation service 40 may operate within an operating environment provided by a resource 74 associated with operating system service 42. Furthermore, in resource chain 30D, a resource 78 associated with top-level service 32 may operate within the operating environment provided by resource 74 associated with operating system service 42. In other words, resource 72 and resource 78 may use the same service provided by resource 74.

Figure 3:
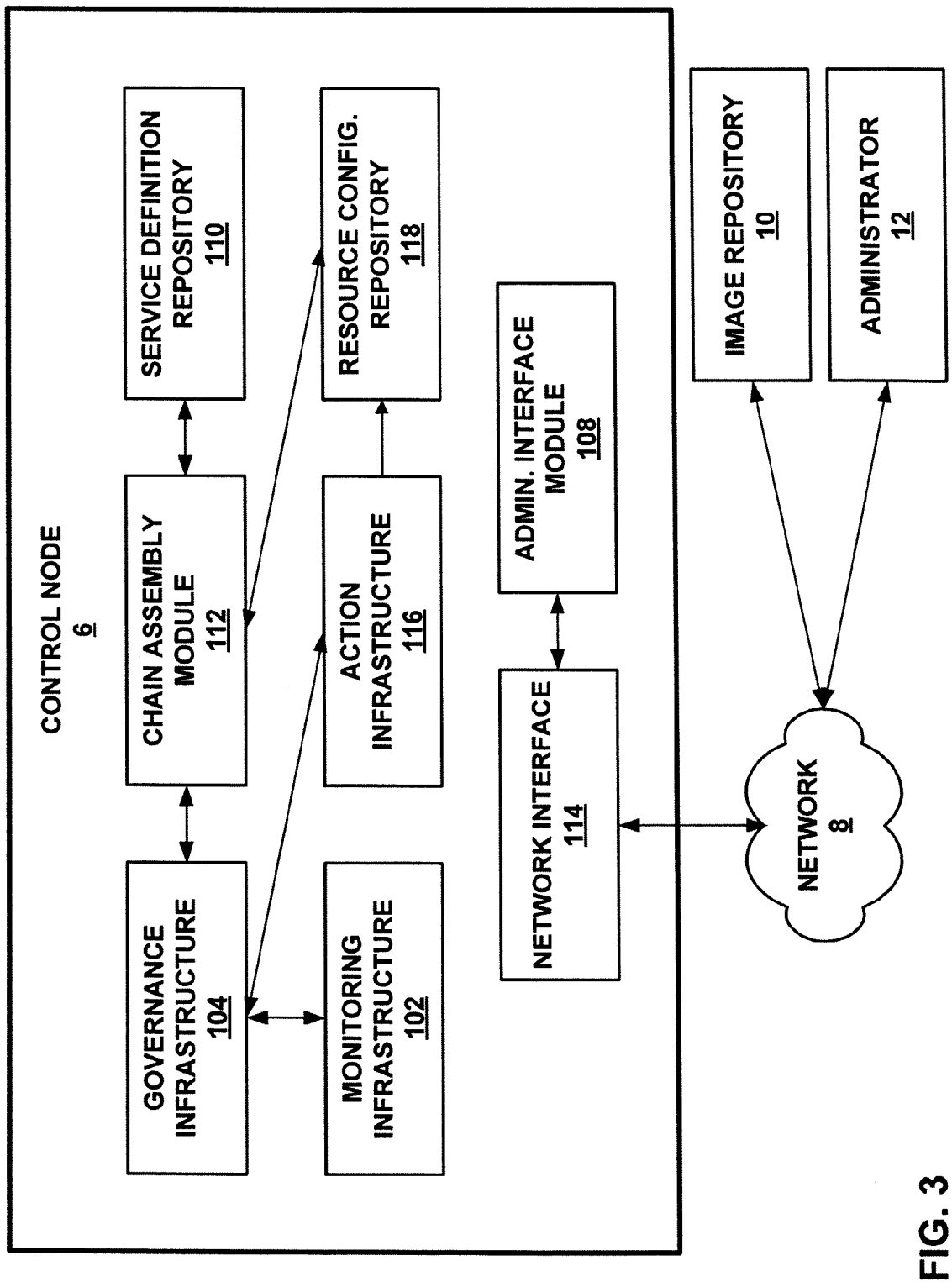
FIG. 3 is a block diagram illustrating example details of the control node.

FIG. 3 is a block diagram illustrating example details of control node 6. As illustrated in the example of FIG. 3, control node 6 may include a network interface 114 that facilitates communication between control node 6, resources in distributed computing system 2, and other devices on network 8, such as a computer used by administrator 12. Although not illustrated in the example of FIG. 3, each of the modules of control node 6 may communicate with network interface 114.

As illustrated in the example of FIG. 3, control node 6 may include a monitoring infrastructure 102 that provides real-time monitoring of distributed computing system 2. For example, monitoring infrastructure 102 may provide an operating environment in which collector modules may operate. Collector modules operating in monitoring infrastructure may be pluggable software modules that dynamically collect status data from resources operating within distributed computing system 2. Monitoring infrastructure 102 may use the status data to generate monitoring data based on the status data. The monitoring data generated by monitoring infrastructure 102 may represent the actual state of the resources in distributed computing system 2.

A governance infrastructure 104 in control node 6 governs distributed computing system 2. Governance infrastructure 104 provides an operating environment in which governor modules may operate. While control node 6 is operating, one or more governor modules operating in governance infrastructure 104 may determine that the monitoring data from monitoring infrastructure 102 indicate the service levels of services provided by distributed computing system 2 are not in compliance with one or more service-level agreements installed in distributed computing system 2. For instance, one or more governor modules operating in governance infrastructure 104 may determine that distributed computing system 2 is not responding to requests fast enough to comply with a service-level agreement.

When governor modules operating in governance infrastructure 104 determines that a service level of a service provided by distributed computing system 2 is not in compliance with a service-level agreement, governor modules operating in governance infrastructure 104 may interact with a chain assembly module 112 to dynamically assemble resource chains in order to enhance this service level. Chain assembly module 112 performs steps necessary to assemble resource chains when governance infrastructure 104 determines that the current service level does not satisfy the service-level agreement. For example, a governor module operating in governance infrastructure 102 may output an action request to chain assembly module 112. In response to this action request, chain assembly module 112 may attempt to identify and assemble a resource chain that most efficiently provides a top-level service. As a result of assembling this resource chain, distributed computing system 2 may have additional capacity to provide the top-level service.

Furthermore, chain assembly module 112 may automatically configure control node 6 to govern assembled resource chains. In configuring control node 6 to govern a resource chain, chain assembly module 112 may automatically configure monitoring infrastructure 102 to receive various types of status data from resources in the resource chain, and to output monitoring data regarding the resource chain in response to the received status data. In addition, chain assembly module 112 may automatically configure governance infrastructure 104 to receive monitoring data regarding the resources in the resource chain and to output appropriate action requests regarding these resources.

Control node 6 may include an action infrastructure 116. Action infrastructure 116 provides an operating environment in which service action modules and resource action modules may operate. Each of the resource action modules may be a pluggable software module that implements a common set of methods that perform actions regarding a resource. Similarly, each of the service action modules may be a pluggable software module that implements a set of methods that perform actions regarding a service. For example, a particular software resource only communicates using Simple Network Management Protocol (SNMP). In this example, action infrastructure 116 may include a resource action module for the particular software resource. This resource action module causes action infrastructure 116 to communicate with the particular software resource using SNMP. In some instances, service action modules and resource action modules may operate in action infrastructures on nodes of distributed computing system 2 other than control node 6. For example, an action infrastructure operating on computing node 4A may provide an operating environment in which a resource action module operates. In this example, the resource action module may or may not be associated with computing node 4A or a software resource that executes on computing node 4A.

Control node 6 may also include an administrative interface module 108 that provides a user interface through which administrator 12 may interact with control node 6. For example, administrative interface module 108 may provide a web interface that presents web pages that administrator 12 may use to configure control node 6. In another example, administrative interface module 108 may provide a Telnet or Secure Shell command line interface, a special-purpose user interface, or another type of user interface. Although not illustrated in the example of FIG. 3, administrative interface module 108 may interact with each other component of control node 6.

Administrator 12 may use administrative interface module 108 to configure service-level agreements in distributed computing system 2. For example, administrator 12 may use administrative interface module 108 to install a set of rules that represent a service-level agreement. In another example, administrator 12 may use administrative interface module 108 to install in governance infrastructure 104 a governor module that determines whether a service level provided by distributed computing system 2 complies with a service-level agreement. When this governor module determines that the service level provided by distributed computing system 2 does not comply with the service-level agreement, this governor module may attempt to enhance the service level provided by distributed computing system 2. This governor module may, for example, attempt to enhance the service level provided by distributed computing system 2 by increasing the capacity of distributed computing system 2 to provide a top-level service. For instance, the governor module may increase the capacity of distributed computing system 2 to provide a top-level service by causing chain assembly module 112 to assemble additional resource chains that provide the top-level service.

When administrator 12 uses administrative interface module 108 to configure a resource, administrative interface module 108 may store resource configuration information for the resource in a resource configuration repository 118 that stores resource configuration information. Resource configuration repository 118 may be present in a persistent or volatile computer-readable medium. For example, resource configuration repository 118 may be present in a random access memory unit, on a hard disk drive, or in another type of computer-readable medium. The resource configuration information of a resource may specify whether the resource is allocated to a resource chain, an Internet Protocol address associated with the resource, a path to a software image of the resource, number of processors in a computing node resource, amount of random access memory (RAM) in a computing node resource, processor speed of a computing node resource, and other resource-specific information.

In addition, administrator 12 may use administrative interface module 108 to configure resources associated with installed services. For example, administrator 12 may instruct administrative interface module 108 to govern ten resources of a particular service that administrator 12 has previously installed in distributed computing system 10. In another example, administrator 12 may use administrative interface module 108 to instruct governance infrastructure 104 to customize resources of a particular service.

Administrator 12 may also use administrative interface module 108 to configure services in distributed computing system 2. For example, administrator 12 may use administrative interface module 108 to instruct governance infrastructure 104 to start or stop using a service. In addition, administrator 12 may use administrative interface module 108 to specify a maximum number of resources of a service that may be created.

Administrator 12 may also use administrative interface module 108 to install or uninstall services. When administrator 12 installs a service, administrator 12 may cause administrative interface module 108 to store a service definition object of the service in a service definition repository 110. Service definition repository 110 may be present in a persistent or volatile computer-readable medium. For example, service definition repository 110 may be present in a random access memory unit, on a hard disk drive, or in another type of computer-readable medium.

A service definition object may include parameters that define a service. These parameters may include export and import parameters, asset consumption parameters, constraint parameters, blocked attribute parameters, monitored value parameters, priority parameters, sharing parameters, maximum resource parameters, external reference parameters, service configuration parameters, and service-level agreement parameters.

The export and import parameters of a service definition object of a service specify facilities that resources associated with the service export or import. A service definition object may classify export facilities and import facilities as either "static" or "dynamic." Static export facilities and static import facilities do not include references to resources associated with the service. In contrast, dynamic export facilities and import facilities include references to resources associated with the service.

Static export facilities and static import facilities may be "attributes" or "signatures." An "attribute" may be a string of characters that identifies a set of functionality. For example, a service definition object of a first service may specify the following as a static export attribute: "attribute (ia32);". In this example, when chain assembly module 112 is identifying service chains, chain assembly module 112 may pair this service with a second service when the service definition object of the second service specifies "attribute (ia32)" as a static import facility.

An attribute may also specify a version. For example, a service definition object of a first service may specify the following as a static export attribute: "attribute (appserver, version (8, 1, 2));". This attribute may indicate that the first service provides version 8.1.2 of an application server. When chain assembly module 112 is identifying service chains, an import attribute may be matched with an export attribute that specifies a version when the import attribute does not specify any version. In addition, chain assembly module 112 may not match an import attribute with an export attribute that specifies a version when the import attribute specifies a version that includes more digits than the version specified by the export attribute. However, an import attribute may be matched with an export attribute when the import attribute includes fewer digits than the export attribute and all of the digits in the import attribute are equal to corresponding digits in the import attribute. For example, a first service definition object may specify "attribute (appserver, version (8, 1, 2))" as an export attribute and a second service definition may specify "attribute (appserver, version (8, 1, 2, 5));" as an import attribute. In this example, chain assembly module 112 may not pair a service defined by the first service definition object and a service defined by the second service definition object because the version of import attribute "attribute (appserver, version (8, 1, 2, 5))" includes more digits than the version of export attribute "attribute (appserver, version (8, 1, 2))." However, a service defined by a service definition object that specifies an import attribute "attribute (appserver, version (8, 1))" may be matched with the export attribute "attribute (appserver, version (8, 1, 2))" because this import attribute version includes fewer digits than the export attribute version and the digits in the import attribute version are equal to the corresponding digits in the export attribute version.

A service definition object may specify one or more export attributes as required export attributes. A required export attribute of a first service is an attribute that a second service must import in order for the first service to be matched to second service. In general, a service definition object of a first service may specify a plurality of export attributes. When chain assembly module 112 is identifying service chains, chain assembly module 112 may match the first service with a second service when the second service imports fewer than all of the attributes exported by the first service. For example, the service definition object of the first service may specify the export attributes "attribute (appserver, version (8, 1, 2, 5))" and "attribute (ia32)." In this example, the service definition of the second service may specify the import attribute "attribute (ia32)." Because the first service exports all of the attributes required by the second service, chain assembly module 112 may match the first service and the second service. However, if "attribute (appServer, version (8, 1, 2, 5))" is a required export attribute, chain assembly module 112 would not match the first service and the second service because the second service does not import "attribute (appServer, version (8, 1, 2, 5))." Required attributed may be denoted with the "+" symbol. For instance, "+attribute (appServer, version (8, 1, 2, 5))" denotes that "attribute (appserver, version (8, 1, 2, 5))" is a required attribute.

A service definition object may specify one or more implied export attributes. An implied export attribute is an attribute that a first service exports only when the first service imports attributes from a second service and the second service exports a particular attribute. For example, a second service may export "attribute (x)" and "attribute (Y)." A first service may import "attribute (x)" and export "attribute (z)". Furthermore, the first service may export "attribute (A)" when the first service is matched with a service that exports "attribute (Y)". In addition, a third service may import "attribute (A)". In this example, chain assembly module 112 may match the third service and the first service only when the first service has already been matched to the second service. This is because the first service only exports "attribute (A)" when the first service has been matched to a service that exports "attribute (Y)" and the second service exports "attribute (Y)".

A service definition object may specify one or more import attributes as negated import attributes. If a service definition object for a first service specifies a negated import attribute, the first service cannot be matched with a service that exports that attribute. For example, a service definition object for a first service may specify the negated import attribute "attribute (A)" (note the − indicating that the import attribute is negated). In this example, a second service may export "attribute (A)". Because the service definition of the first service cannot be matched with a service that exports "attribute (A)", chain assembly module 112 does not match the first service and the second service, even if the second service exports all of the attributes that the first service imports.

A service definition object may specify one or more import attributes in disjunctive form. In other words, chain assembly module 112 may only need to find one of the import attributes. For example, a service definition object of a first service may specify "attribute (A) or attribute (B);". In this example, chain assembly module 112 may match the first service to a second service that only exports "attribute (A)". Furthermore, in this example, it may not be necessary for chain assembly module 112 to find a third service that exports "attribute (B)".

A service definition object may also use "signatures" to specify static import facilities and static export facilities. As used herein, an export "signature" of a service is a reference to a function implemented by resources associated with the service. An import "signature" of a service is a reference to a function implemented by resources associated by other services that resources associated with this service require in order to operate. For example, a service definition object for a first service may specify the following as an export signature: "signature (int foobar (java.lang. String, int [ ] [ ], Boolean));". This means that resources associated with the first service implement the function "int foobar (java.lang.String, int [ ] [ ], Boolean);". Thus, a resource associated with a services that imports "signature (int foobar (java.lang.String, int [ ] [ ], Boolean))" may invoke the "int foobar (java.lang.String, int [ ] [ ], Boolean)" function implemented by a resource associated with the first service.

On occasion a service may import signatures having the same function name. For instance, a service may import two signatures that specify the function name "foobar". To differentiate between these two import signatures, the service definition object may provide an alias for one or more of these import signatures. For example, a service definition object may specify:
 signature(int foobar(java.lang.String, int [ ] [ ], Boolean));
 signature(int foobar(java.lang.String, Boolean) as foobar2);
In this example, foobar2 serves as an alias for the second foobar function.

"Dynamic" export facilities and import facilities include references to resources associated with the service. Dynamic export facilities may be divided into two categories: "properties" and "assets."

"Assets" represent consumable numeric values. Resources that depend on other resources may consume the assets of underlying resources. When a new resource requires more of an asset than an underlying resource has available, chain assembly module 112 may 18 not assemble a resource chain that includes the new resource and the underlying resource. As described below, resource action modules may provide methods by which chain assembly module 112 may retrieve values of assets associated with individual resources. For example, a resource action module may provide a method "double getAsset (string AssetName)" that returns a double value that indicates how much of an asset named by the parameter "AssetName" a resource associated with the resource action module provides (e.g., 50.0 gigabytes). Service action modules may provide default values for the assets.

A service definition object may specify one or more optional "asset consumption" parameters. An "asset consumption" parameter in a service definition object of a service specifies that resources associated with the service consume a specific amount of a consumable asset provided by a resource associated with a different service. For example, a service definition object of a first service may specify the following asset consumption parameter:

assetConsumption: uses(collage/base:physicalmemory, 6.0);

This example asset consumption parameter indicates that resources associated with the first service may be anticipated to use 6.0 gigabytes of physical memory. In this example, when chain assembly module 112 is determining whether the first service can be matched with a second service, chain assembly module 112 may invoke methods getAsset ("collage/base:physicalMemory") of resource action modules associated with resources associated with the second service in order to determine how much physical memory each of the resources provide. When chain assembly module 112 invokes this method, one of the resource action module may returns a value of 50.0, indicating that a resource R associated with this resource action module provides 50.0 gigabytes of physical memory for use by resources associated with other services. Thus, if chain assembly module 112 deploys a resource associated with the first service to a chain such that the resource is dependent on resource R, there may be only 44 gigabytes of physical memory remaining for use by resources associated with other services.

By default, chain assembly module 112 may not deploy a resource associated with a service to a resource chain when the resource chain does not have sufficient amounts of a dynamic asset to satisfy the asset consumption parameters specified by the service definition object of the service. Continuing the previous example, if a service definition object of a third service specifies that resources associated with the third service export the dynamic asset asset(collage/base:physicalMemory, 5.0), resources associated with the third service would not provide sufficient amounts of physical memory to satisfy the asset consumption parameters specified by the service definition object of the first service. For this reason, chain assembly module 112 may not assemble a resource chain that includes resources associated with the first service and resources associated with the third service when the resources of the third service are the only exporters of physical memory.

Service definition objects may also specify one or more optional constraint parameters. Chain assembly module 112 may use constraints specified by a service definition object of a service to determine whether an underlying resource can support the deployment of a resources associated with the service. Constraints may comprise expressions over dynamic assets and dynamic properties. For example, a service definition object of a service may specify the following constraint parameter:

constraints: collage/base:physicalmemory >=6.0;

This example constraint parameter may indicate to chain assembly module 112 that resources associated with the service may only be deployed to a resource chain when there are 6.0 gigabytes of physical memory or more available in the resource chain.

A service definition object may also specify one or more dynamic export or import properties. A dynamic export or import property represents a non-consumable resource features that chain assembly module 112 may use when checking whether resource chains comply with constraint requirements. Chain assembly module 112 may retrieve an object associated with an export or import property by invoking a method of a resource action module associated with the export or import property that returns the object associated with the export or import property. The object associated with the export or import property may be an object of any type. For example, chain assembly module 112 may invoke a method "(onlinePortstructure)Object get Property (String propertyName)". This method returns an object of a generic type "Object" that is associated with a property named by the parameter "propertyName." The object of type "Object" is then immediately cast into an object of type "onlinePortStructure".

Chain assembly module 112 may provide special operations that support properties that return map objects. For example, a service definition object may use the following map operators:

P in S (P a key of map S)
 P not in S (P not a key of map S)
 S==S2 (S, S2 contain the same entries)
 S !=S2 (S, S2 do not contain the same entries)–S<S2 (S subset of S2)
 S<S2 (S subset of S2)
 S # S2 (S disjoint with S2)
 S {<key>} (value associated with key in S; null if no associated value) any <var> in S, <expression involving var>;

Service definition objects may use these map operations when declaring export properties. For instance, a service definition object may specify "property(foo, {"a"=5, "b"="xyz"});" as an export property. "property (foo, {"a"=5, "b"="xyz"});" may indicate that property "foo" maps the value "a" to "s" and maps the value "b" to the "xyz".

A service definition object may specify one or more constraint parameters that refer to import properties. For example, a service definition object of a service may specify the following import parameter and the following constraint parameter:

```
imports: {
    property(collage/base:onlinePorts);
}
constraints: {
    collage/base:port in collage/base:onlinePorts;
}
```

The import parameter and the constraint parameter of this example indicate that chain assembly module 112 may not deploy resources associated with the service unless "port" is one of the onlinePorts provided by a resource associated with a lower-level service.

A service definition object may optionally specify one or more imported attributes as "blocked" attributes. For instance, by default, attributes imported by a service are available for use by resources associated with services that are dependent on resources associated with the service. However, when a service definition object specifies a particular attribute as a blocked attribute, that attribute is not available to resources associated with services that are dependent on resources associated with the service. For example, a software application may operate in an operating environment provided by an operating system and the operating system may operate in an operating environment provided by a computing node that exports an attribute of executing IA32 instructions attribute (ia32) and exports an attribute of direct control of hard disks attribute (disk-control). In this example, attribute (ia32) is imported by the operating system, but is still available to the software application. Thus, if the software application imports attribute (ia32), chain assembly module 112 may assemble a chain in which the software application is dependent on the operating system, even though the operating system does not explicitly export the attribute (ia32). However, the operating system may block the attribute of direct control of hard disks by including the following

```
blocked: {
    attribute(disk_control);
}
```

In this way, the service definition object of the operating system service indicates to chain assembly module 112 that services that are dependent the operating system service cannot use attribute(disk_control).

A service definition object for a service may specify one or more optional monitored value declarations. Monitored value declarations specify monitoring values that are monitored by a service governor of the service or that are monitored by resource governors of resources associated with the service. Monitored value declarations that specify monitored values that are monitored by the service governor of the service are referred to herein as "service monitored values." Monitored value declarations that specify monitored values that are monitored by the resources governors are referred to herein as "resource monitored values."

A monitored value declaration may specify one or more monitoring values in a variety of ways. For example, a monitored value declaration may specify a namespace that contains a name of a specified monitoring value, one or more collector objects in monitoring infrastructure 102 that provide the specified monitoring value or that provides a value from which a monitored value may be derived. In addition, a monitored value declaration may specify an expression that defines the specified monitoring value as a value derived from values provided by the collector object. For example, a service definition object may include following resource monitored value declaration:

```
resourceMonitoredValues(
    namespace(system/os),
    collector(snmp, values(*), "com.collectors.snmp"),
    expression(halfLoad, snmp:load / 2)
);
```

This example resource monitored value declaration specifies the "system/os" namespace. Thus, names associated with the monitored values declared by this monitored value declaration exist within the context of the "system/os" namespace. This resource monitored value declaration also specifies that a collector object named "com.collectors.sump" obtains status information from resources using the SNMP protocol and exposes all values collected. The expression term declares an additional monitoring value "half Load" that is derived by dividing the "load" value provided by the SNMP collector by two.

Monitored value declarations may also specify that only some of the values provided by a collector object are available. For example, a service definition object may include the following resource monitored value declaration:

```
serviceMonitoredValues(
    namespace(sample/module/sl),
    collector(jmx, values(xxx, yyy), "com.collectors.jmxisr160"));
```

In this example, the "com.collectors.jmxJsrl60" collector may typically provide values "xxx", "yyy", and "zzz". However, the term "values (xxx, yyy)", restricts the values provided by "com.collectors.jmxJsrl60" to the values "xxx" and "=". If this service definition object were to specify the term "values(–)" instead of "values (xxx, yyy)", all values provided by "com.collectors.jmxJsrl60" would be available (i.e., "xxx", "yyy", and "zzz").

Monitored value declarations may also specify an independent file that includes one or more monitored value declarations. For example, the following service monitored value declaration specifies an independent file that includes one or more monitored value declarations:

serviceMonitoredValues(definition(foo/bar: some SvcTypeMVDef));

In this example, "some SvcTypeMVDef" is a file name within the namespace "foo/bar". When chain assembly module 112 assembles a resource chain that includes the service, chain assembly module 112 automatically incorporates any monitored values specified in this independent file into the service definition of the service. Multiple service definition objects 23 may include monitored value declarations that specify this independent file. In this way, each of these service definition objects may be made more concise.

Monitored value declarations may refer to a plurality of collector objects. Such monitored value declarations may use values provided by these collector objects in an expression that provides a new monitored value. For example, a service definition object may include the following monitored value declaration:

```
resourceMonitoredValues(
    namespace(system/resource),
    collector(
        snmp,
        "com.collectors.snmp",
        parameters(interval(10), heartbeat(30), timeout(20))), collector(
        ping,
        "com.collectors.ping",
        parameters(interval(5), heartbeat(30), timeout(20))),
expression(online, snmp:isConnected && ping:isConnected));
```

In this example, the collectors "com.collectors.snmp" and "com.collectors.ping" do not provide any monitored values. However, the expression statement provides a monitored value "online" that is true when the "isconnected" value of the "snmp" collector is true and when the "is Connected" value of the "ping" collector is also true.

A service definition object of a service may specify an optional priority for the service. Automation infrastructure 102 may use this priority when determining whether to harvest resources associated with this service. For example, a service definition object of a first top-level service may specify a priority of 16 and a service definition object of a second top-level service may specify a priority of 32. In this example, automation infrastructure 102 may determine that it is necessary to harvest resources in order to provide a particular top-level service. When this occurs, automation infrastructure 102 may harvest resources from resource chains that provide the first top-level resource rather than from resource chains that provide the second top-level resource because the service definition object of the second top-level resource specifies a higher priority than the service definition object of the first top-level resource. If a service definition object of a service does not specify a priority, the service may be presumed to have a priority of zero (i.e., the lowest priority).

A service definition object of a service may specify an optional sharing parameter. Sharing parameters determine whether or not resources associated with other services may import facilities that are exported by resources in resource chains that include resources associated with this service. In one example implementation, a service definition object may specify one of an "allow" sharing parameter, a "below" sharing parameter, or a "deny" sharing parameter. In this example implementation, if a service definition object does not specify a sharing parameter, chain assembly module 12 may use resources associated with the service as though the service definition object had specified an "allow" sharing parameter.

An "allow" sharing parameter indicates that one or more resources associated with other services may share any resource in a resource chain that includes resources associated with the service. For instance, distributed computing system 2 may include a first resource, a second resource, a third resource, and a fourth resource. If a service definition object of a service with which the fourth resource is associated specifies an "allow" sharing parameter, the second resource and the third resource may both operate within an operating environment provided by the first resource and the fourth resource may operate within an operating environment provided by the third resource. Alternatively, the fourth resource may be used in a resource chain in which the fourth resource operates in an operating environment provided by the first resource and the second resource and the third resource operate within an operating environment provided by the fourth resource.

A "below" sharing parameter indicates that one or more resources may share any resource in a resource chain below a resource associated with the service. For instance, distributed computing system 2 may include may include a first resource, a second resource, a third resource, and a fourth resource. If a service definition object of a service with which the fourth resource is associated specifies a "below" sharing parameter, the second resource and the third resource may operate within an operating environment provided by the first resource and the fourth resource may operate within an operating environment provided by the third resource. However, because the service definition object specifies a "below" sharing parameter, the fourth resource may not be used in a resource chain in which the fourth resource operates in an operating environment provided by the first resource and the second resource and the third resource operate within an operating environment provided by the fourth resource.

A "deny" sharing parameter indicates that no resource may share any resource in a resource chain that includes a resource associated with the service. For instance, distributed computing system 2 may include may include a first resource, a second resource, a third resource, and a fourth resource. If a service definition object of a service with which the fourth resource is associated specifies a "deny" sharing parameter, the fourth resource may not be used in a resource chain in which the second resource and the third resource operate within an operating environment provided by the first resource and the fourth resource operates within an operating environment provided by the third resource. In addition, because the service definition object specifies a "deny" sharing parameter, the fourth resource may not be used in a resource chain in which the fourth resource operates in an operating environment provided by the first resource and the second resource and the third resource operate within an operating environment provided by the fourth resource.

A service definition object may also specify an optional "max resources" parameter. If resources associated with a service must be customized in order to operate, a service definition object of the service may be required to specify a "max resources" parameter. A "max resources" parameter of a service definition object for a service may indicate a number of resources associated with the service that may be customized. Because these resource must be customized in order to operate, this number may indicate the maximum number of resources associated with the service that may be used within distributed computing system 2.

A service definition object for a service may specify a service governor that operates in governance infrastructure 104. For example, a service definition object may include the following to specify a service governor:

serviceClass: com.sample.ExampleServiceClass;

In this example, "com.sample.ExampleServiceClass" is a name of a service governor that governs a service defined by the service definition object.

In addition, a service definition object may specify a resource governor that operates in governance infrastructure 104. For example, a service definition object may include the following to specify a resource governor:

resourceClass: com.sample.ExampleResourceClass;

In this example, "com.sample.ExampleResourceClass" is a name of a resource governor that governs resources associated with the service defined by the service definition object.

If the service defined by the service definition object is a top-level service, the service definition object may also specify an SLA governor that operates in governance infrastructure 104. For example, a service definition object may include the following to specify a SLA governor:

slaClass: com.sample.ExampleSLAClass;

In this example, "com.sample.ExampleSLAClass" is a name of a SLA governor that determines whether distributed computing system 2 provides a level of the service defined in the service definition object that is in conformity with a service-level agreement.

A service definition object for a top-level service may specify one or more parameters that determine how many resources of the top-level service should be running in distributed computing system 2. For example, a service definition object of a top-level service may specify the following top-level service parameters:

```
sla {
    min (1);
    max(4);
    lowThreshold("collage/base:resourceCount", 2);
    highThreshold("collage/base:resourceCount", 2);
}
```

In this example, the "min (1)" parameter of the service definition object specifies that distributed computing system 2 should run at least one resource associated with the top-level service and the "max (4)" parameter specifies that distributed computing system 2 should run no more than four resources associated with the top-level service. Furthermore, the "lowThreshold ("collage/base: resourceCount", 2)" parameter indicates that distributed computing system 2 should attempt to operate no fewer than two resources associated with the top-level service. The "highThreshold ("collage/base: resourceCount", 2)" parameter indicates that distributed computing system 2 should not attempt to operate more than two resources associated with the top-level service. The service definition object may also specify top-level service parameter thresholds for each expression defined in the SLA governor class specified in the service definition object.

Figure 4:
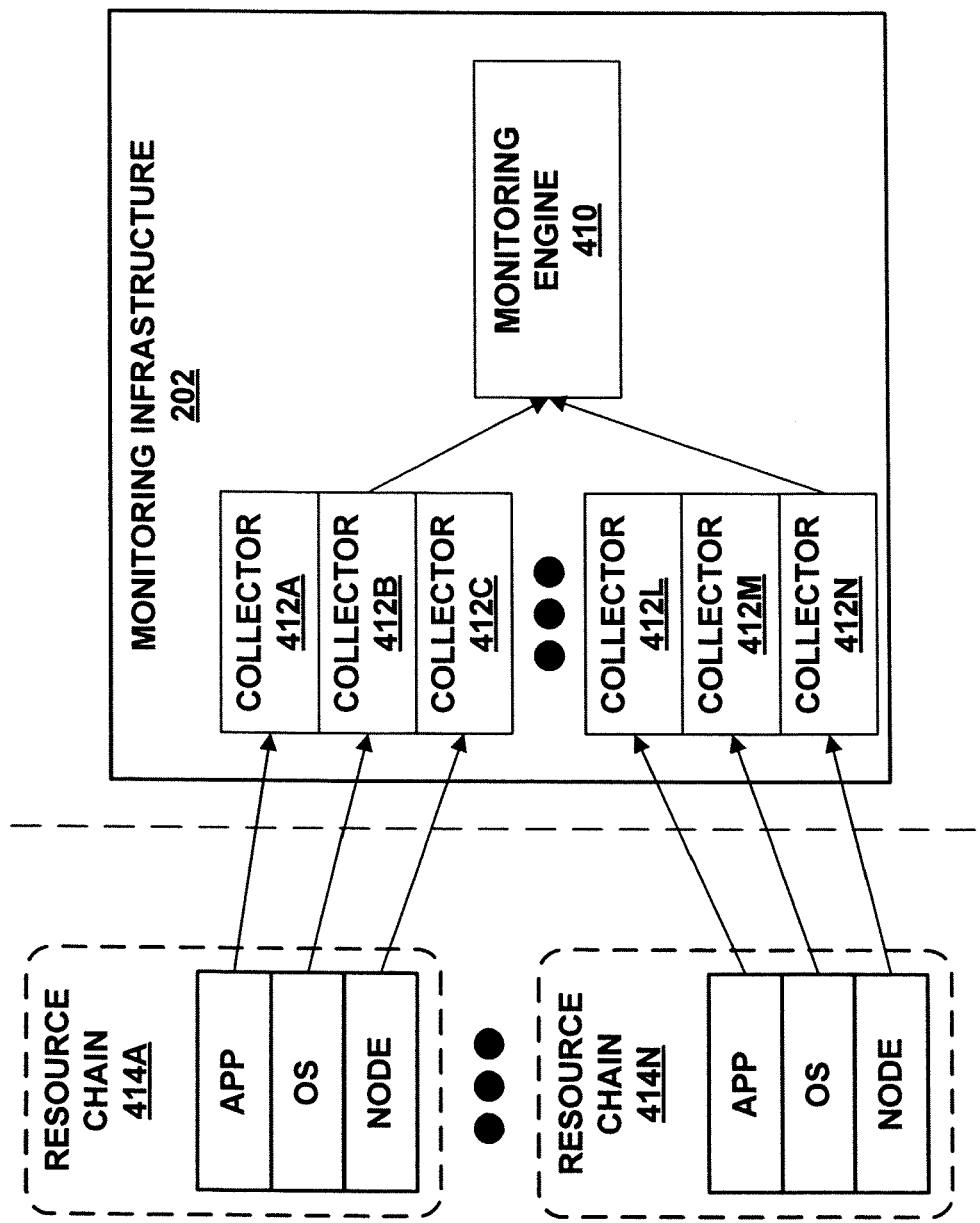
FIG. 4 is a block diagram illustrating example details of a monitoring infrastructure.

FIG. 4 is a block diagram illustrating example details of monitoring infrastructure 102. In general, monitoring infrastructure 102 receives status data from resources in distributed computing system 2 and outputs monitoring data based on the status data. This monitoring data may represent a current state of distributed computing system 2. For example, monitoring infrastructure 102 may identify, in a timely and efficient manner, any computing nodes that have failed, i.e., any node that does not respond to a request to a known resource. More generally, monitoring infrastructure 102 provides a concise, consistent and constantly updating view of the resources of the fabric.

As illustrated in the example of FIG. 4, monitoring infrastructure 102 may include a set of collector modules 412A through 412N (collectively, "collector modules 412"). Collector modules 412 may be pluggable software objects that implement a common set of methods. For example, collector modules 412 may be Java code compiled into a jar file and loaded with a class loader at run time. When invoked, the methods may cause collector modules 412 to collect monitoring data from various resources allocated to various resource chains in distributed computing system 2. In this example, monitoring infrastructure 102 includes collector modules 412A through 412N for collecting status data from computing node resources, operating system resources, and application resources allocated to resource chains 414A and 414N, respectively.

Monitoring infrastructure 102 may start and stop the operation of collector modules 412 in response to action requests from governance infrastructure 104. For example, a monitoring engine 460 in monitoring infrastructure 102 may receive collection requests from governance infrastructure 104, sort and prioritize the collection requests, and invoke an appropriate one of collector modules 412 based on the collection requests. The invoked collector module is responsible for collecting the required status data and returning the status data to monitoring engine 460. If the invoked collector module is unable to collect the requested status data, the collector module may return an error code.

Each of collector modules 412 may be associated with a configuration file written in a data description language, such as the extensible markup language (XML). Administrator 12 may interact with administrative interface module 108 to dynamically configure collector modules 412. For example, administrator 12 may specify the protocol or protocols to be used for monitoring resources of a service when the user installs the service. In addition, the user may specify the protocols to be used for monitoring the computing nodes and each resource. Example protocols supported by collector modules 412 may include Secure Shell (SSH), Simple Network Management Protocol (SNMP), Internet Control Message Protocol (ICMP) ping, Java Management Extensions (JMX), and the Hypertext Transfer Protocol (HTTP).

Some protocols require special privileges to perform the required data collection. For example, some protocols may require root privileges to perform the required data collection. In this case, the ones of collector modules 412 that utilize such protocols may communicate with a separate process that executes with root privilege. Moreover, some protocols may require deployment and/or configuration of data providers within the fabric. Software agents may, for example, be installed and configured on nodes and configured on other hardware.

Figure 5:
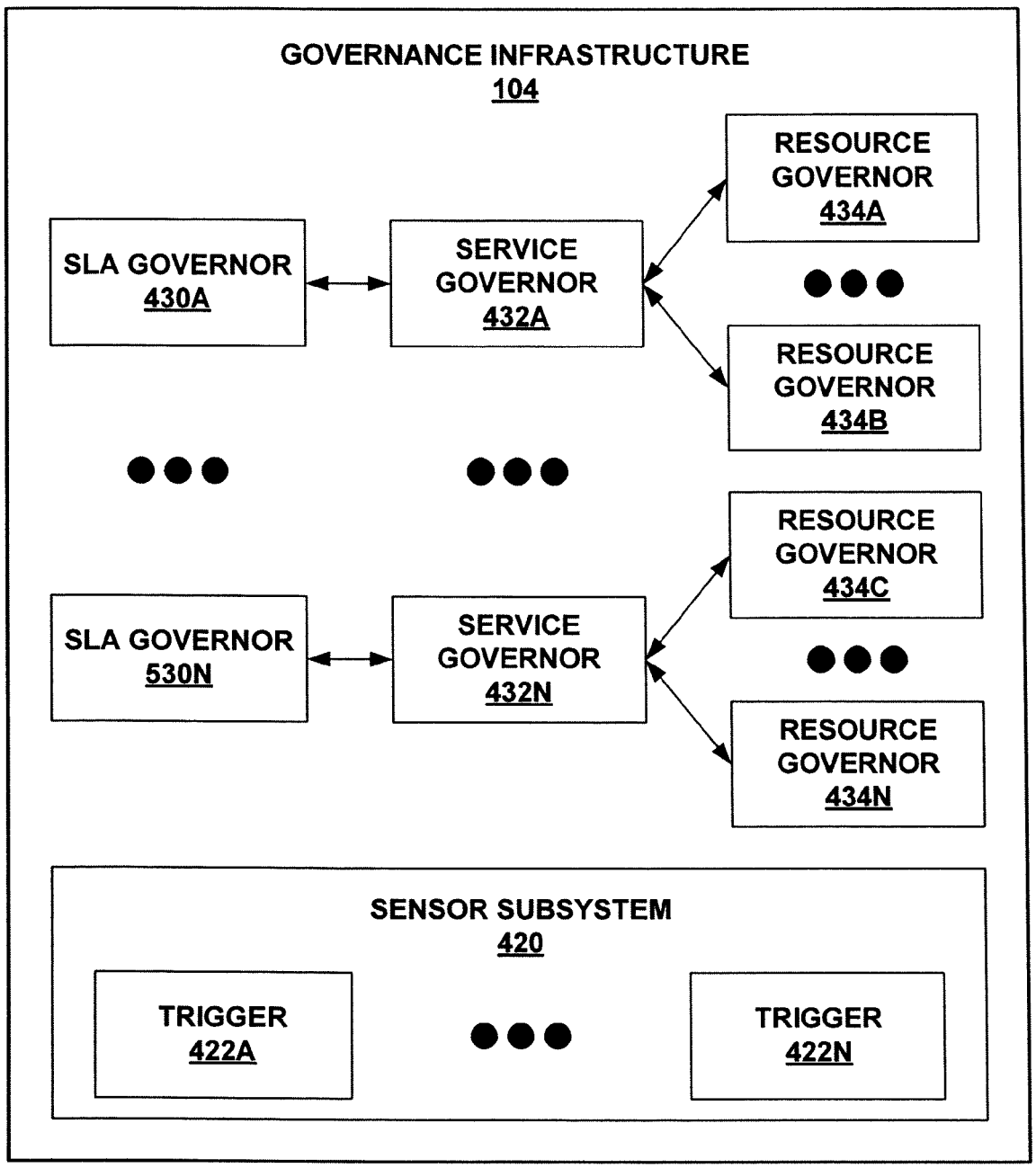
FIG. 5 is a block diagram illustrating example details of a governance infrastructure.

FIG. 5 is a block diagram illustrating example details of governance infrastructure 104. As illustrated in the example of FIG. 5, governance infrastructure 104 includes a sensor subsystem 420, a set of service-level agreement (SLA) governors 430A through 430N (collectively, "SLA governors 430"), a set of service governors 432A through 432N (collectively, "service governors 432"), and a set of resource governors 434A through 434N (collectively, "resource governors 434").

Sensor subsystem 420 receives monitoring data from monitoring infrastructure 102 and outputs events based on the monitoring data. SLA governors 430, service governors 432, and resource governors 434 may receive events from sensor subsystem 420 and output action requests based on the events.

In order to output events based on monitoring data, sensor subsystem 420 may receive an ongoing, dynamic stream of monitoring data from monitoring infrastructure 102. As discussed above, this monitoring data may represent an actual state of distributed computing system 2. Sensor subsystem 420 may use the monitoring data to maintain ongoing, calculated values. Sensor subsystem 420 may then use these calculated values to generate events. For example, sensor subsystem 420 may use monitoring data that indicates the instantaneous processing load of computing nodes in resource chains that provide functionality of a top-level service in order to calculate a weighted moving average of the processing load of these computing nodes. If the weighted moving average of the processing load for these computing nodes exceeds a given threshold (e.g., 95%), sensor subsystem 420 may output an event that indicates that distributed computing system 2 may not currently have sufficient capacity to provide the top-level service.

Administrator 12 may customize sensor subsystem 420 by adding pluggable trigger objects 422A through 422N (collectively, "trigger objects 422") to sensor subsystem 420. Trigger objects 422 may perform arbitrary data aggregations. Each of trigger objects 422 may be registered under a compound name based on the entity being monitored and the type of data being gathered. For example, trigger object 422A may be defined to aggregate and compute an average computing load for a set of resource chains that provide a top-level service every five minutes. SLA governors 430, service governors 432, or resource governors 434 may request the aggregated data based on the registered names.

Sensor subsystem 420 may communicate the events to SLA governors 430, service governors 432, or resource governors 434 on a periodic or event-driven basis. For example, SLA governors 430 may register interests in a particular event with sensor subsystem 420 and request updates at a specified frequency. In response, sensor subsystem 420 may interact with monitoring infrastructure 102 to generate the aggregated data required by SLA governors 430.

SLA governors 430 may be software objects that operate in the operating environment provided by governance infrastructure 104. Each of SLA governors 430 receive monitoring data that indicate a current service level of a service provided by distributed computing system 2 and determine whether the current service level of the service satisfies a service-level agreement. If one of SLA governors 430 determines that a current service level of a service provided by distributed computing system 2 is not in compliance with a service-level agreement, the SLA governor may output events that cause distributed computing system 2 to enhance the current service level of the service. In addition, if one of SLA governors 430 determines that a current service level of a service provided by distributed computing system 2 exceeds a service level required by a service-level agreement, the SLA governor may output events that cause distributed computing system 2 to provide a lower service level of the service. Causing distributed computing system 2 to provide a lower service level of a service may make resources available to provide other services.

When administrator 12 installs a service definition object, administrator 12 may install one of service governors 432 in governance infrastructure 104. Each of service governors 432 may be a software object that operates in the operating environment provided by governance infrastructure 104. Each of service governors 432 "governs" an individual service. That is, each service governor controls how resources that provide a different service are used within the distributed computing system. Service governors 432 may govern a service by controlling statuses of resources that provide the service.

Each resource may have a status of "started", "stopped", "failed", "failed to start", "failed to stop", "available", and "allocated." A status of "started" may indicate that the resource is currently operating in a resource chain. A status of "stopped" may indicate that the resource is currently in a resource chain, but is not currently operating. A status of "failed" may indicate that an error has occurred and the resource is not operable. A status of "failed to start" may indicate that a resource is in a resource chain, but due to an error, the resource has failed to start operating despite a request to do so. A status of "failed to stop" may indicate that a resource is in a resource chain, but due to an error, the resource has failed to stop operating despite a request to do so. A status of "available" may indicate that a resource is not in a resource chain and is available to be allocated to a resource chain. A status of "allocated" may indicate that a resource has been allocated to a resource chain, but a request to start the resource has not yet been issued. Chain assembly module 112 might not identify a resource for use in a resource chain if the resource has a status of "failed", "failed to start", or "failed to stop."

Service governors 432 may update the statuses of resources governed by service governors 432 in response to events from SLA governors 430 and resource governors 434. For example, service governor 432A may receive an event that indicates that a resource associated with a service governed by service governors 432A has failed. In this example, service governor 432A may invoke a method of a service action module in action infrastructure 116 to update the status of this resource to indicate that the resource has failed. Because the resource configuration data for this resource indicates that this resource has failed, chain assembly module 112 does not identify candidate resource chains that include this resource.

As described in detail below, chain assembly module 112 uses the statuses of resources when identifying candidate resource chains. For example, if a resource has the status "started", chain assembly module 112 may take steps to harvest the resource in order to assemble a resource chain that includes the resource.

When administrator 12 configures distributed computing system 2 to use a resource, administrator 12 may install one of resource governors 434 in governance infrastructure 104. Each of resource governors 434 governs a process by which an individual one of the resources starts providing or stops providing a service. As described in detail below, each of resource governors 434 may output action requests to resource action modules in action infrastructure 116. These action requests may request the resource action module to communicate with the resources to instruct the resources to perform various activities relating to the start-up or shut-down of individual resources.

SLA governors 430, service governors 432, and resource governors 434 may provide events to one another. For example, ones of SLA governors 430 may provide events to ones of service governors 432. Furthermore, each of service governors 432 may provide events to ones of resource governors 434 that govern resources of the service governed by the service governor. For example, resource governor 434A and resource governor 434B may govern resources of a particular service. Service governor 432A may govern that service. In this example, resource governors 434A and 434B may provide events to service governor 432A and service governor 432A may provide events to resource governors 434A and 434B.

Resource governors 434 may also provide events to other resource governors 434. Individual ones of resource governors 434 may be assembled into chains of resource governors. A chain of resource governors governs the behavior of a resource chain. For example, a web server application may operate within an operating environment provided by a Linux operating system, and the Linux operating system may operate within an operating environment provided by an x86 computing node. In this example, the x86 computing node, an instance of the Linux operating system, and an instance of the web server application each represent individual resources. A chain of resource governors may include a resource governor to govern the x86 computing node, a resource governor to govern the Linux operating system, and a resource governor to govern the web server application.

A chain of resource governors may include a plurality of branches. Continuing the previous example, a File Transfer Protocol (FTP) server application may operate within the operating environment provided by the Linux operating system. In this example, the chain of resource governors may include a resource governor that governs the FTP server application, a resource governor that governs the web server application, a resource governor that governs the Linux operating system, and a resource governor that governs the x86 application node. The chain of resource governors in this example includes two branches because both the web server application and the FTP server application depend on the operating environment provided by the Linux operating system but do not depend on the functionality of each other to operate successfully.

A resource governor in a chain of resource governors may "propagate" events to an immediately lower resource governor in the chain of resource governors. Propagation of an event implies providing an event to one other resource governor. Continuing the previous example, the resource governor that governs the web server application may propagate an event to the resource governor that governs the Linux operating system and the resource governor that governs the FTP server application may also propagate an event to the resource governor that governs the Linux operating system. In addition, the resource governor that governs the Linux operating system may propagate an event to the resource governor that governs the x86 application node. Because, in this example, the resource governor that governs the x86 application node is the lowest resource governor in the chain, the resource governor that governs the x86 application node does not propagate events to any other resource governor. When a resource governor in a chain of resource governors receives an event propagated to the resource governor, the resource governor may output some action to a resource action module associated with the resource governed by the resource governor.

A resource governor in a chain of resource governors may also "publish" resource events to be received by immediately higher resource governors in the chain of resource governors.

Publication of an event implies providing an event to one or more other resource governors. When a resource governor is initially constructed and configured into a chain of resource governors, the resource governor may be configured to "subscribe" to events published by an immediately lower resource governor in the chain. Continuing the ongoing example, the resource governor that governs the x86 application node may publish events that are received by the resource governor that governs the Linux operating system. The resource governor that governs the Linux operating system may publish events that are received by the resource governor that governs the web server application and by the resource governor that governs the FTP application.

When chain assembly module 112 receives a request for a new instance of a resource from one of service governors 432, chain assembly module 112 may configure one or more of resource governors 434 to act as a chain of resource governors. To configure one or more of resource governors 434 to act as a chain of resource governors, chain assembly module 112 may configure resource governors 434 to propagate events to and subscribe to events from a resource governor that governs a lower-level resource. For example, a resource governed by resource governor 434A may provide an operating environment in which a resource governed by resource governor 434C operates. In this example, chain assembly module 112 may configure resource governor 434C to subscribe to events published by resource governor 434A and to propagate events to resource governor 434A.

SLA governors 430, service governors 432 and resource governors 434 may be implemented in a variety of ways. In one example implementation, SLA governors 430, service governors 432, and resource governors 434 may comprise one or more rules engine. In this example, a rules engine in one of the governors matches patterns in events presented by sensor subsystem 420, another one of the governors, or action infrastructure 116. Governance infrastructure 104 may allow rule sets to be loaded in source form and compiled at load time into discrimination networks. Each rule set specifies trigger-delivered attributes. Upon loading the rule sets, a governor may establish trigger listeners to receive sensor notifications and update respective working memories of the rule engines in the governor.

Each of the rule engines may be software objects that perform logical reasoning using knowledge encoded in high-level condition-action rules. Each of the rule engines may apply automated reasoning that works forward from preconditions toward goals defined in a service-level agreement. For example, the rule engines may apply modus ponens inferences rules. In this example, the rule engines may process the events, identify actions, and request that action infrastructure 116 perform the identified actions. In addition, the rule engines may provide a call-back interface so that action infrastructure 116 may inform a rule engine when an action has completed. The rule engines may prevent a particular rule from re-firing as long as any action invoked by the rule has not finished.

In another example implementation, some or all of SLA governors 430, service governors 432, and resource governors 434 may comprise finite state machines. In general terms, a finite state machine is a data structure defined by a set of states, a set of transitions, and a current state. When one of SLA governors 430, service governors 432, or resource governors 434 receives an event, the finite state machine may transition between states and performs various actions during such transitions. This disclosure refers to a finite state machines implemented by SLA governors 430 as the SLA FSMs, to finite state machines implemented by service governors 432 as service FSMs, and to finite state machines implemented by resource governors 434 as resource FSMs.

SLA FSMs may include a set of states and a set of transitions that are different than the sets of states and sets of transitions included in service FSMs and resource FSMs. Similarly, each service FSM may include a common set of states and a common set of transitions that are different than the sets of states and sets of transitions included in service FSMs and resource FSMs. Each resource FSM may include a common set of states and a common set of transitions that are different than the sets of states and sets of transitions included in the SLA FSM and service FSMs. However, each of the SLA FSMs, each of the service FSMs, and each of the resource FSMs may have different current states.

Some states in SLA FSMs, service FSMs, and resource FSMs may be "persistent states." When a service FSM or a resource FSM transitions into a persistent state, the service FSM or resource FSM may store the state variables of the service FSM or the resource FSM to state variable repository 336. If control node 6 failed while operating, control node 6 may retrieve the state variables stored in the persistent storage medium when control node 6 resumes operations. In this way, control node 6 may resume operations in the same or about the same state as before control node 6 failed.

Administrator 12 may use spreadsheets to configure finite state machines in SLA governors 430, service governors 432, and resource governors 434. For example, administrator 12 may generate a spreadsheet that defines a finite state machine by defining each state, each transition, and each action performed during each of the transitions. Administrator 12 may then provide the spreadsheet to administrative interface module 108. Administrative interface module 108 may then use the spreadsheet to configure a finite state machine in one of SLA governors 430, service governors 432, or resource governors 434. In another example, administrator 12 may provide custom Java objects that define SLA governors 430, service governors 432, and resource governors 434.

Implementations of SLA governors 430, service governors 432, and resource governors 434 that comprise finite state machines may present several advantages. For example, finite state machines may be represented in a terse format, such as a spreadsheet, that a human can easily understand. In this example, a finite state machine represented by a spreadsheet may be automatically compiled into Java code. Administrator 12 may then use administrative interface module 108 install the Java code into control node 6. In another potential advantage, finite state machines may provide better performance than rule based implementations. This may be due to the fact that, unlike rules-based implementations, finite state machines do not need to identify particular rules prior to enabling particular actions. Moreover, development of finite state machines may be simpler because finite state machines do not require sophisticated discrimination network algorithms.

Figure 6:
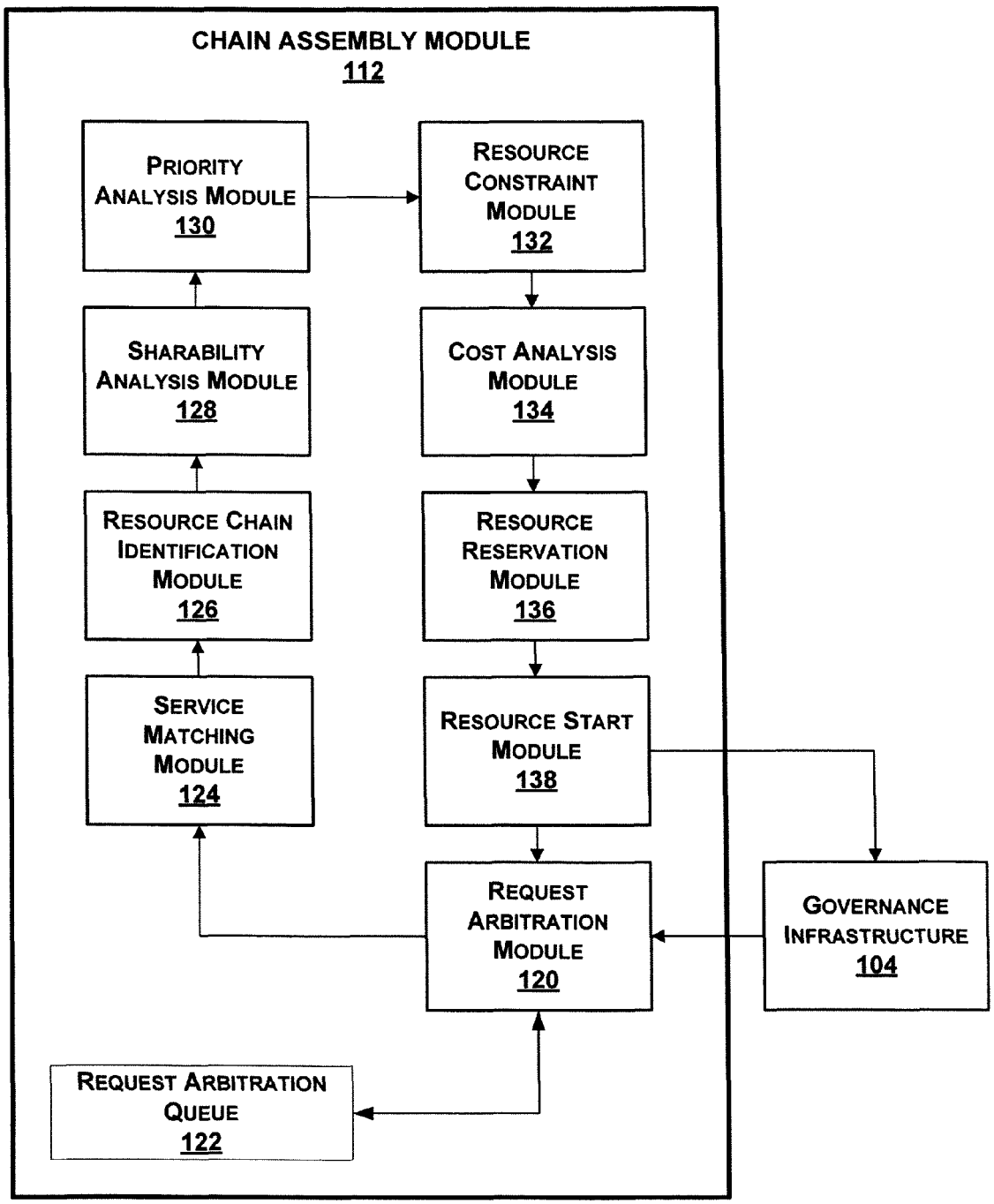
FIG. 6 is a block diagram illustrating exemplary details of a chain assembly module.

FIG. 6 is a block diagram illustrating exemplary details of chain assembly module 112. As illustrated in the example of FIG. 6, a request arbitration module 120 in chain assembly module 112 may receive a request from governance infrastructure 104 to assemble a resource chain to provide a particular top-level service. Chain assembly module 112 arbitrates requests in order to ensure that requests for higher-priority services are processed before requests for lower-priority services. For instance, when request arbitration module 120 receives the request for the service, request arbitration module 112 may access service definition repository 110 to retrieve a service definition object of the service. Request arbitration module 112 may then determine whether the service definition object specifies a priority parameter. If the service definition object specifies a priority parameter, the value of the priority parameter is the priority of the request. Otherwise, if the service definition object does not specify a priority parameter, request arbitration module 112 may treat the request as having the lowest possible priority.

After determining the priority of the request, request arbitration module 120 may determine whether the request has a higher priority level than a current priority level. If the request has a higher priority level than the current priority level, request arbitration module 120 may set the current priority level to the priority level of the request and may send the request to a service matching module 124 in order to begin processing the request. If the request has a priority level that is equal to the current priority level, request arbitration module 120 may send the request to service matching module 124 in order to begin processing the request. Otherwise, if the request has lower priority than the current priority level, request arbitration module 120 may add the request to a request arbitration queue 122.

When a resource start module 138 indicates to request arbitration module 120 that the modules of chain assembly module 112 have finished processing a request, request arbitration module 120 may determine whether a priority level of request that is currently being processed is greater than a highest-priority request in request arbitration queue 122. If there is a request that is currently being processed that has higher priority than the highest-priority request in request arbitration queue 122, request arbitration module 120 may not perform any action. However, if the highest-priority request in request arbitration queue 122 is has a higher priority than a request that is currently being processed or has equal priority as a request that is currently being processed, request arbitration module 120 may set the current priority level to the level of the highest-priority request in request arbitration queue 122. In addition, request arbitration module 120 may send this highest-priority request in request arbitration queue 122 to service matching module 124 to begin processing and may remove this highest-priority request from request arbitration queue 122.

When service matching module 124 receives a request for a particular top-level service from request arbitration module 120, service matching module 124 may identify one or more service chains that include top-level service. As discussed above, a "chain" is a set of elements ordered by a dependency relation. A service chain is a "chain" containing services as elements, and is ordered by the relation "resources associated with a first service can interpret resources associated with a second service."

In order to identify service chains that include the top-level service, service matching module 124 may retrieve a service definition object of the top-level service from service definition repository 110. In order to implement this operation, service matching module 124 may employ an example recursive operation discussed in detail with regards to FIG. 8 below. After service matching module 124 identifies the set of service chains, service matching module 124 may provide these service chains to a resource chain identification module 126.

When resource chain identification module 126 receives a set of service chains, resource chain identification module 126 may identify one or more candidate resource chains for each of the service chains. As discussed above, a resource chain is a "chain" containing resources as elements, and is ordered by the relation "a first resource interprets a second resource." In order to identify candidate resource chains for the service chains, resource chain identification module 126 may use the example operations discussed in detail with regards to FIGS. 7 and 8 below. Some resources may be created as required. For instance, a copy of a software application may be created as required. The candidate resource chains identified by resource chain identification module 126 may include resources that have not yet been created. After resource chain identification module 126 identifies a set of candidate resource chains, resource chain identification module 126 may provide these candidate resource chains to a shareability analysis module 128.

Shareability analysis module 128 begins a process of sorting out unsuitable candidate resource chains in order to identify a single resource chain. In particular, shareability analysis module 128 may, identify and discard candidate resource chains that do not meet the sharing requirements for the services with which resources in the resource chains are associated. In order to identify and discard such candidate resource chains, shareability analysis module 128 may, for each resource in the candidate resource chains, identify a service with which the resource is associated. Shareability analysis module 128 may then retrieve from service definition repository 110 service definition objects of the identified services. Next, for each of the retrieved service definition objects, shareability analysis module 128 may determine whether the service definition object specifies a sharing parameter. If a service definition object of a service specifies a "deny" sharing parameter, shareability analysis module 128 may discard all candidate resource chains that include resources associated with the service in which a single resource interprets two or more resources. If a service definition of a service specifies a "below" sharing parameter, shareability analysis module 128 may discard all candidate resource chains that include a resource associated with the service in which two or more resources are interpreted by the resource associated with the service. If a service definition object of a service specifies an "allow" sharing parameter, shareability analysis module 128 does not discard any candidate resource chains due to this service definition object. If a service definition object does not specify a sharing parameter, shareability analysis module 128 does not discard any candidate resource chains due to this service definition object. After shareability analysis module 128 applies this shareability analysis with each of the identified service definition objects, shareability analysis module 128 may provide the remaining candidate resource chains to a priority analysis module 130

When priority analysis module 130 receives a set of candidate resource chains, priority analysis module 130 identifies and discards candidate resource chains that would, if actually assembled, harvest resources away from resource chains that provide higher-priority services. In order to identify and discard such candidate resource chains, priority analysis module 130 may retrieve from service definition repository 110 a service definition object of the requested top-level service of the candidate resource chains. In addition, priority analysis module 130 may retrieve from resource configuration repository 118 resource status information about whether each of the resources is currently in an existing resource chain. For each resource that is currently in an existing resource chain, priority analysis module 130 may retrieve from service definition repository 110 service definition objects of top-level services of the existing resource chains. Priority analysis module 130 may then determine whether any of the service definition objects of the top-level services of the existing resource chains specify a priority parameter that is greater than a priority parameter specified by the service definition object of the requested top-level service. If a service definition object of a top-level service of one of the existing resource chains specifies a priority parameter that is greater than the priority parameter specified by the service definition object of the requested top-level service, priority analysis module 130 may discard the candidate resource chains that include these resources, unless these resources can be shared. After priority analysis module 130 applies this priority analysis to each of the candidate resource chains, priority analysis module 130 may provide the remaining candidate resource chains to a resource constraint module 132.

When resource constraint module 132 receives a set of candidate resource chains, resource constraint module 132 may identify and discard candidate resource chains that do not satisfy deployment constraints. In order to identify and discard candidate resource chains that do not satisfy deployment constraints, resource constraint module 132 may use the exemplary operation described below in regards to FIG. 11. After discarding candidate resource chains that do not satisfy deployment constraints, resource constraint module 132 may provide the remaining candidate resource chains to a cost analysis module 134.

When cost analysis module 134 receives a set of candidate resource chains, cost analysis module 134 may select the one of the candidate resource chains has the lowest assembly cost. In order to determine which one of the candidate resource chains has the lowest assembly cost, cost analysis module 134 may sort the candidate resource chains according to harvest cost, asset cost, and excess feature costs. Harvest cost is a cost associated with harvesting a resource from an existing resource chain. Asset cost is a cost associated with leftover assets used in a candidate resource chain. For example, a first resource in a candidate resource chain may interpret a second resource in the candidate resource chain. In this example, a second resource in a chain may consume 60% of an asset provided by the first resource. Thus, the remaining 40% of the asset provided by the first resource may be "wasted" because the second resource does not take full advantage of the asset provided by the first resource. Excess feature cost is associated with a percentage of attributes imported by a first resource in a candidate resource chain that are not imported by a second resource in the candidate resource chain. Cost analysis module 134 may utilize the exemplary operations in FIGS. 12 and 13 to perform this cost analysis. After identifying the one of the candidate resource chains that has the lowest assembly cost, cost analysis module 134 may provide the identified candidate resource chain to a resource reservation module 136 as the identified resource chain.

When resource reservation module 136 receives a resource chain, resource reservation module 136 may update asset consumption values of resources in the resource chain and then reserve the resources in the resource chain. In order to update asset consumption values of resources in the resource chain and then reserve the resources in the resource chain, resource reservation module 136 may use the operation described with regard to FIG. 14, below.

When resource reservation module 136 reserves a resource, resource reservation module 136 may output one or more events to the one of resource governors 434 that governs the resource. For instance, if the resource currently has a status of "allocated," resource reservation module 136 may output a "harvest" event to the resource governor because it may be necessary to harvest the resource in order to use the resource in the resource chain. If the resource currently has a status of "unallocated," resource reservation module 136 may output an "allocate" event to the resource governor. If the resource currently has a status of "stopped," "failed," "failed to stop," or "failed to start," resource reservation module 136 may output an "unallocate" event to the resource governor followed by an "allocate" event.

Furthermore, when resource reservation module 136 reserves resources in a resource chain, resource reservation module 136 may configure ones of resource governors 434 that govern the resources to act as a chain of resource governors. For example, a first resource governor may govern a first resource in the resource chain and a second resource governor may govern a second resource in the resource chain, the first resource may provide a service to the second resource. In this example, resource reservation module 136 may configure the first resource governor to receive events propagated by the second resource governor and may configure the second resource governor to subscribe to events published by the first resource governor.

After updating asset consumption values of resources in the resource chain and reserving the resources in the resource chain, resource reservation module 136 may cause resource start module 138 to start the top resource of the resource chain.

Figure 7:
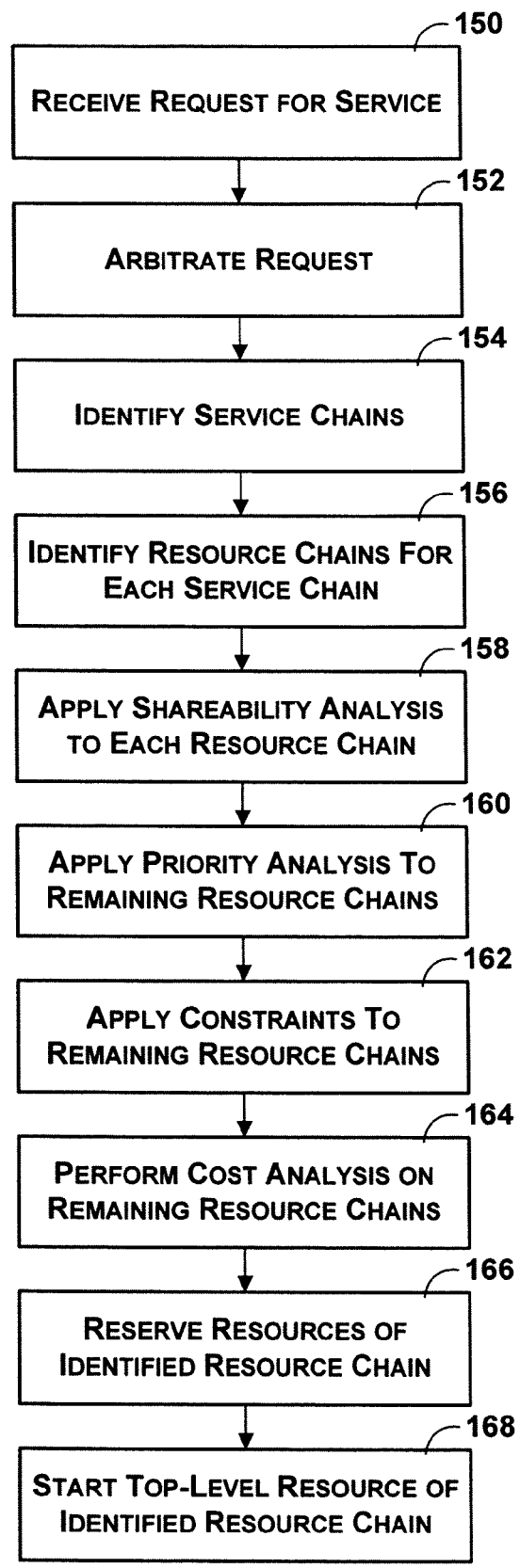
FIG. 7 is a flowchart illustrating an exemplary high-level operation of the chain assembly module.

FIG. 7 is a flowchart illustrating an exemplary high-level operation of chain assembly module 112. Initially, chain assembly module 112 receives a request to assemble a resource chain that provides a particular top-level service (150). When chain assembly module 112 receives this request, request arbitration module 120 may arbitrate the request in order to ensure that requests associated with higher-priority services are processed first (152).

After request arbitration module 120 determines that the request may be processed, service matching module 124 may identify a set of service chains that provide the requested service (154). Resource chain identification module 126 may then identify one or more resource chains for each of the service chains identified by service matching module 124 (156).

When resource chain identification module 126 identifies the resource chains, resource chain identification module 126 may provide the resource chains to shareability analysis module 128. Shareability analysis module 128 may then apply a shareability analysis to each of the resource chains (158). When shareability analysis module 128 applies a shareability analysis to the resource chains, shareability analysis module 128 may discard resource chains that do not satisfy the shareability requirements of the requested service.

Next, priority analysis module 130 may apply a priority analysis to the remaining resource chains (160). When priority analysis module 130 applies a priority analysis to the resource chains, priority analysis module 130 may discard chains that include resources in existing resource chains that cannot be harvested because the existing resource chains provide a top-level service with higher priority than the requested service.

Resource constraint module 132 may then apply constraints to the remaining resource chains (162). After resource constraint module 132 applies constraints to the remaining resource chains, cost analysis module 134 may identify a single one of the remaining resource chains that has a lowest assembly cost (164). When cost analysis module 134 identifies the resource chain that has the lowest assembly cost, resource reservation module 136 may reserve the resources of this resource chain (166). Resource start module 138 may then instruct the top-level resource of the resource chain to start operating and may inform request arbitration module 120 that the resource chain assembly operation is complete (168).

Figure 8:
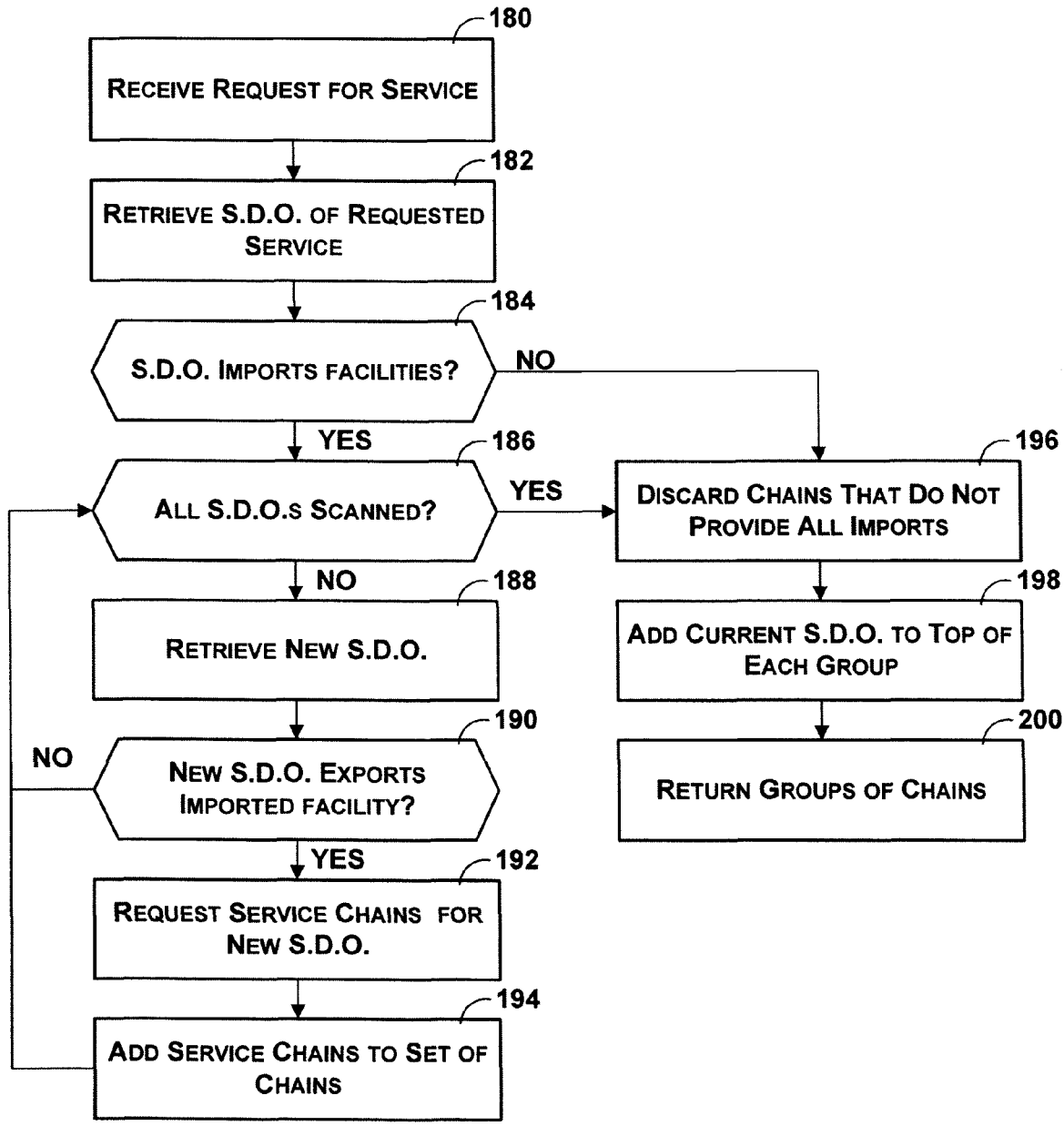
FIG. 8 is a flowchart illustrating an exemplary operation of a service matching module.

FIG. 8 is a flowchart illustrating an exemplary operation of service matching module 124. Initially, service matching module 124 may receive a request to identify service chains for a particular service (180). When service matching module 124 receives this request, service matching module 124 may retrieve from service definition repository 110 a service definition object (abbreviated S.D.O. in FIG. 8) of the requested service (182). After retrieving the service definition object of the requested service, service matching module 124 may determine whether the service definition object specifies that resources associated with the requested service import any facilities (184).

If service matching module 124 determines that the service definition object specifies that resources associated with the requested service import one or more facilities ("YES" of 184), service matching module 124 may determine whether service matching module 124 has already scanned all other service definition objects in service definition repository 110 (186). If service matching module 124 has not already scanned all of the other service definition objects in service definition repository 110 ("NO" of 186), service matching module 124 may retrieve a new unscanned service definition object from service definition repository 110 (188). Next, service matching module 124 may determine whether the new service definition object exports a facility that the requested facility imports (190). If the new service definition object does not export any facility that is imported by the requested service ("NO" of 190), service matching module 124 may loop back and again determine whether service matching module 124 has scanned all other service definition objects in service definition repository 110 (186).

On the other hand, if the new service definition object exports one or more facilities that are imported by the requested service ("YES" of 190), service matching module 124 may request service chains for the service defined by the new service definition object (192). This may be a recursive method invocation. Thus, a new operation may begin at step (180) with the service defined by the new service definition object as the requested service. After requesting the service chains for the service defined by the new service definition object, service matching module 124 may add the service chains to a set of service chains (194). Service matching module 124 may then loop back and again determine whether service matching module 124 has scanned every service definition object in service definition repository 110 (186).

If the requested service does not import any facilities ("NO" of 184) or if service matching module 124 has scanned every service definition object in service definition repository 110 ("YES" of 186), service matching module 124 may discard service chains that do not provide all of the facilities that the requested service provides (196). For example, the requested service may import "attribute (A)" and "attribute (B)". In this example, if resources associated with a first service at the top of a first service chain export "attribute (A)" and "attribute (B)", service matching module 124 does not discard the first service chain. Furthermore, if resources associated with a second service at the top of a second service chain export "attribute (A)" and resource associated with a third service in the second service chain export "attribute (B)", service matching module 124 does not discard the service chain because facilities exported by lower-level services in a service chain are generally available to all resources associated with all services above the lower-level service. In other words, a service generally exports all facilities exported by resources associated with lower-level services. However, if the service definition object of the second service specifies that "attribute (B)" is blocked, then the second service does not export "attribute (B)". For this reason, service matching module 124 may discard this service chain.

After discarding service chains that do not export all facilities imported by the requested service, service matching module 124 may add the current service to the top of each of the remaining service chains (198). Service matching module 124 may then return the service chains (200).

Figure 9:
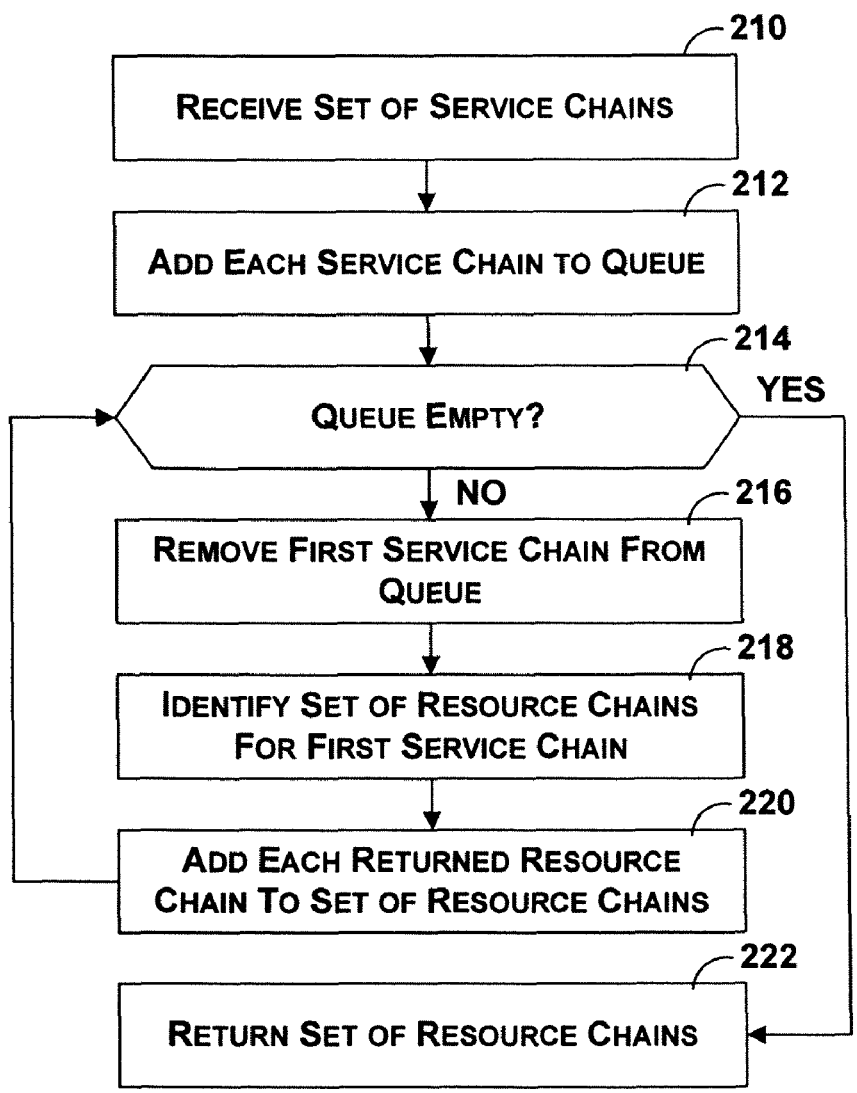
FIG. 9 is a flowchart illustrating an exemplary operation of a resource chain identification module.

FIG. 9 is a flowchart illustrating an exemplary operation of resource chain identification module 126. Initially, resource chain identification module 126 may receive a set of service chains from service matching module 124 (210). After receiving the set of service chains, resource chain identification module 126 may add each of the service chains to a queue (212). Resource chain identification module 126 may then determine whether the queue is empty (214).

If the queue is not empty ("NO" of 214), resource chain identification module 126 may remove a first service chain from the queue (216). Next, resource chain identification module 126 may identify a set of resource chains for the first service chain (218). An example operation by which resource chain identification module 126 identifies a set of resource chains for a service chain is describe with regard to FIG. 10, below. After identifying a set of resource chains for the first service chain, resource chain identification module 126 may add each of these resource chains to a set of resource chains (220). Resource chain identification module 126 may then loop back and again determine whether the queue is empty (214).

If the queue is empty ("YES" of 214), resource chain identification module 126 may return the set of resource chains (222). For example, resource chain identification module 126 may provide the set of resource chains to shareability analysis module 126.

Figure 10:
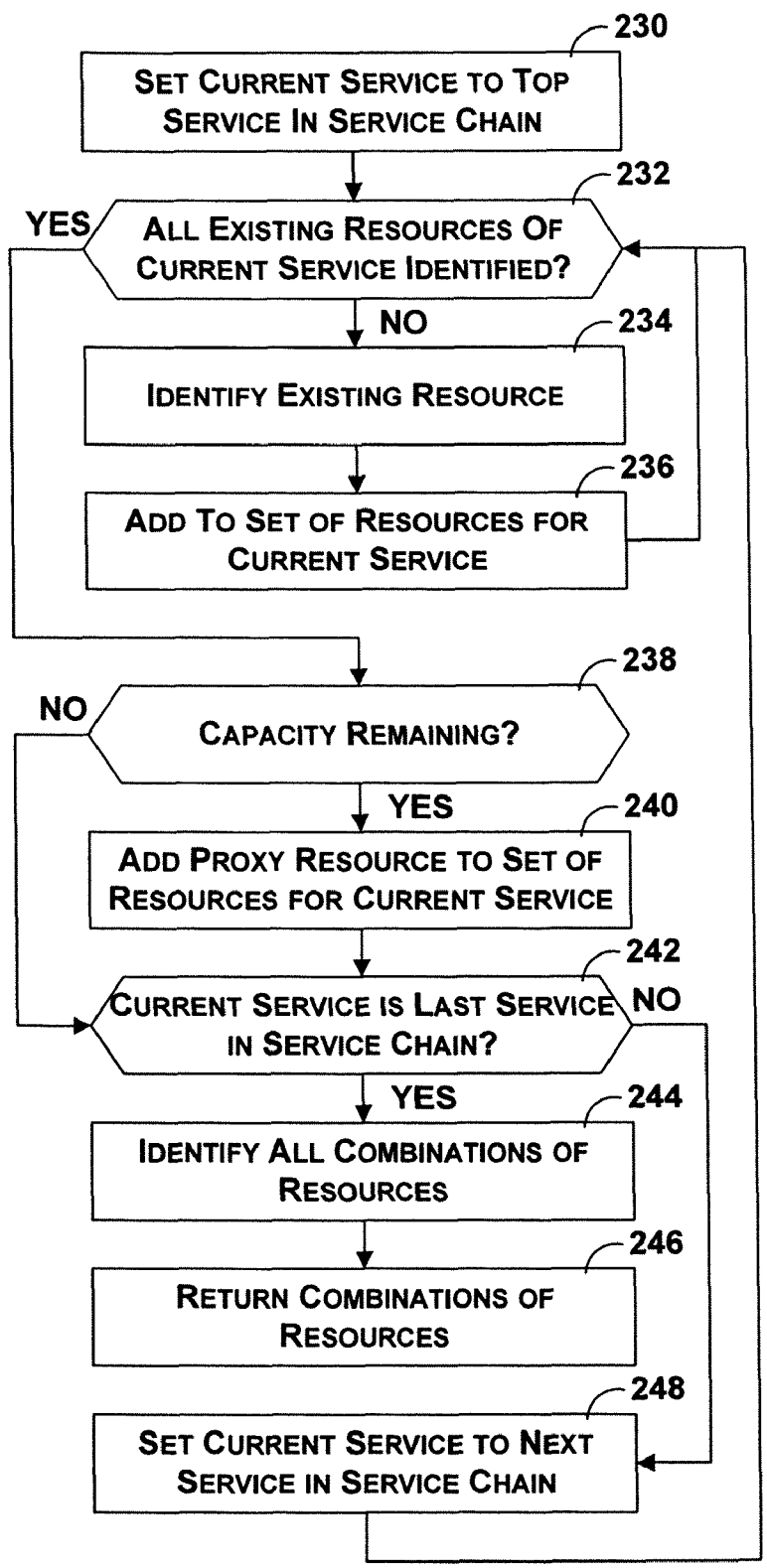
FIG. 10 is a flowchart that illustrates an example operation by which the resource chain identification module may identify a set of candidate resource chains for a service chain.

FIG. 10 is a flowchart that illustrates an example operation by which resource chain identification module 126 may identify a set of resource chains for a service chain. Initially, resource chain identification module 126 may set a current service indicator to indicate the top service in the service chain (230). Next, resource chain identification module 126 may determine whether resource chain identification module 126 has identified all currently existing resources of the current service (i.e., the service indicated by the current service indicator) (232).

If resource chain identification module 126 has not identified all currently existing resources of the current service ("NO" of 232), resource chain identification module 126 may identify an existing resource of the current service (234). In order to identify an existing resource, resource chain identification module 126 may access resource status data stored in resource configuration repository 118. As described below, cost analysis module 134 may take other statuses of resources into account when calculating costs associated with various resource chains. For instance, because it may be time consuming to stop a resource that is currently operating, a resource chain that includes a resource that has a status of "started" may be more costly than a resource chain that includes a resource that has a status of "available."

After identifying an existing resource, resource chain identification module 126 may then add the identified resource to a set of resources for the current service (236). Resource chain identification module 126 may then loop back and again determine whether resource chain identification module 126 has identified all existing resources of the current service (232). In this way, resource chain identification module 126 adds currently existing resources to a set of resources associated with the current service.

If resource chain identification module 126 has identified all currently existing resources of the current service ("YES" of 232), resource chain identification module 126 may determine whether the current service has the capacity to create one or more new resources (238). For instance, a service action module associated with the current service may provide a method "hasResourceCapacity ( )" that, when invoked, returns whether new resources can be created for the current service. If the current service has the capacity to create one or more new resources ("YES" of 238), resource chain identification module 126 may add a "proxy" resource to the set of resources for the current service (240). Resource chain identification module 126 does not, at this point, actually create this "proxy" resource. Rather, this resource is a "proxy" resource because it stands in place of a resource that has yet to be created.

After resource chain identification module 126 adds the "proxy" resource to the set of resources for the current service or after resource chain identification module 126 determines that the current service has no capacity to create a new resource ("NO" of 238), resource chain identification module 126 may determine whether the current service is the last service in the service chain (242).

If the current service is not the last service in the service chain ("NO" of 242), resource chain identification module 126 may set the current service indicator to the service in the service chain that interprets the service indicated by the current service indicator (i.e., next lower service in the service chain) (248). Resource chain identification module 126 may then loop back and again determine whether resource chain identification module 126 has identified all existing resources of the new current service (232). In this way, resource chain identification module 126 constructs a set of resources for each service in the service chain.

If the current service is the last service in the service chain ("YES" of 242), resource chain identification module 126 may identify all combinations of resources in which one resource is selected from each of the sets of resources (246). For example, the service chain may include a first service, a second service, and a third service. In this example, resource chain identification module 126 may have identified resources A and B for the first service, resources C and D for the second service, and resources E and F for the third service. Using these resources, resource chain identification module 126 may identify the following combinations of resources: A-C-E, A-C-F, A-D-E, A-D-F, B-C-E, B-C-F, B-D-E, and B-D-F. After identifying the combinations of resources, resource chain identification module 126 may return these combinations of resources as resource chains (246).

Figure 11:
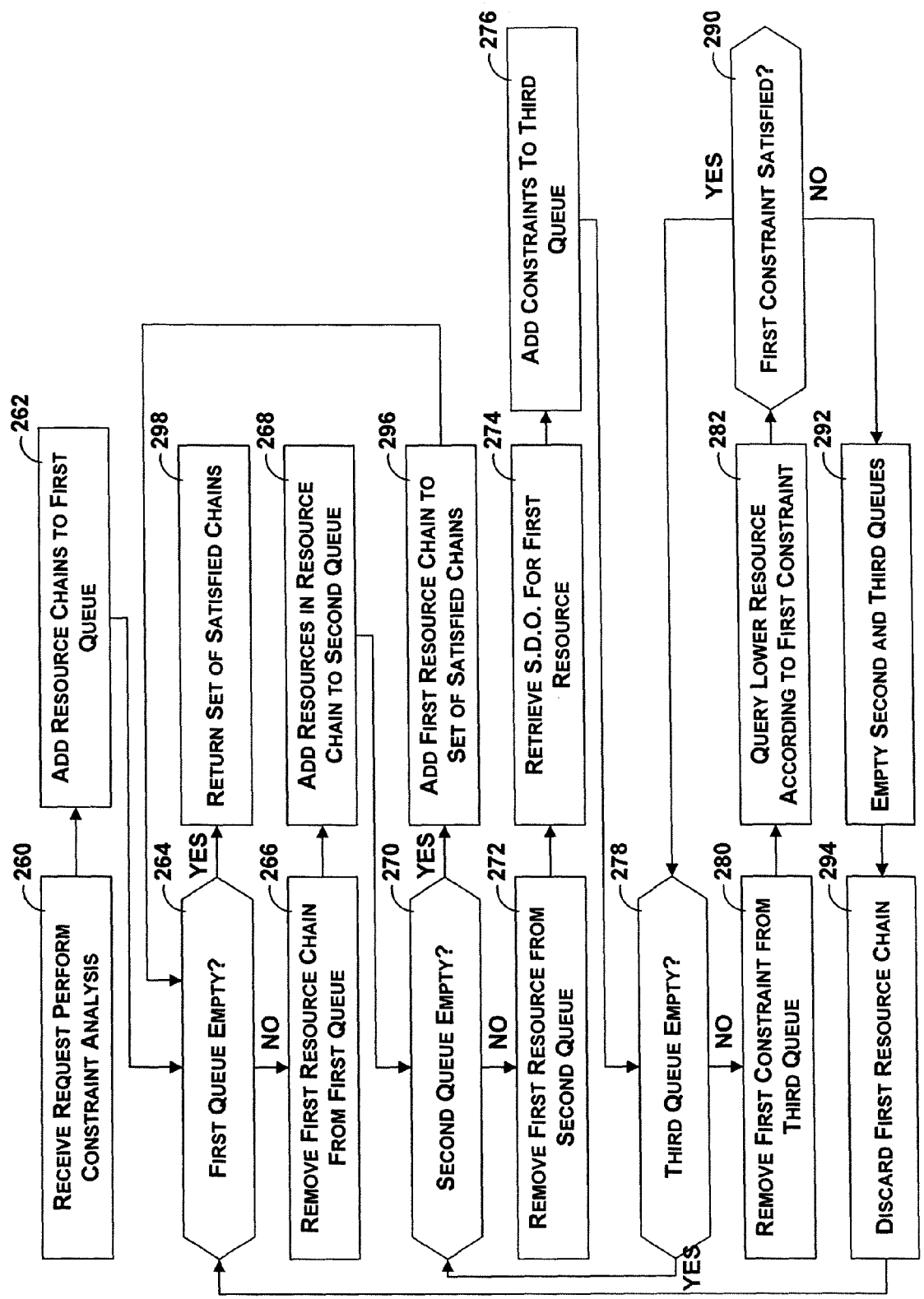
FIG. 11 is a flowchart illustrating an exemplary operation of a resource constraint module.

FIG. 11 is a flowchart illustrating an exemplary operation of resource constraint module 132. Initially, resource constraint module 132 may receive a request to perform a constraint analysis on a set of resource chains (260). When resource constraint module 132 receives this request, resource constraint module 132 may add each of the resource chains to a first queue (262). Resource constraint module 132 may then determine whether the first queue is empty (264).

If resource constraint module 132 determines that the first queue is not empty ("NO" of 264), resource constraint module 132 may remove a first resource chain from the first queue (266). Next, resource constraint module 132 may add each resource in the first resource chain to a second queue (268). Resource constraint module 132 may then determine whether the second queue is empty (270).

If resource constraint module 132 determines that the second queue is not empty ("NO" of 270), resource constraint module 132 may remove a first resource from the second queue (272). Next, resource constraint module 132 may retrieve from service definition repository 110 a service definition object of a service with which the first resource is associated (274). Resource constraint module 132 may parse the retrieved service definition object and add each of the constraints specified by the retrieved service definition object to a third queue (276). In addition, resource constraint module 132 may add to the third queue assetConsumption parameters specified in the retrieved service definition object. Resource constraint module 132 may add the assetConsumption parameters because assetConsumption parameters may act as implicit constraints. Resource constraint module 132 may then determine whether the third queue is empty (278).

If the third queue is not empty ("NO" of 278), resource constraint module 132 may remove a first constraint from the third queue (280). Resource constraint module 132 may then query the resources below the first resource according to the first constraint (282). For example, the first constraint may specify "collage/base:physicalMemory >=6.0". In this example, resource constraint module 132 may identify a resource in the first resource chain that exports the asset "collage/base:physicalMemory". Resource constraint module 132 may then invoke a method of a resource governor associated with the identified resource (e.g., "double getAsset ("physicalMemory")"). This method may return a value that resource constraint module 132 may then evaluate with the expression in the first constraint. After resource constraint module 132 queries the resources below the first resource according to the first constraint, resource constraint module 132 may use a response to the query to determine whether the first constraint is satisfied (290).

If the first constraint is not satisfied ("NO" of 290), resource constraint module 132 may empty the second queue and the queue (292). Resource constraint module 132 may then discard the first resource chain because a constraint of the first resource chain is not satisfied (294). Next, resource constraint module 132 may loop back and determine whether the first queue is empty (264). If the first constraint is satisfied ("YES" of 290), resource constraint module 132 may loop back and again determine whether the third queue is empty (278). In this way, resource constraint module 132 determines whether all of the constraints of the first resource are satisfied.

If resource constraint module 132 determines that the third queue is empty ("YES" of 278), resource constraint module 132 may loop back and again determine whether the second queue is empty (270). If resource constraint module 132 determines that the second queue is empty ("YES" of 270), resource constraint module 132 may add the first resource chain to a set of constraint-satisfied resource chains (296). After adding the first resource chain to the set of constraint-satisfied resource chains, resource constraint module 132 may loop back and again determine whether the first queue is empty (264). If the first queue is empty ("YES" of 264), resource constraint module 132 may return the set of constraint-satisfied resource chains (298).

Figure 12:
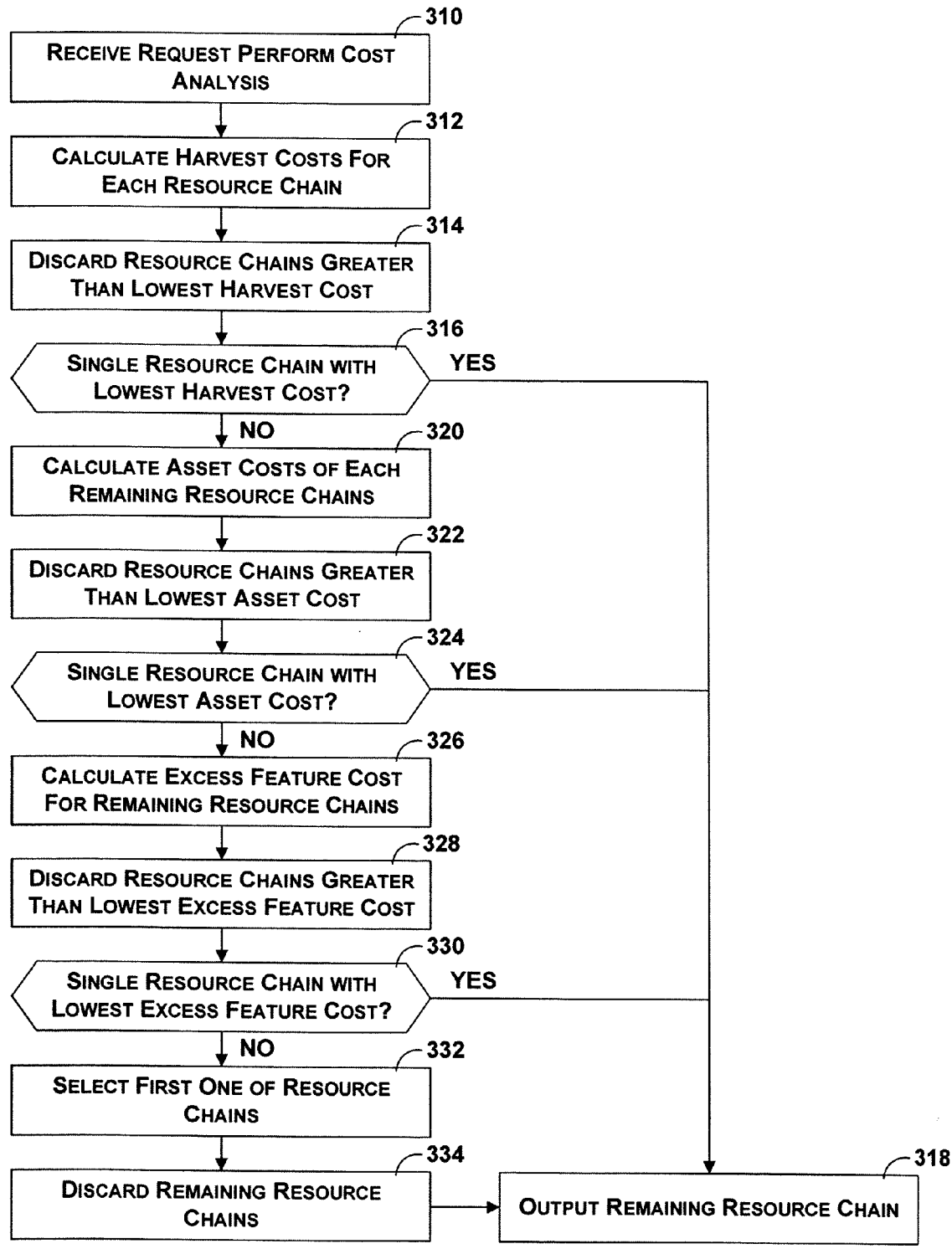
FIG. 12 is a flowchart illustrating an exemplary operation of a cost analysis module.

FIG. 12 is a flowchart illustrating an exemplary operation of cost analysis module 134. Initially, cost analysis module 134 receives a request to perform a cost analysis on a set of resource chains (310). When cost analysis module 134 receives this request, cost analysis module 134 may calculate a harvest cost for each of the resource chains (312). As discussed above, harvest cost is a cost associated with harvesting a resource from an existing resource chain. An exemplary operation by which cost analysis module 134 may calculate a harvest cost for each of the resource chains is provided below with regard to FIG. 13. After calculating a harvest cost for each of the resource chains, cost analysis module 134 may discard any resource chains that have harvest costs that are greater than the lowest calculated harvest cost (314). Cost analysis module 134 may then determine whether only a single resource chain remains after cost analysis module 134 has discarded the resource chains that have harvest costs that are greater than the lowest calculated harvest cost (316). If only a single resource chain remains ("YES" of 316) cost analysis module 134 may output this remaining resource chain (318).

On the other hand, if more than one resource chain remains after cost analysis module 134 has discarded the resource chains that have harvest costs that are greater than the lowest calculated harvest cost ("NO" of 316), cost analysis module 134 may calculate asset costs for the remaining resource chains (320). Asset cost is a cost associated with leftover assets used in a resource chain. After calculating an asset cost for each of the resource chains, cost analysis module 134 may discard any resource chains that have asset costs that are greater than the lowest calculated asset cost (322). Cost analysis module 134 may then determine whether only a single resource chain remains after cost analysis module 134 has discarded the resource chains that have asset costs that are greater than the lowest calculated asset cost (324). If only a single resource chain remains ("YES" of 324), cost analysis module 134 may output this remaining resource chain (318).

If more than one resource chain remains after cost analysis module 134 has discarded the resource chains that have harvest costs that are greater than the lowest calculated harvest cost ("NO" of 324), cost analysis module 134 may calculate excess feature costs for the remaining resource chains (326). Excess feature cost is associated with a percentage of attributes imported by a first resource in a resource chain that are not imported by a second resource in the resource chain. After calculating an excess feature cost for each of the resource chains, cost analysis module 134 may discard any resource chains that have excess feature costs that are greater than the lowest calculated excess feature cost (328). Cost analysis module 134 may then determine whether only a single resource chain remains after cost analysis module 134 has discarded the resource chains that have excess feature costs that are greater than the lowest calculated excess feature cost (330). If only a single resource chain remains ("YES" of 330), cost analysis module 134 may output this remaining resource chain (318).

If more than one resource chain remains after cost analysis module 134 has discarded the resource chains that have excess feature costs that are greater than the lowest calculated excess feature cost ("NO" of 330), cost analysis module 134 may select a first one of the remaining resource chains (332). Next, cost analysis module 134 may discard all resource chains other than the selected resource chain (334). Cost analysis module 134 may then output this remaining resource chain (318).

Figure 13:
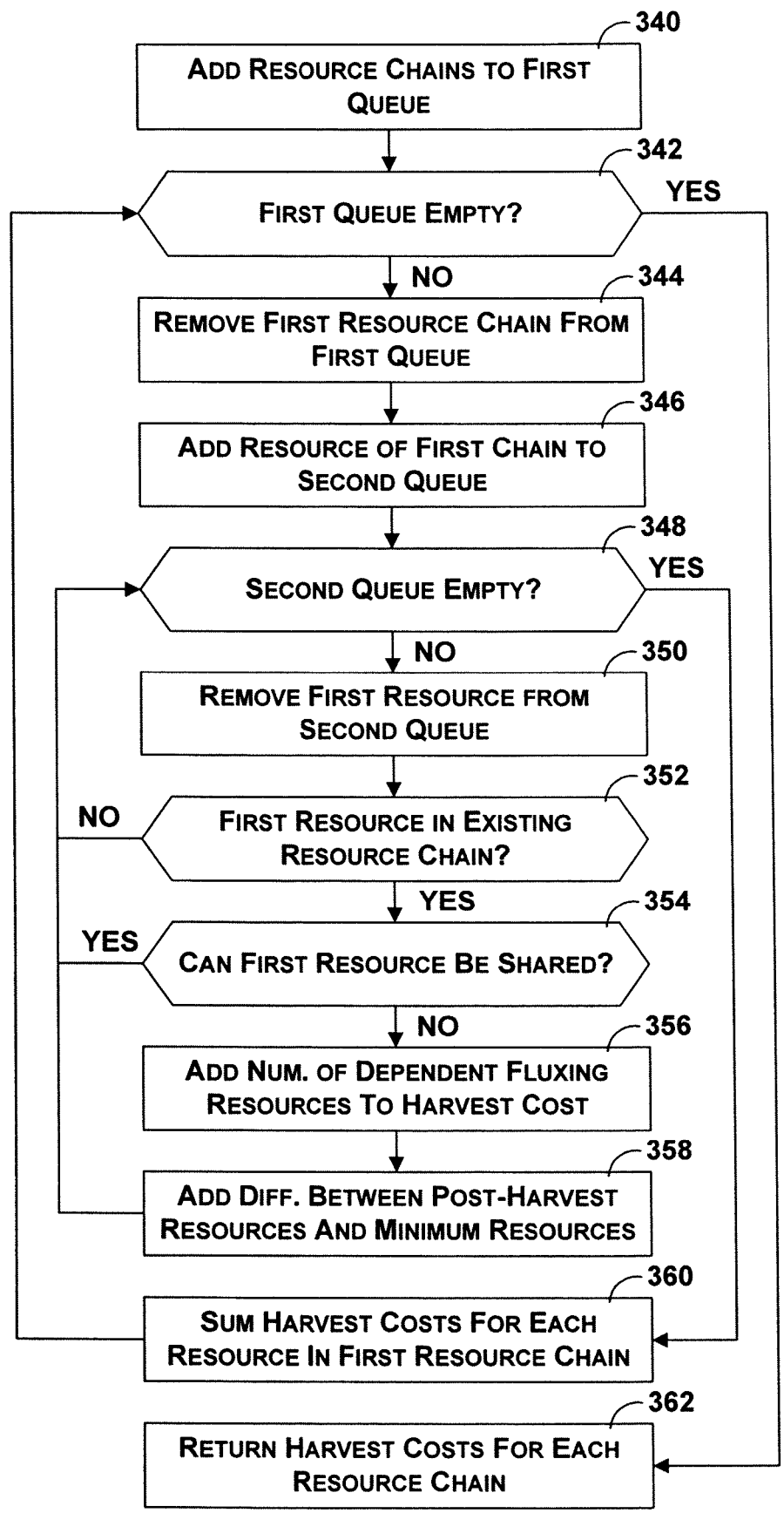
FIG. 13 is a flowchart illustrating an exemplary operation of the cost analysis module to calculate harvest costs for a set of candidate resource chains.

FIG. 13 is a flowchart illustrating an exemplary operation of cost analysis module 134 to calculate harvest costs for a set of resource chains. Initially, cost analysis module 134 may add each of the resource chains to a first queue (340). Next, cost analysis module 134 may determine whether the first queue is empty (342). If the first queue is not empty ("NO" of 342), cost analysis module 134 may remove a first resource chain from the first queue (344). Cost analysis module 134 may then add each resource in the first resource chain to a second queue (346). After adding each resource in the first resource chain to the second queue, cost analysis module 134 may determine whether the second queue is empty (348).

If the second queue is not empty ("NO" of 348), cost analysis module 134 may remove a first resource from the second queue (350). After removing the first resource from the second queue, cost analysis module 134 may determine whether the first resource is already in an existing resource chain (352). Cost analysis module 134 may use resource status information stored in resource configuration module 118 to determine whether the resource is already in an existing resource chain. For instance, if a resource has a status of "started," "allocated," or "stopped", the resource is already in an existing resource chain. If cost analysis module 134 determines that the first resource is not already in an existing resource chain ("NO" of 352), there is no harvest cost for using the first resource. For this reason, cost analysis module 134 may loop back and again determine whether the second queue is empty (348).

On the other hand, if cost analysis module 134 determines that the first resource is in an existing resource chain ("YES" of 352), cost analysis module 134 may determine whether the first resource can be shared with the existing resource chain (354). For example, to determine whether the first resource can be shared with the existing resource chain, cost analysis module 134 may determine whether each resource in the existing resource chain below the first resource is the same as each resource in the first resource chain below the first resource. If this is true, cost analysis module 134 may analyze whether sharing parameters of services with which the resource in the existing resource chain are associated allow such a sharing. If each resource in the existing resource chain below the first resource is not the same as each resource in the first resource chain below the first resource or sharing parameters of services with which the resource in the existing resource chain are associated do not allow such a sharing, the first resource would have to be harvested in order for the first resource to be used in the first resource chain. If cost analysis module 134 determines that the first resource can be shared ("YES" of 354), there is no harvest cost associated with the first resource. For this reason, cost analysis module 134 may loop back and again determine whether the second queue is empty (348).

If cost analysis module 134 determines that the first resource cannot be shared ("NO" of 354), the first resource would have to be harvested in order to use the first resource chain. Therefore, there may be a harvest cost associated with the first resource. To calculate the harvest cost associated with the first resource, cost analysis module 134 may add to a harvest cost associated with the first resource a number of flux resources in the existing resource chain (356). For example, the first resource may be an interpreting resource in the middle of the existing resource chain and the existing resource chain may support three flux resources. Thus, by harvesting the first resource, operations of these three flux resources would have to cease. In this example, cost analysis module 134 may add a different value depending on the status of the first resource. For instance, if the first resource has a status of "allocated" or "stopped", the first resource has not yet started operating or has stopped operating without error. Consequently, it may be comparatively cheap to harvest the first resource and deallocate dependent resources. For this reason, cost analysis module 134 may add "3" to the harvest cost associated with the first resource. However, if the first resource has a status of "started", the first resource has started operating. Because it may be time consuming to start resources that have already started, it may be comparatively expensive to harvest the first resource and deallocate dependent resources. For this reason, cost analysis module 134 may add "6" to the harvest cost associated with the first resource.

Next, cost analysis module 134 adds a value to the harvest cost associated with the first resource that accounts for costs associated with restoring minimum levels of services that would be disrupted by harvesting the first resource (358). For example, cost analysis module 134 may identify the services of each of the flux resources in the existing resource chain. Cost analysis module 134 may then identify a minimum numbers of resources to operate in distributed computing system 2 for each of the services (e.g., by reading the SLA min parameters in the service definition objects of these services). Cost analysis module 134 may then, for each of the services, determine the number of resources that would be required to restore distributed computing system 2 to the minimum number of resource for the service if the first resource were to be harvested. Cost analysis module 134 may add these numbers to the harvest cost associated with the first resource. Cost analysis 134 may then loop back and again determine whether the second queue is empty (348).

If cost analysis module 134 determines that the second queue is empty ("YES" of 348), cost analysis module 134 may sum up the harvest costs associated with each of the resources in the first resource chain in order to calculate a harvest cost for the first resource chain (360). Cost analysis module 134 may then loop back and determine whether the first queue is empty (342). If the first queue is empty ("YES" of 342), cost analysis module 134 may return the harvest costs of the resource chains (362).

Figure 14:
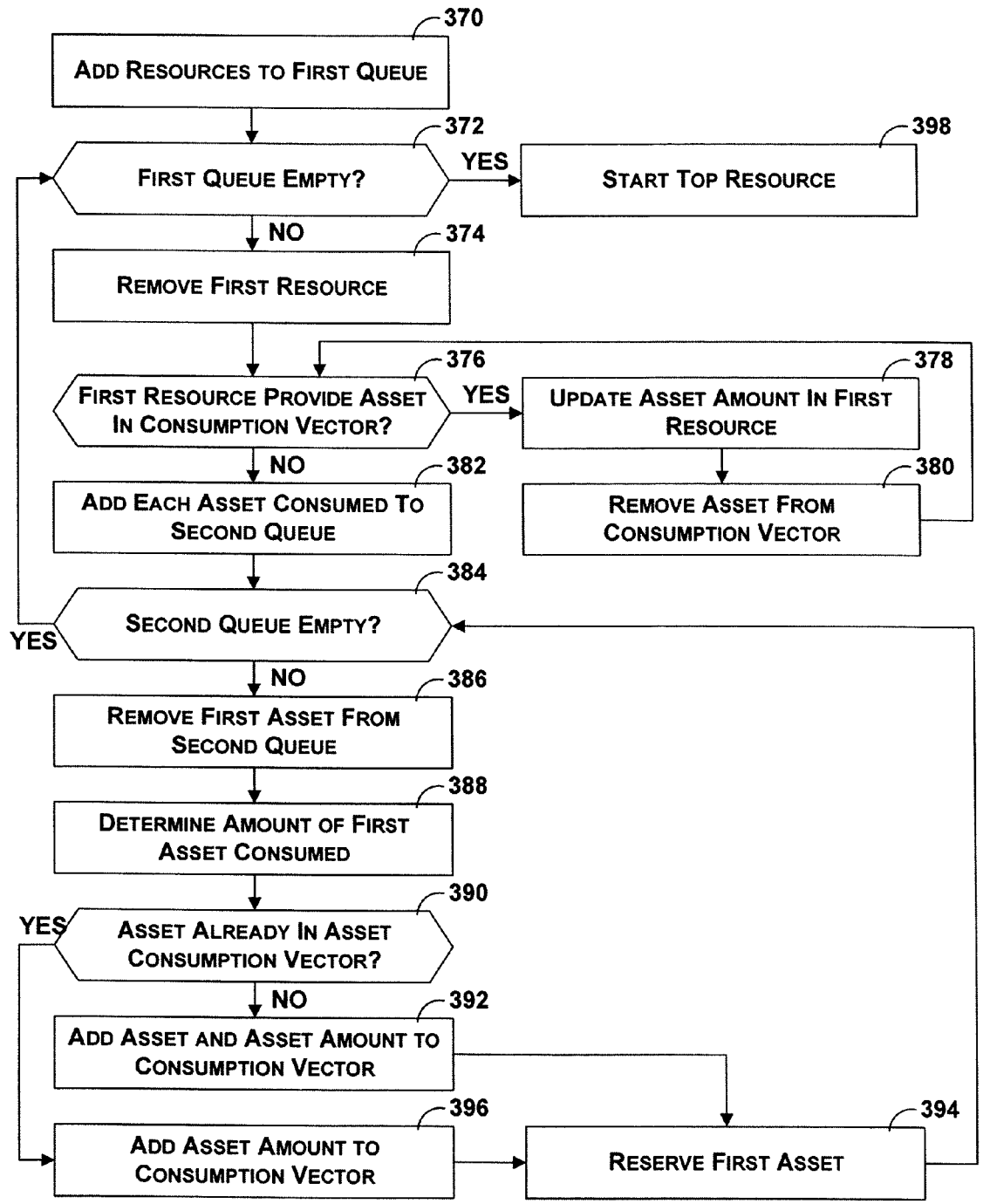
FIG. 14 is a flowchart illustrating an exemplary operation of a resource reservation module.

FIG. 14 is a flowchart illustrating an exemplary operation of resource reservation module 136. Initially, resource reservation module 136 may add each resource in a resource chain to a first queue (370). When resource reservation module 136 adds the resources to the first queue, resource reservation module 136 may add the resources in such a way that the top-most resource is at the front of the queue. After adding the resources to the first queue, resource reservation module 136 may determine whether the first queue is empty (372).

If the first queue is not empty ("NO" of 372), resource reservation module 136 may remove a first resource from the first queue (374). Resource reservation module 136 may then determine whether the first resource provides an asset specified in an asset consumption vector (376). The asset consumption vector may be a data structure that may store asset consumption totals for various assets.

If the first resource provides an asset in the asset consumption vector ("YES" of 376), resource reservation module 136 may update the remaining asset amount for the asset in the first resource (378). For example, the first resource may provide the asset "collage/base:physicalMemory" and the asset consumption vector may include the value "16" for the asset "collage/base:physicalmemory". In this example, resource reservation module 136 applies a "consumeAsset" method. Typically, the "consumeAsset" method subtracts the value "16" from the asset "collage/base:physicalMemory". Thus, if the first resource originally had "40" of asset "collage/base: physicalmemory" remaining, the first resource now has "24" of the asset "collage/base:physicalMemory" remaining. After updating the remaining asset amount, resource reservation module 136 may remove the asset from the asset consumption vector (380). Next, resource reservation module 136 may loop back and again determine whether the asset consumption vector includes any asset that are provided by the first resource (376).

If the asset consumption vector does not include any assets provided by the first resource ("NO" of 376), resource reservation module 136 may add each asset consumed by the first resource to a second queue (382). Resource reservation module 136 may then determine whether the second queue is empty (384).

If the second queue is not empty ("NO" of 384), resource reservation module 136 may remove a first asset from the second queue (386). Resource reservation module 136 may then determine how much the first resource consumes of the first asset (388). Resource reservation module 136 may determine how much the first resource consumes of the first asset by invoking a method of the resource action module associated with the first resource. After determining how much the first resource consumes of the first asset, resource reservation module 136 may determine whether there is an entry in the asset consumption vector for the first asset (390).

If there is not an entry in the asset consumption vector for the first asset ("NO" of 390), resource reservation module 136 may add the asset and the amount consumed to the asset consumption vector (392). After adding the asset and the amount consumed to the asset consumption vector, resource reservation module 136 may reserve the first resource (394). Resource reservation module 136 may then loop back and determine whether the second queue is empty (384).

On the other hand if there is already and entry in the asset consumption vector for the first asset ("YES" of 390), resource reservation module 136 may add the amount consumed to the amount consumed specified by this entry (396). After adding the amount consumed to entry in the asset consumption vector, resource reservation module 136 may reserve the first resource (394). Resource reservation module 136 may then loop back and determine whether the second queue is empty (384).

If the second queue is empty ("YES" of 384), resource reservation module 136 may loop back and again determine whether the first queue is empty (372). If the first queue is empty ("YES" of 372), resource reservation module 136 may cause resource start module 138 to start the top-level resource of the resource chain (398).

Figure 15:
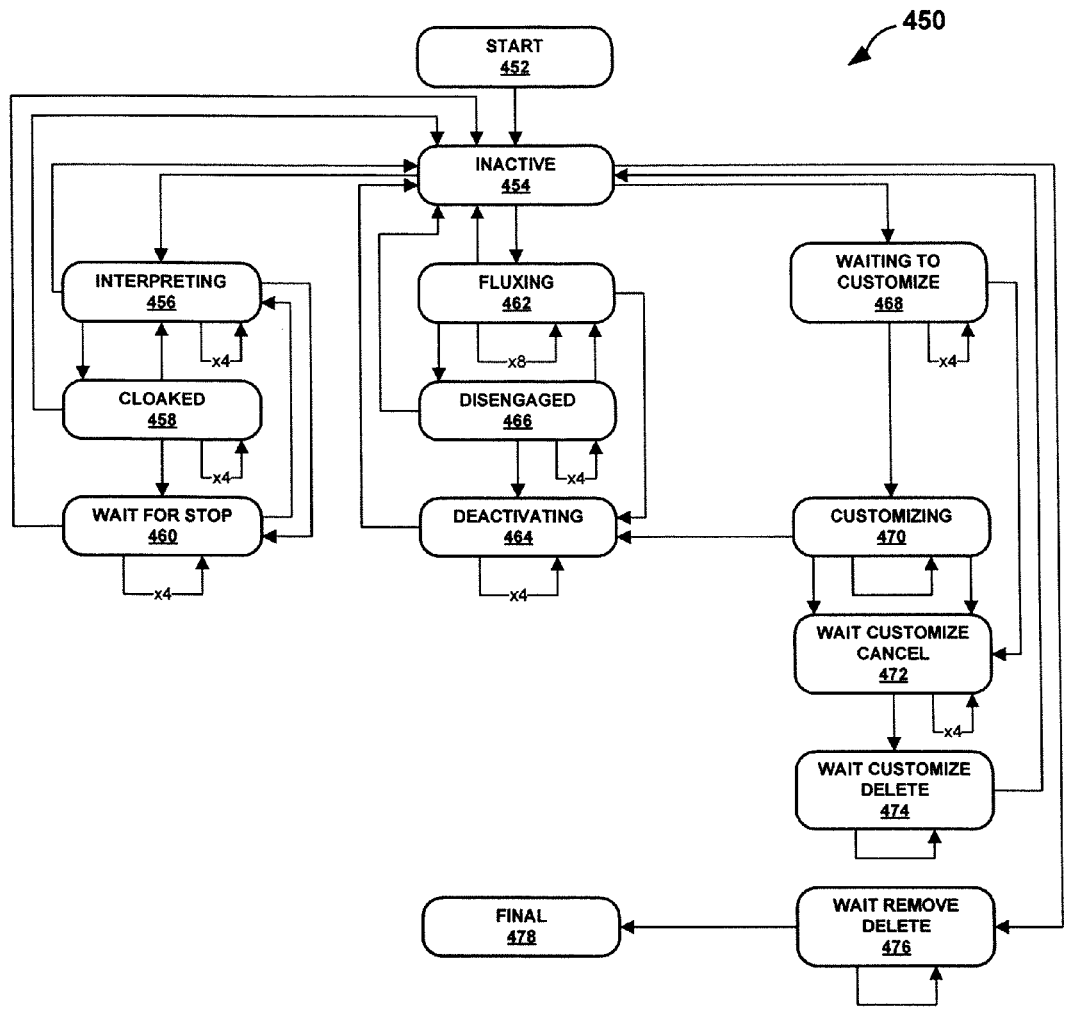
FIG. 15 is a block diagram illustrating an exemplary finite state machine that implements the functionality of a service governor.

FIG. 15 is a block diagram illustrating an exemplary finite state machine that implements the functionality of a service governor 450. Service governor 450 includes fourteen states and sixty-six transitions. For purposes of clarity, the labels on the transitions have been omitted from FIG. 15. Furthermore, if service governor 450 receives an event for which this disclosure provides no description, it may be assumed that an error has occurred.

A "start" state 452 is an initial state of service governor 450. Service governor 450 transitions from "start" state 452 to an "inactive" state 454 when service governor 450 receives a "ServiceConfigured" service event. Service governor 450 may transition to several states from "inactive" state 454.

Service governor 450 transitions from "inactive" state 454 to an "interpreting" state 456 when service governor 450 receives an "activate interpretation" event from administrative interface module 108. When service governor 450 performs this transition, service governor 450 sets a "findable" variable to "true." When the value "findable" variable of service governor 450 is true, chain assembly module 112 may include the service governed by service governor 450 in service chains.

When service governor 450 is in "interpreting" state 456, service governor 450 may transition to a "cloaked" state 458 when service governor 450 receives a "cloak" event from administrative interface module 108. When service governor 450 performs this transition, service governor 450 sets the "findable" variable of the software object that represents service governor 450 to "false." When the value of "findable" variable of service governor 450 is false, chain assembly module 112 may not include the service governed by service governor 450 in service chains.

In addition, when service governor 450 is in "interpreting" state 456, service governor 450 may perform a transition back to "interpreting" state 456 when service governor 450 receives a "resource stopped" event, a "resource started" event, or a "resource failed" event from a resource governor of the service governed by service governor 450. In addition, service governor 450 may perform a transition back to "interpreting" state 456 when service governor 450 receives a "recover" event from control node 6 when control node 6 restarts after a failure. When service governor 450 is in "interpreting" state 456 and receives a "resource stopped" event, service governor 450 may invoke the "deallocate" method of the resource governor to deallocate (i.e., to remove the resource from a resource chain) the resource that generated the "resource stopped" event. In addition, service governor 450 may invoke the "resourceStopped" method of the service action module to indicate that the resource that generated the "resource stopped" event has stopped. A resource may generate a "resource stopped" event when a resource of the service governed by service governor 450 has stopped. When service governor 450 is in "interpreting" state 456 and receives a "resource started" event from a resource governor of a resource, service governor 450 may invoke the "resourceStarted" method of the service action module to record in resource configuration repository 118 that the resource has started. As discussed above, chain assembly module 112 may use the resource configuration information in resources configuration repository 118 when identifying resource chains. When service governor 450 is in "interpreting" state 456 and receives a "resource failed" event from a resource governor of a resource, service governor 450 may invoke the "deallocate" method of the resource governor in order to deallocate this resource from its current resource chain. In addition, service governor 450 may invoke the "resource failed" method of the service action module in order to record in resource configuration repository 118 that the resource has failed. A resource governor may generate a "resource failed" event when the resource has failed.

When service governor 450 receives a "recover" event, service governor 450 may invoke the "replay" method to generate and receive a new "activate interpretation" event. When service governor 450 receives the new "activate interpretation" event caused by the "replay" method, service governor 450 handles this event as normal. For instance, if service governor 450 is in "inactive" state 454 and receives the "activate interpretation" event, service governor 450 transitions to "interpreting" state 456. If service governor 450 is already in "interpreting" state 456, service governor 450 performs no action.

Service governor 450 may transition from "interpreting" state 456 to a "wait for stop" state 460 when service governor 450 receives a "stop" event from administrative interface module 108. When service governor 450 is in "wait for stop" state 460, service governor 450 waits for all resources of the service to stop. The "stop" event amounts to an instruction from administrator 12 to stop the operation of all instances of a service. When service governor 450 performs this transition, service governor 450 may invoke the "cloakService" method of this service governor in order to prevent chain assembly module 112 from including the service governed by service FSA in any chains of software services. In addition, service governor 450 may invoke "forceStopResource" methods of each of the resource governors that govern resource of this service in order to stop all resources of the service. Service governor 450 may also transition to "wait for stop" state 460 from "cloaked" state 458 when service governor 450 receives a "stop" event. When service governor 450 receives a "stop" event when service governor 450 is in "cloaked" state 458, service governor 450 may invoke the "forceStopResource" methods of each of the resource governors that govern resource of this service in order to stop all resources of the service.

When service governor 450 is in "cloaked" state 458, service governor 450 may transition back to "cloaked" state 458 when service governor 450 receives a "resource stopped" event, a "resource started" event, or a "resource failed" event from a resource governor of the service governed by service governor 450. In addition, service governor 450 may transition back to "cloaked" state 458 when service governor 450 receives a "recover" event. When service governor 450 is in "cloaked" state 458 and receives a "resource stopped" event, service governor 450 may invoke the "deallocate" method of the resource governor that governs the resource that generated the "resource stopped" event and may invoke the "resourceStopped" method of the service action module in order to inform the service that this resource has stopped. A resource governor may generate a "resource stopped" event when a resource of the service governed by service governor 450 has stopped. When service governor 450 is in "cloaked" state 458 and receives a "resource started" event, service governor 450 may invoke the "resource Started" method of the service action module to inform the service that the resource that generated the "resource started" event has started. A resource governor generates a "resource started" event when the resource has started. When service governor 450 is in "cloaked" state 458 and receives a "resource failed" event, service governor 450 may invoke the "deallocate" method of the resource governor that governs the resource that generated the "resource failed" event in order to deallocate this resource from its current resource chain. In addition, while performing this transition, service governor 450 may also invoke the "resource Failed" method of the service action module in order to inform the service that the resource that generated the "resource failed" event has failed. A resource may generate a "resource failed" event when the resource has failed. When service governor 450 receives a "recover" event while in "cloaked" state 458, service governor 450 may invoke the "replay" method of service governor 450 in order to generate and respond to a new "cloak" event.

Service governor 450 may transition from "wait for stop" state 460 back to "wait for stop" state 460 when service governor 450 receives a "recover" event from control node 6. When service governor 450 receives a "recover" event when in "wait for stop" state 460, service governor 450 may again invoke the "forceStopResource" methods of each of resource governors 434 that govern resources of this service in order to stop all resources of the service governed by service governor 450. In addition, service governor 450 may transition from "wait for stop" state 460 back to "wait for stop" state 460 when service governor 450 receives a "resource stopped" event, a "resource started" event, or a "resource failed" event from a resource governor that governs a resource of the service governed by service governor 450. If service governor 450 receives a "resource stopped" event while in "wait for stop" state 460, service governor 450 may invoke the "deallocate" method of the resource governor that governs the resource that generated the "resource stopped" event in order to deallocate this resource from its current resource chain. In addition, service governor 450 may invoke the "resourceStopped" method of the service action module in order to inform the service that the resource that generated the "resource stopped" event has stopped. When service governor 450 receives a "resource started" event while in "wait for stop" state 460, service governor 450 may invoke the "stop" method of the resource action module of the resource that generated the "resource started" event in order to cause this resource to stop. When service governor 450 receives a "resource failed" event, service governor 450 may invoke the "deal locate" method of the resource governor that governs the resource that generated the "resource failed" event and may invoke the "resourceFailed" method of the service action module in order to inform the service that the resource that generated the "resource failed" event has failed.

Service governor 450 may transition from "wait for stop" state 460 to "inactive" state 454 when all of the resources of the service have stopped. In addition, service governor 450 may transition from "wait for stop" state 460 to "interpreting" state 456 when service governor 450 receives an "activate interpretation" event from administrative interface module 108. Administrative interface module 108 may generate an "activate interpretation" event when administrator 12 decides to resume the operation of the service after deciding to stop the service.

Service governor 450 may transition from "inactive" state 454 to a "fluxing" state 462 when service governor 450 receives an "activate flux" event from administrative interface module 108. Administrative interface module 108 may invoke the "activateFluxService" method of service governor 450 in order to generate an "activate flux" event when administrator 12 decides to start the operation of the service as a flux service. When service governor 450 transitions from "inactive" state 454 to "fluxing" state 462, service governor 450 may invoke the "engageFluxService" method of service governor 450 in order to start obeying requests from one of SLA governors 430 to increase or decrease the capacity of this service. In other words, service governor 450 instructs one of SLA governors 430 that the SLA governor may begin to dynamically control the capacity of distributed computing system 2 to provide this service as a top-level (i.e., flux) service. Service governor 450 may transition from "fluxing" state 462 back to "inactive" state 454 when service governor 450 receives a "deactivate flux" event and there are no active resources of the flux service. Service governor 450 may receive a "deactivate flux" event when administrative interface module 108 invokes the "deactivateFluxService" method of service governor 450. When service governor 450 performs this transition from "fluxing" state 462 to "inactive" state 454, service governor 450 may invoke the "disengageFluxService" method of service governor 450 in order to stop obeying requests from SLA governors 430 to increase or decrease the capacity of this service.

Service governor 450 may transition from "fluxing" state 462 to a "deactivating" state 464 when service governor 450 receives a "deactivate flux" event from administrative interface module 108 and there are one or more active resources of the flux service. When service governor 450 is in "deactivating" state 464, service governor 450 is waiting for all resources of the flux service to stop. Service governor 450 transitions back to "fluxing" state 462 from "deactivating" state 464 when service governor 450 receives an "activate flux" event from administrative interface module 108. When service governor 450 performs this transition back to "fluxing" state 462, service governor 450 may invoke the "engageFluxService" method of service governor 450 to reengage dynamic control of the capacity of this service. In addition, when service governor 450 is in "deactivating" state 464, service governor 450 transitions to "inactive" state 454 when there are no remaining started resources of the service.

Service governor 450 may transition from "fluxing" state 462 to a "disengaged" state 466 when service governor 450 receives a "disengage" event from administrative interface module 108. When service governor 450 is in "disengaged" state 466, service governor 450 has invoked the "disengageFluxService" method of service governor 450 to disengage dynamic control of the capacity of this service. Because service governor 450 disengages service level automation, service governor 450 may ignore any further requests to add or stop resources of the service. Service governor 450 may transition from "disengaged" state 466 to "fluxing" state 462 when service governor 450 receives an "engage" event from administrative interface module 108. When service governor 450 performs this transition, service governor 450 may invoke the "engageFluxService" method of service governor 450 in order to reengage dynamic control of the capacity of this service, and consequently begins obeying subsequent requests to add or stop resources of the service. Furthermore, service governor 450 may transition from "disengaged" state 466 to "inactive" state 454 when service governor 450 receives a "deactivate flux" event from administrative interface module 108 and there are no active resources of the service. When service governor 450 performs this transition, service governor 450 may invoke the "disengageFluxService" method of service governor 450 to disengage dynamic control of the capacity of this service. On the other hand, service governor 450 transitions from "disengaged" state 466 to "deactivating" state 464 when service governor 450 receives a "deactivate flux" event from administrative interface module 108 and there are one or more active resources of the service. When service governor 450 performs this transition from "disengaged" state 466 to "deactivating" state 464, service governor 450 may invoke the "disengageFluxService" method of service governor 450 to disengage dynamic control of the capacity of this service and may invoke the "stop Resource" methods of each of resource governors 434 that govern resources of this service in order to stop all resources of this service.

Service governor 450 may transition from "fluxing" state 462 back to "fluxing" state 462 when service governor 450 receives a UCTH event or a UCTL event from one of SLA governors 430. The acronym "UCTH" stands for Unused Capacity Too High. The acronym "UCTL" stands for Unused Capacity Too Low. When service governor 450 receives a UCTH event while in "fluxing" state 462, service governor 450 may invoke a "deleteFluxResource" method of the service action module to delete a resource of this service. The SLA governor may generate a UCTH event when the SLA governor determines that distributed computing system 2 currently has excess capacity to provide this service. When service governor 450 receives a UCTL event while in "fluxing" state 462, service governor 450 may invoke an "addFluxResource" method of the service action module to add a new resource of the flux service. SLA governors 430 may generate UCTL events when SLA governors 430 determine that service levels of services provided by distributed computing system 2 do not satisfy service-level agreements. In other words, the unused capacity of distributed computing system 2 to provide a service is too low to satisfy a servicelevel agreement.

Service governor 450 may also transition from "fluxing" state 462 back to "fluxing" state 462 when service governor 450 receives a "resource failed" event, a "resource available" event, a "resource started" event, a "resource stopped" event, a "resource stop failed" event, or a "resource start failed" event from a resource governor. When service governor 450 is in "fluxing" state 462 and receives a "resource failed" event, service governor 450 may invoke the "deallocate" method of the resource governor that governs the resource that generated the "resource failed" event and may invoke the "resourceFailed" method of the service action module to inform the service that this resource has failed. In addition, when service governor 450 is in "fluxing" state 462 and receives a "resource failed" event, service governor 450 may invoke the "publish" method to generate a "resource available" event. A "resource available" may inform service governor 450 that a resource of a service that this service requires in order to operate is now available. When service governor 450 receives a "resource available" event service governor 450 may invoke the "resumeUCTL" method of one of SLA governors 430 to instruct the SLA governor that the SLA governor may resume adding resources of the flux service. When service governor 450 receives a "resource started" event from a resource, service governor 450 may invoke the "resourceStarted" method of the service action module to inform the service that the resource that generated the "resource started" event has started. Similarly, when service governor 450 receives a "resource stopped" event, a "resource stop failed" event, or a "resource started failed" event from a resource governor, service governor 450 may invoke the "resourceStopped," "resourceFailedToStop," or "resourceFailedToStart" methods of the service action module, respectively. The "resourceStopped" method of the service action module and the "resourceFailedToStop" method to inform the service that the resource has stopped and that the resource has failed to stop, respectively.

Service governor 450 may transition from "disengaged" state 466 back to "disengaged" state 466 when service governor 450 receives a "resource stopped" event, a "resource started" event, or a "resource failed" event from a resource governor that governs a resource of the service governed by service governor 450. When service governor 450 receives a "resource stopped" event, service governor 450 may invoke the "deallocate" method of the resource governor and the "resourceStopped" method of the service action module. When service governor 450 receives a "resource started" event, service governor 450 may invoke the "resourceStarted" method of the service action module to inform the service that the resource that generated the "resource started" event has started. When service governor 450 receives a "resource failed" event while in "disengaged" state 466, service governor 450 may invoke the "deallocate" method of the resource governor, the "resourceFailed" method of the service action module, and the "publish" method to generate a "resource available" event. In addition to the events received from a resource governor, service governor 450 may also receive a "recover" event while in "disengaged" state 466 from control node 6. When service governor 450 receives a "recover" event while in "disengaged" state 466, service governor 450 may invoke the "replay" method of service governor 450 to generate and respond to a new "disengage" event.

Service governor 450 may transition from "deactivating" state 464 back to "deactivating" state 464 when service governor 450 receives a "resource stopped" event, a "resource started" event, or a "resource failed" event from a resource governor. When service governor 450 receives a "resource stopped" event, service governor 450 may invoke the "deallocate" method of the resource governor and the "resourceStopped" method of the service action module in order to deallocate the resource and to inform the service that the resource has stopped. When service governor 450 receives a "resource started" event, service governor 450 may invoke the "resourceStarted" method of the service action module to inform the service that a resource has started and may then invoke the "forceStopResource" method of the resource governor that governs the resource that generated the "resource started" event in order to force that resource to stop. Service governor 450 forces the resource to stop because service governor 450 is waiting for flux resources to stop when service governor 450 is in "deactivating" state 464. When service governor 450 receives a "resource failed" event while in "deactivating" state 464, service governor 450 may invoke the "deallocate" method of the resource governor, the "resourceFailed" method of the service action module, and the "publish" method to generate a "resource available" event. In addition to the events received from a resource governor, service governor 450 may also receive a "recover" event while in "deactivating" state 464. When service governor 450 receives a "recover" event while in "deactivating" state 464, service governor 450 may invoke the "disengageSLA" method of one of SLA governors 430 to prevent the SLA governor from attempting to add or stop additional resources of the flux service. Service governor 450 may also invoke the "stopResource" methods of the resource governors of this service in order to stop all resources of the flux service.

When service governor 450 is in "inactive" state 454 and receives a "customize" event from administrative interface module 108, service governor 450 transitions to a "waiting to customize" state 468. Service governor 450 may invoke "start" methods of each of the resource governors of this service when performing this transition. The "start" method of a resource governor requests that a resource of the service start. While service governor 450 is in "waiting to customize" state 468, service governor 450 is waiting for all of the resources of the service to start. To determine whether all of the resources have started, service governor 450 may periodically check whether the number of resources of the service that have started is equal to the maximum number of resources for the service. Service governor 450 may perform this check by invoking the "getResourceCount" method and the "getMaxResourceCount" method and determining whether the values returned by these methods are equal.

When service governor 450 determines that all of the resources of the service have started, service governor 450 may transition to a "customizing" state 470. While service governor 450 is in "customizing" state 470, service governor 450 is "customizing" the service. While service governor 450 is in "customizing" state 470, administrator 12 may manually configure (i.e., customize) each resource of the service governed by service governor 450. For example, administrator 12 may configure each resource of the service governed by service governor 450 to communicate with each of the other resources of the service governed by service governor 450. When service governor 450 is in "customizing" state 470, service governor 450 may transition back to "customizing" state 470 when service governor 450 receives a "recover" event from control node 6.

Service governor 450 may transition to "deactivating" state 464 from "customizing" state 470 when service governor 450 receives a "customization done" event from administrative interface module 108. The "customization done" event may indicate that administrator 12 has finished customizing the service. When service governor 450 transitions from "customizing" state 470 to "deactivating" state 464, service governor 450 may invoke the "stopResource" methods of each of the resource governors of this service in order to stop all of the resources of the service.

In addition, service governor 450 may transition from "customizing" state 470 to a "wait for customization cancel" state 472 when service governor 450 receives a "customization cancel" event from administrative interface module 108. The "customization cancel" event may indicate that administrator 12 has decided to cancel an in-progress customization process. When service governor 450 transitions from "customizing" state 470 to "wait for customization cancel" state 472, service governor 450 may invoke the "forceStopResource" method of each of the resource governors of this service in order to immediately stop all resources of the service. While service governor 450 is in "wait for customization cancel" state 472, service governor 450 is waiting for all resources of the service to stop after administrator 12 cancels a customization process.

Service governor 450 may transition from "wait customization cancel" state 472 to a "wait customization delete" state 474 when service governor 450 determines that the number of started resources of the service is zero. Service governor 450 may determine that the number of started resources of the service is zero by periodically invoking the "getCount" method and determining whether the returned value equals zero. When service governor 450 performs this transition from "wait customization cancel" state 472 to "wait customization delete" state 474, service governor 450 may invoke the "deleteResource" methods of each of the resource governors of this service in order to delete all of the resources of the service. While service governor 450 is in "wait customization delete" state 474, service governor 450 is waiting for all resources to be deleted after customization.

When service governor 450 is in "wait customization delete" state 474 and receives a "recover" event from control node 6, service governor 450 may transition back to "wait customization delete" state 474. During this transition, service governor 450 may invoke the "deleteResource" methods of each of the resource governors of this service again to ensure that all resources of the service are deleted.

Service governor 450 may transition from "wait customization delete" state 474 to "inactive" state 454 when service governor 450 receives a "resource deleted" event from a resource governor and the number of resources of the service is zero.

When service governor 450 is in "waiting to customize" state 468, service governor 450 may transition back to "waiting to customize" state 468 when service governor 450 receives one of several events. For instance, service governor 450 may transition from "waiting to customize" state 468 back to "waiting to customize" state 468 when service governor 450 receives a "resource failed" event, a "resource started" event, or a "resource stopped" event from a resource governor of the service. When service governor 450 receives a "resource failed" event while in "waiting to customize" state 468, service governor 450 may invoke the "resourceFailed" method of the service action module to inform the service that the resource that generated the event has failed and service governor 450 may also invoke the "addResource" method of the service action module to restart the resource that generated the event. When service governor 450 receives a "resource started" event while in "waiting to customize" state 468, service governor 450 may invoke the "resourceStarted" method of the service action module to inform the service that the resource that generated the event has started. When service governor 450 receives a "resource stopped" method while in "waiting to customize" state 468, service governor 450 may invoke the "resourceFailed" method of the service action module to inform the service that the resource that generated the event has failed and service governor 450 may also invoke the "addResource" method of the service action module to restart the resource that generated the event. Furthermore, service governor 450 may transition from "waiting to customize" state 468 back to "waiting to customize" state 468 when service governor 450 receives a "recover" event from control node 6. When service governor 450 receives "recover" event while in "waiting to customize" state 468, service governor 450 may invoke the "replay" method to generate a new "customize" event.

When service governor 450 is in "wait customization cancel" state 472, service governor 450 may transition back to "wait customization cancel" state 472 when service governor 450 receives one of several events. For instance, service governor 450 may transition from "wait customization cancel" state 472 back to "wait customization cancel" state 472 when service governor 450 receives a "resource failed" event, a "resource started" event, or a "resource stopped" event from a resource governor of the service. When service governor 450 receives a "resource failed" event while in "wait customization cancel" state 472, service governor 450 may invoke the "deallocate" method of the resource governor to deallocate the resource that generated the "resource failed" event from the node slot and service governor 450 may also invoke the "resource Failed" method of the service action module to inform the service that the resource that generated the "resource failed" event has failed. When service governor 450 receives a "resource stopped" event while in "wait customization cancel" state 472, service governor 450 may invoke the "deallocate" method of the resource governor the resource that generated the "resource stopped" event and service governor 450 may also invoke the "resourceStopped" method of the service action module to inform the service that the resource that generated the "resource failed" event has stopped. When service governor 450 receives a "resource started" event while in "wait customization cancel" state 472, service governor 450 may invoke the "forceStopResource" method of the resource governor that governs the resource that generated the "resource started" event to stop. Furthermore, service governor 450 may transition from "wait customization cancel" state 472 to "wait customization cancel" state 472 when service governor 450 receives a "recover" event from control node 6. When service governor 450 performs this transition, service governor 450 may invoke the "forceStopResource" methods of each of the resource governors of this service in order to force all resources of the service to stop.

Service governor 450 may transition from "inactive" state 454 to a "wait remove delete" state 476 when service governor 450 receives a "remove" event from administrative interface module 108. The "remove" event may indicate that administrator 12 wants to remove the service from distributed computing system 2 altogether. When service governor 450 performs this transition, service governor 450 may invoke the "deleteResource" method of each of the resource governors of this service in order to delete all resources of the service from distributed computing system 2. While service governor 450 is in "wait remove delete" state 476, service governor 450 is waiting for all resources of the service to be deleted.

Service governor 450 may perform several transitions from "wait remove delete" state 476. For instance, service governor 450 may transition from "wait remove delete" state 476 back to "wait remove delete" state 476 when service governor 450 receives a "recover" event from control node 6. When service governor 450 performs this transition, service governor 450 may invoke the "delete Resource" methods of each of the resource governors of this service again to delete all resources of the service. In addition, service governor 450 may transition from "wait remove delete" state 476 to a "final" state 478 when service governor 450 receives a "resource deleted" event from a resource governor and all of the resources of the service have been deleted. When service governor 450 performs this transition, service governor 450 may invoke the "resourceDeleteComplete" method of the service action module to inform the service that all resources of the service have been deleted.

Figure 16:
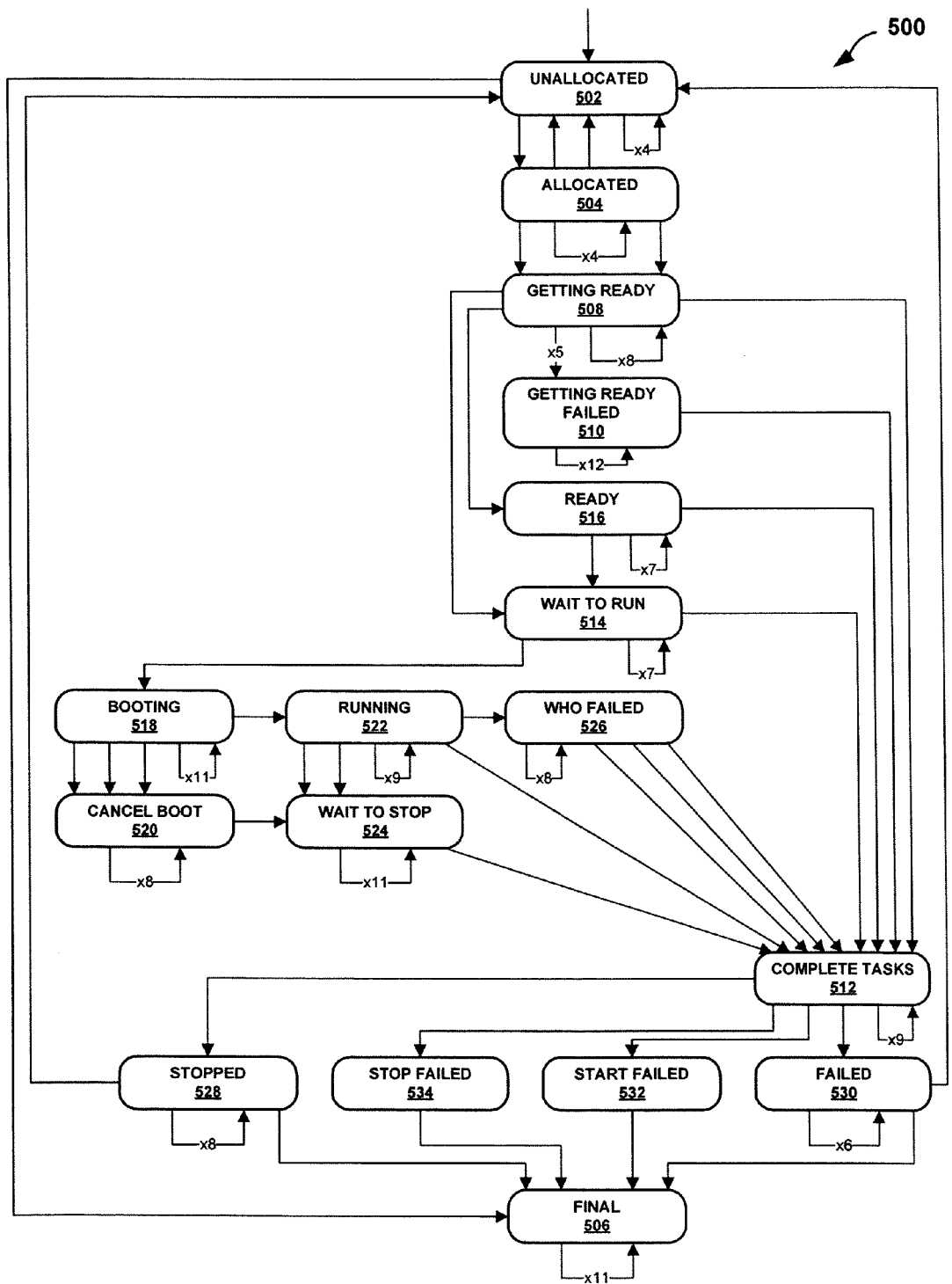
FIG. 16 is a block diagram illustrating an exemplary finite state machine that implements the functionality of a resource governor.

FIG. 16 is a block diagram illustrating an exemplary finite state machine that implements resource governor 500. Resource governor 500 includes fifteen states and thirty-nine transitions. For purposes of clarity, the labels on the transitions have been omitted from FIG. 16. Furthermore, it is also assumed that resource governor 500 governs a resource of a service governed by service governor 450.

Initially, resource governor 500 may start in an "unallocated" state 502. When resource governor 500 is in "unallocated" state 502, the resource governed by resource governor 500 is available to be allocated. Resource governor 500 may transition from "unallocated" state 500 to an "allocated" state 504 when resource governor 500 receives an "allocate" event from service governor 450. When resource governor 500 performs this transition, resource governor 500 sets the value of "depTaskCounted" to false, the value of "startChain" to false, the value of "tasks" to zero, and the value of "destroy" to false. Resource governor 500 may also transition from "unallocated" state 502 to a final state 506 when resource governor 500 receives a "destroy" event from a service governor.

Resource governor 500 may transition from "unallocated" state 502 back to "unallocated" state 502 when resource governor 500 receives a "dependent failed" event from a resource governed by resource governor 500. Resource governor 500 may also transition from "unallocated" state 502 back to "unallocated" state 502 when resource governor 500 receives a "recover" event from control node 6. In addition, resource governor 500 may transition from "unallocated" state 502 back to "unallocated" state 502 when resources governor 500 receives a "task complete" event from the resource governed by resource governor 500.

When resource governor 500 is in "allocated" state 504, chain assembly module 112 has allocated the resource governed by resource governor 500 to one or more resource chains. Resource governor 500 may transition from "allocated" state 504 to "unallocated" state 502 when resource governor 500 receives a "stop" event from service governor 450 or a higher-level resource governor. When resource governor 500 performs this transition, resource governor 500 may invoke the "processEvent" method of the service governor for the resource in order to provide the service governor with a "resource start failed" event. Resource governor 500 may also transition from "allocated" state 504 to "unallocated" state 502 when resource governor 500 receives a "Harvest" event from the service governor. A service governor may generate a "harvest" event when the service governor invokes the "forceStopResource" method of resource governor 500 in order to stop a resource so that the resource may be used for another purpose. When resource governor 500 performs this transition, resource governor 500 may invoke the "processEvent" method of the service governor in order to provide the service governor with a "resource start failed" event.

Resource governor 500 may transition from "allocated" state 504 back to "allocated" state 504 when resource governor 500 receives an "allocate" event from the service governor. In addition, resource governor 500 may transition from "allocated" state 504 back to "allocated" state 504 when resource governor 500 receives a "dependent ready" event, a "dependent running" event, or a "task complete" event from the resource governed by resource governor 500. Resource governor 500 may also transition from "allocated" state 504 back to "allocated" state 504 when resource governor 500 receives a "recover" event from the service governor. When resource governor 500 performs this transition, resource governor 500 may invoke the "publish" method to provide a "recover" event to higher-level resource governors.

Resource governor 500 may transition from "allocated" state 504 to a "getting ready" state 508 when either of two events occur. First, resource governor 500 may transition from "allocated" state 504 to "getting ready" state 508 when resource governor 500 receives a "get ready" event from a higher-level resource governor. When resource governor 500 performs this first transition, resource governor 500 sets the value of "tasks" to 2, and may invoke the "getReady" method of the resource action module to make the resource ready to be started. In addition, when resource governor 500 performs this first transition, resource governor 500 may invoke the "propagate" method of the resource governor to provide a "get ready" event to an immediately lower resource governor and to instruct the lower resource governor to reply to the "get ready" event with a "dependent ready" event. Second, resource governor 500 may transition from "allocated" state 504 to "getting ready" state 508 when resource governor 500 receives a "start chain" event from chain assembly module 112. When resource governor 500 performs this second transition, resource governor 500 sets the value of "tasks" to 2, sets the value of "startChain" to true, and may invoke the "getReady" method of the resource action module. In addition, when resource governor 500 performs this second transition, resource governor 500 may invoke the "propagate" method of the resource governor to provide a "get ready" event and a "dependent ready" to the immediately lower resource governor.

When resource governor 500 is in "getting ready" state 508, the resource and its dependent resources, if any, are getting ready to run. Resource governor 500 may transition from "getting ready" state 508 back to "getting ready" state 508 when resource governor 500 receives any of several events. For example, resource governor 500 may transition from "getting ready" state 508 back to "getting ready" state 508 when resource governor 500 receives an "allocate" event, a "get ready" event, a "dependent ready" event, a "dependent running" event, a "task complete" event, or a "stop" event when the number of uses is not zero. In this example, resource governor 500 does not perform any action in response to these events. In another example, resource governor 500 may transition from "getting ready" state 508 back to "getting ready" state 508 when resource governor 500 receives a "start chain" event from chain assembly module 112. When resource governor 500 performs this transition, resource governor 500 sets the value of "startChain" to true. In addition, resource governor 500 may transition from "getting ready" state 508 back to "getting ready" state 508 when resource governor 500 receives a "dependent ready" event and the value of "depTaskCounted" is not true. When resource governor 500 performs this transition, resource governor 500 sets the value of "depTaskCounted" to true and decrements the value of "tasks." In this way, resource governor 500 indicates that a resource dependent on the resource governed by resource governor 500 is ready to run. Resource governor 500 may also transition from "getting ready" state 508 back to "getting ready" state 508 when resource governor 500 receives an "I am ready" event from the resource governed by resource governor 500. When resource governor 500 performs this transition, resource governor 500 decrements the value of "tasks."

Resource governor 500 may transition from "getting ready" state 508 to a "getting ready failed" state 510 when one of several events occur. In particular, resource governor 500 may transition from "getting ready" state 508 to "getting ready failed" state 510 when resource governor 500 receives a "dependent failed" event from lower-level resource governor. Furthermore, when resource governor 500 is in "getting ready" state 508 and receives a "dependent failed" event when "depTaskCounted" is not true, resource governor 500 sets the value of "depTaskCounted" to true, decrements the value of "tasks", and transitions to "getting ready failed" state 510. Resource governor 500 may also transition from "getting ready" state 508 to "getting ready failed" state 510 when resource governor 500 receives a "stop" event from the service governor or the higher-level resource governor when the value returned by the "uses" method is zero. The "uses" method may return a usage count for the resource governed by resource governor 500. A usage count reflects the number of resources that are dependent on the resource governed by resource governor 500. In addition, resource governor 500 transitions from "getting ready" state 508 to "getting ready failed" state 510 when resource governor 500 receives a "harvest" event from the service governor. When resource governor 500 is in "getting ready" state 508 and receives an "I failed" event from the resource governed by resource governor 500, resource governor 500 decrements the value of "tasks" and transitions to "getting ready failed" state 510.

When resource governor 500 is in "getting ready failed" state 510, resource governor 500 may transition to a "complete tasks" state 512 when the value of "tasks" equals zero. While in "complete tasks" state 512, resource governor 500 completes all outstanding tasks of the resource. When resource governor 500 performs this transition, resource governor 500 sets the value of "restingState" to "startFailed". In addition, when resource governor 500 performs this transition, resource governor 500 may invoke the "publish" method to provide the event "dependent failed" to higher-level resource governors. Resource governor 500 may also invoke the "resetRetries" method.

Resource governor 500 may transition from "getting ready failed" state 510 back to "getting ready failed" state 510 in response to several events. For instance, resource governor 500 may transition from "getting ready failed" state 510 back to "getting ready failed" state 510 in response to a "start chain" event from chain assembly module 112, a "get ready" event from a higher-level resource governor, or a "stop" event from the service governor or a higher-level resource governor. When resource governor 500 performs any of these transitions, resource governor 500 may invoke the "publish" method in order to provide higher-level resource governors with a "dependent failed" event. When resource governor 500 receives a "dependent ready" event and the value of "depTaskCounted" is not true, resource governor 500 transitions from "getting ready failed" state 510 back to "getting ready failed" state 510 and sets the value of "depTaskCounted" to true and decrements the value of "tasks." When resource governor 500 is in "getting ready failed" state 510 and resource governor 500 receives an "I am ready" event from the resource governed by resource governor 500, resource governor 500 decrements the value of "tasks." Similarly, when resource governor 500 is in "getting ready failed" state 510 and receives an "I am failed" event from the resource governed by resource governor 500, resource governor 500 decrements the value of "tasks." When resource governor 500 receives a "dependent failed" event and the value of "depTaskCounted" is not true, resource governor 500 transitions from "getting ready failed" state 510 back to "getting ready failed" state 510 and sets the value of "depTaskCounted" to true and decrements the value of "tasks." Resource governor 500 may transition from "getting ready failed" state 510 back to "getting ready failed" state 510 when resource governor 500 receives a "dependent ready" event, a "harvest" event, a "dependent running" event, a "dependent failed" event, a "task complete" event, or a "stop" event when there are one or more uses. In this example, resource governor 500 does not perform any action in response to these events.

Resource governor 500 may transition from "getting ready" state 508 to a "wait to run" state 514. When resource governor 500 is in "wait to run" state 514, the resource governed by resource governor 500 is waiting for its dependent resources to start running before starting to run itself. In particular, resource governor 500 may transition from "getting ready" state 508 to "wait to run" state 514 when the value of "tasks" equals zero and the value of "startChain" equals true. The value of "tasks" equals zero only when resource governor 500 has received a "dependent ready" event that indicates that a resource dependent on the resource governed by resource governor 500 is ready and when resource governor 500 has received an '41 am ready' event that indicates that the resource governed by resource governor 500 is ready. When resource governor 500 performs this transition, resource governor 500 may invoke the "propagate" method of the resource governor to provide a lower-level resource governor with a "start" event and to instruct the lower resource governor to reply to the "start" event with a "dependent running" event.

Resource governor 500 may transition from "getting ready" state 508 to a "ready" state 516. When resource governor 500 is in "ready" state 516, the resource governed by resource governor 500 and its dependent resources are ready to run. In particular, resource governor 500 may transition from "getting ready" state 508 to "ready" state 516 when the value of "tasks" equals zero and the value of "startChain" equals false. The value of "tasks" equals zero only when resource governor 500 has received a "dependent ready" event that indicates that a resource dependent on the resource governed by resource governor 500 is ready and when resource governor 500 has received an "I am ready" event that indicates that the resource governed by resource governor 500 is ready. When resource governor 500 performs this transition, resource governor 500 may invoke the "publish" method to provide a higher-level resource governor with a "dependent ready" event.

When resource governor 500 is in "wait to run" state 514, resource governor 500 may transition to "complete tasks" state 512 when resource governor 500 receives a "harvest" event from the service governor or receives a "stop" event from the service governor or a higher-level resource governor when the value returned by the "uses" method is zero. When resource governor 500 performs either of these transition from "wait to run" state 514 to "complete tasks" state 512, resource governor 500 may invoke the "publish" method in order to provide a "dependent failed" event to higher-level resource governors. In addition, resource governor 500 may invoke the "resetRetries" method and sets the value of "restingState" to "startFailed."

Resource governor 500 may also transition from "wait to run" state 514 to "complete tasks" state 512 when resource governor 500 receives a "dependent failed" event from a lower-level resource governor. When resource governor 500 performs this transition, resource governor 500 sets the value of "restingState" to "startFailed". Resource governor 500 may also invoke the "publish" method to provide a "dependent failed" event to higherlevel resource governors and may invoke the "resetRetries" method.

When resource governor 500 is in "wait to run" state 514, resource governor 500 may transition to a "booting" state 518 when resource governor 500 receives a "dependent running" event. While resource governor 500 is in "booting" state 518, the resource governed by resource governor 500 is booting. When resource governor 500 performs this transition, resource governor 500 may invoke the "startResource" method of the resource action module in order to cause the resource governed by resource governor 500 to start booting. In addition, resource governor 500 also may invoke the "setRetries" method of the resource action module to set the value of "retries" to the value returned by invoking the "getRetries" method of the resource action module.

Resource governor 500 may transition from "ready" state 516 to "wait to run" state 514 when resource governor 500 receives a "start" event from a higher-level resource governor. When resource governor 500 performs this transition, resource governor 500 may invoke the "propagate" method of the resource governor to provide a "start" event to the immediately lower-level resource governor.

When resource governor 500 is in "wait to run" state 514, resource governor 500 may transition back to "wait to run" state 514 in response to several events. For instance, resource governor 500 may transition back to "wait to run" state 514 when resource governor 500 receives a "start chain" event from chain assembly module 112 or a "get ready" event from a higher-level resource governor. When resource governor 500 performs either of these transitions, resource governor 500 may invoke the "publish" method in order to provide higher-level resource governors with a "dependent ready" event. Resource governor 500 may also transition back to "wait to run" state 514 when resource governor 500 receives a "recover" event from the service governor. When resource governor 500 performs this transition, resource governor 500 may invoke the "publish" method in order to provide a "recover" event to higher-level resource governors and may invoke the "propagate" method of the resource governor in order to provide a "start" event to a lower-level FSM and to instruct the lower resource governor to reply to the "start" event with a "dependent running" event. Resource governor 500 may transition from "wait to run" state 514 back to "wait to run" state 514 in response to an "allocate" event, a "dependent ready" event, a "stop" event, a "start" event, or a "task complete" event. In this example, resource governor 500 does not perform any action in response to these events.

Resource governor 500 may also transition from "ready" state 516 to "complete tasks" state 512. In particular, resource governor 500 transitions from "ready" state 516 to "complete tasks" state 512 when resource governor 500 receives a "harvest" event from the service governor or when resource governor 500 receives a "stop" event from the service governor or a higher-level resource governor when the value returned by invoking the "uses" method is zero. When resource governor 500 performs either of these transitions, resource governor 500 may invoke the "publish" method in order to provide higher-level resource governors with a "dependent failed" event. In addition, resource governor 500 sets the value of "restingState" to "startFailed" and may invoke the "resetRetries" method.

Resource governor 500 may transition from "ready" state 516 back to "ready" state 516 in response to several events. In particular, resource governor 500 may transition from "ready" state 516 back to "ready" state 516 when resource governor 500 receives an "allocate" event from chain assembly module 112, a "start chain" event from chain assembly module 112, or a "recover" event from the service governor. When resource governor 500 transitions from "ready" state 516 to "ready" state 516 in response to a "start chain" event, resource governor 500 may invoke the "publish" method in order to provide higher-level resource governors with a "dependent ready" event. When resource governor 500 transitions from "ready" state 516 to "ready" state 516 in response to a "recover" event, resource governor 500 may invoke the "publish" method in order to provide higher-level resource governors with a "recover" event. In addition, resource governor 500 may transition from "ready" state 516 back to "ready" state 516 in response to a "get ready" event from a higher level resource governor. The "get ready" event instructs resource governor 500 to prepare the resource governed by resource governor 500 to run. When resource governor 500 receives the "get ready" event, resource governor 500 may invoke the "publish" method in order to provide a "dependent ready" event to higher-level resource governors. Resource governor 500 may also transition from "ready" state 516 back to "ready" state 516 when resource governor 500 receives a "dependent ready" event or a "dependent running" event from a lower-level resource governor. Furthermore, resource governor 500 may transition from "ready" state 516 back to "ready" state 516 when resource governor 500 receives a "stop" event from the service governor or from a higher-level resource governor. The "stop" event instructs resource governor 500 to stop the resource if the resource is no longer in use. When resource governor 500 receives a "task complete" event from the resource governed by resource governor 500, resource governor 500 may transition from "ready" state 516 back to "ready" state 516 without performing any additional action. Resource governor 500 may transition from "ready" state 516 back to "ready" state 516 when resource governor 500 receives an "allocate" event, a "dependent ready" event, a "stop" event, a "dependent running" event, or a "task complete" event. In this example, resource governor 500 does not perform any action in response to these events.

When resource governor 500 is in "booting" state 518, resource governor 500 may transition to "complete tasks" state 512 when resource governor 500 receives a "dependent failed" event from a lower-level resource governor. When resource governor 500 performs this transition, resource governor 500 may invoke the "publish" method to provide higher-level resource governors with a "dependent failed" event. In addition, resource governor 500 sets the value of "restingState" to "startFailed" and may invoke the "resetRetries" method.

Resource governor 500 may transition from "booting" state 518 to a "cancel boot" state 520 when one of three events occur. First, resource governor 500 may transition from "booting" state 518 to "cancel boot" state 520 when resource governor 500 receives a "harvest" event from the service governor. Second, resource governor 500 may transition from "booting" state 518 to "cancel boot" state 520 when resource governor 500 receives a "dependent failed" event from a lower-level resource governor. Third, resource governor 500 may transition from "booting" state 518 to "cancel boot" state 520 when resource governor 500 receives a "stop" event from the service governor or from a higher-level resource governor and when the value returned by invoking the "uses" method equals zero. When resource governor 500 performs any of these transitions, resource governor 500 may invoke the "publish" method to provide a "dependent failed" event to higher-level resource governors.

Resource governor 500 may transition from "booting" state 518 back to "booting" state 518 in response to several events. In particular, resource governor 500 may transition from "booting" state 518 back to "booting" state 518 when resource governor 500 receives a "start chain" event from chain assembly module 112. When resource governor 500 performs this transition, resource governor 500 may invoke the "publish" method in order to provide a "dependent ready" event to higher-level resource governors. Resource governor 500 may also transition from "booting" state 518 back to "booting" state 518 when resource governor 500 receives a "get ready" event from a higher-level resource governor.

When resource governor 500 transitions from "booting" state 518 back to "booting" state 518 in response to a "get ready" event, resource governor 500 may invoke the "publish" method in order to provide higher-level resource governors with a "dependent ready" event. When resource governor 500 receives a "start failed" event from the resource governed by resource governor 500 when the value of "retries" is greater than zero, resource governor 500 transitions from "booting" state 518 back to "booting" state 518. Resource governor 500 may invoke the "startResource" method of the resource action module and decrements the value of "retries" when resource governor 500 performs this transition. Resource governor 500 may also transition from "booting" state 518 back to "booting" state 518 when resource governor 500 receives a "recover" event from the service governor. When resource governor 500 performs this transition, resource governor 500 may invoke the "publish" method in order to provide higher-level resource governors with a "recover" event, may invoke the "startMonitoring" method of the resource governor, may set the value of "retries" to the value returned by invoking the "getRetries" method, and may invoke the "setBootTimeout" method of the resource action module in order to start a timer, such that when the timer expires and the computing node has not booted the resource, a "dependent failed" event is generated. Resource governor 500 may transition from "booting" state 518 back to "booting" state 518 in response to an "allocate" event, a "dependent ready" event, a "stop" event, a "start" event, a "dependent running" event, an "I am failed" event, or a "task complete" event. In this example, resource governor 500 does not perform any action in response to these events.

Resource governor 500 may transition from "booting" state 518 to a "running" state 522 when resource governor 500 receives an "I am running" event from the collector module that monitors the resource governed by resource governor 500. While resource governor 500 is in "running" state 522, the resource governed by resource governor 500 is running and providing service. When resource governor 500 performs this transition, resource governor 500 may invoke the "processEvent" method of the service governor to provide the service governor with a "resource started" event. Resource governor 500 may also invoke the "publish" method to provide a "dependent running" event to higher-level resource governors. In addition, resource governor 500 may invoke the "cancelTimeout" method of the resource action module to cancel the timeout clock that may have been previously set. Resource governor 500 also sets the value of "retries" to zero.

When resource governor 500 is in "running" state 522, resource governor 500 may transition back to "running" state 522 in response to several events. For instance, resource governor 500 transitions back to "running" state 522 in response to a "start chain" event from chain assembly module 112. When resource governor 500 performs this transition, resource governor 500 may invoke the "publish" method in order to provide higher-level resource governors with a "dependent ready" event. In addition, resource governor 500 transitions from "running" state 522 back to "running" state 522 in response to a "get ready" event from a higher-level resource governor. When resource governor 500 performs this transition, resource governor 500 may invoke the "publish" method in order to provide a "dependent ready" event to higher-level resource governors. When resource governor 500 is in "running" state 522 and receives a "start" event from a higher-level resource governor, resource governor 500 transitions back to "running" state 522 and may invoke the "publish" method in order to provide a "dependent running" event to higher-level resource governors. When resource governor 500 receives an "I am running" event while in "running" state 522, resource governor 500 may invoke the "process Event" method of the service governor in order to provide the service governor with a "resource started" event and may also invoke the "publish" method in order to provide higher-level resource governors with a "dependent running" method. When resource governor 500 receives a "recover" method while in "running" state 522, resource governor 500 may invoke the "publish" method in order to provide a "recover" event to higher-level resource governors and may invoke the "startMonitoring" method of the resource governor. Resource governor 500 may transition from "running" state 522 back to "running" state 522 in response to an "allocate" event, a "dependent ready" event, a "stop" event, a "dependent running" event, or a "task complete" event. In this example, resource governor 500 does not perform any action in response to these events.

When resource governor 500 is in "running" state 522, resource governor 500 may transition to "complete tasks" state 512 when resource governor 500 receives a "dependent failed" event. When resource governor 500 performs this transition, resource governor 500 may invoke the "publish" method to provide a "dependent failed" event to higher-level resource governors. In addition, resource governor 500 may invoke the "stopResource" method of the resource action module to instruct the resource governed by resource governor 500 to stop operation. Resource governor 500 may also invoke the "resetRetries" method of the resource action module and sets the value of "restingState" to "failed". In addition, resource governor 500 may invoke the "stopMonitoring" method of resource governor 500 to instruct monitoring infrastructure 102 to stop monitoring the resource.

Resource governor 500 may transition from "running" state 522 to a "wait to stop" state 524 in response to two events. First, resource governor 500 may transition from "running" state 522 to "wait to stop" state 524 when resource governor 500 receives a "harvest" event from the service governor. Second, resource governor 500 may transition from "running" state 522 to "wait to stop" state 524 when resource governor 500 receives a "stop" event and the value returned by invoking the "uses" method is zero. When resource governor 500 performs either of these transitions, resource governor 500 may invoke the "publish" method to provide a "dependent failed" event to higher-level resource governor. In addition, resource governor 500 may invoke the "stopResource" method of the resource action module in instruct the resource governed by the resource governor 500 to stop operating. When resource governor 500 is in "wait to stop" state 524, resource governor 500 waits while the resource governed by resource governor 500 stops.

Resource governor 500 may also transition from "running" state 522 to a "who failed" state 526 when resource governor 500 receives an "I am failed" event from the resource governed by resource governor 500. When resource governor 500 is in "who failed" state 526, resource governor 500 waits while it is determined whether the failed resource is the resource governed by resource governor 500 or a dependent resource. During the transition from "running" state 522 to "who failed" state 526, resource governor 500 may invoke the "stopMonitoring" method of the resource action module to instruct monitoring infrastructure 102 to stop monitoring the resource governed by resource governor 500. In addition, resource governor 500 may invoke a "probe" method of the resource action module. The "probe" method of the resource action module determines whether the resource is still operating. Resource governor 500 may also invoke the "stopResource" method of the resource action module to instruct the resource governed by resource governor 500 to stop operating.

When resource governor 500 is in "who failed" state 526, resource governor 500 may transition back to "who failed" state 526 in response to several events. Resource governor 500 may transition back to "who failed" state 526 when resource governor 500 receives a "start chain" event from chain assembly module 112. When resource governor 500 performs this transition, resource governor 500 may invoke the "publish" method in order to provide a "dependent failed" event to higher-level resource governors. In addition, resource governor 500 transitions from "who failed" state 526 back to "who failed" state 526 when resource governor 500 receives a "get ready" event from a higher-level resource governor. When resource governor 500 performs this transition, resource governor 500 may invoke the "publish" method in order to provide higher-level resource governors with a "dependent failed" event. When resource governor 500 receives a "stop" event and the value returned by invoking the "uses" method equals or does not equal zero, resource governor 500 transitions from "who failed" state 526 back to "who failed" state 526 and may invoke the "publish" method in order to provide a "dependent failed" event to higher-level resource governors. When resource governor 500 receives a "harvest" event from the service governor, resource governor 500 may invoke the "publish" method in order to provide higher-level resource governors with a "dependent failed" event. When resource governor 500 receives a "start" event from a higher-level resource governor, resource governor 500 may invoke the "publish" method in order to provide higher-level resource governors with a "dependent failed" event. Resource governor 500 may transition from "who failed" state 526 back to "who failed" state 526 in response to a "dependent ready" event, an "I am failed" event, or a "task complete" event. In this example, resource governor 500 does not perform any action in response to these events.

Resource governor 500 may transition from "who failed" state 526 to "complete tasks" state 512 in response to any of three events. First, resource governor 500 may transition from "who failed" state 526 to "complete tasks" state 512 in response to an "It's Me" event. Second, resource governor 500 may transition from "who failed" state 526 to "complete tasks" state 512 in response to a "dependent running" event. Third, resource governor 500 may transition from "who failed" state 526 to "complete tasks" state 512 in response to a "dependent failed" event. When resource governor 500 performs any of these transitions, resource governor 500 may invoke the "publish" method to provide a "dependent failed" event to higher-level FSMs. In addition, resource governor 500 may invoke the "resetRetries" method and may set the value of "restingState" to "failed".

When resource governor 500 is in "cancel boot" state 520, resource governor 500 may transition to "complete tasks" state 512 when resource governor 500 receives a "start failed" event from the resource governed by resource governor 500. When resource governor 500 performs this transition, resource governor 500 may invoke the "stopMonitoring" method of resource governor 500 to instruct monitoring infrastructure 102 to stop monitoring the resource. In addition, resource governor 500 may invoke the "resetRetries" method of the resource action module and may set the value of "restingState" to "startFailed".

Further, when resource governor 500 is in "cancel boot" state 520, resource governor 500 may transition to "wait to stop" state 524 when resource governor 500 receives an "I am running" event from a collector module that monitors the resource governed by resource governor 500. During this transition, resource governor 500 may invoke the "cancelTimeout" method of the resource action module to cancel the timeout clock. Resource governor 500 may also invoke the "processEvent" method of the service governor in order to provide the service governor with a "resource started" event. In addition, resource governor 500 may invoke the "stopResource" method of the resource action module to instruct the resource governed by resource governor 500 to stop operating.

When resource governor 500 is in "cancel boot" state 520, resource governor 500 may transition back to "cancel boot" state 520 in response to several events. When resource governor 500 is in "cancel boot" state 520, resource governor 500 may transition back to "cancel" boot state 520 and invoke the "publish" method in order to provide higher-level resource governors with a "dependent failed" event. In addition, resource governor 500 may transition back to "cancel boot" state 520 when resource governor 500 receives a "get ready" event from a higher-level resource governor. When resource governor 500 performs this transition, resource governor 500 may invoke the "publish" method in order to provide higher-level resource governors with a "dependent failed" event. Similarly, when resource governor 500 receives a "start" event from a higher-level resource governor, resource governor 500 transitions back to "cancel boot" state 520 and may invoke the "publish" method in order to provide higher-level resource governors with a "dependent failed" event. Resource governor 500 may transition from "cancel boot" state 520 back to "cancel boot" state 520 when resource governor 500 receives a "dependent ready" event, a "stop" event, a "harvest" event, a "dependent ready" event, a "dependent failed" event, or a "task complete" event. In this example, resource governor 500 does not perform any action in response to these events.

Resource governor 500 may transition from "wait to stop" state 524 to "complete tasks" state 512 when resource governor 500 receives a "stop failed" event from the resource governed by resource governor 500. When resource governor 500 performs this transition, resource governor 500 may invoke the "stopMonitoring" method of resource governor 500 to instruct monitoring infrastructure 102 to stop monitoring the resource governed by resource governor 500. In addition, resource governor 500 may invoke the "publish" method to provide a "dependent failed" event to higher-level resource governors. Resource governor 500 may also set the value of "restingState" to "stopFailed".

Resource governor 500 may transition from "wait to stop" state 524 to "complete tasks" state 512 when resource governor 500 receives an "I am failed" event from the resource governed by resource governor 500. When resource governor 500 performs this transition, resource governor 500 may invoke the "stopMonitoring" method of resource governor 500 to instruct monitoring infrastructure 102 to stop monitoring the resource governed by resource governor 500. In addition, resource governor 500 may invoke the "resetRetries" method of the resource action module and may set the value of "restingState" to "stopped."

Resource governor 500 may transition from "wait to stop" state 524 back to "wait to stop" state 524 in response to several events. For instance, resource governor 500 may transition back to "wait to stop" state 524 when resource governor 500 receives a "start chain" event from chain assembly module 112, a "get ready" event from a higher-level resource governor, a "stop" event from the service governor or a higher-level resource governor, or a "harvest" event from the service governor. When resource governor 500 receives any of these events, resource governor 500 may invoke the "publish" method in order to provide a "dependent failed" event to higher-level resource governors. Resource governor 500 may also transition from "wait to stop" state 524 back to "wait to stop" state 524 when resource governor 500 receives an "I am running" event from a collector module that monitors the resource governed by resource governor 500. When resource governor 500 performs this transition, resource governor 500 may invoke the "stopResource" method of the resource action module to instruct the resource governed by resource governor 500 to stop operating. In addition, resource governor 500 may transition from "wait to stop" state 524 back to "wait to stop" state 524 when resource governor 500 receives a "recover" event from the service governor. When resource governor 500 performs this transition, resource governor 500 may invoke the "publish" method in order to provide a "recover" event to higher-level resource governors, may invoke the "startMonitoring" method of resource governor 500, and may invoke the "stopResource" method of the resource action module. Resource governor 500 may transition from "wait to stop" state 524 back to "wait to stop" state 524 when resource governor 500 receives a "dependent ready" event, a "dependent running" event, a "dependent failed" event, or a "task complete" event. In this example, resource governor 500 does not perform any action in response to these events.

When resource governor 500 is in "complete tasks" state 512, resource governor 500 may transition back to "complete tasks" state 512 in response to several events. For instance, resource governor 500 may transition from "complete tasks" state 512 back to "complete tasks" state 512 when resource governor 500 receives a "start chain" event from chain assembly module 112, a "get ready" event from a higher-level resource governor, a "stop" event from the service governor or a higher-level resource governor, or a "dependent failed" event from a lower-level resource governor. When resource governor 500 performs any of these transitions, resource governor 500 may invoke the "publish" method in order to provide higher-level resource governors with a "dependent failed" event. Resource governor 500 may transition from "complete tasks" state 512 back to "complete tasks" state 512 in response to an "allocate" event, a "dependent ready" event, an "I am ready" event, a "harvest" event, a tasks equals zero condition, an "I am running" event, a "start failed" event, an "I failed" event, a "dependent failed" event, an "It is me" event, a "stop failed" event, or a "task complete" event. In this example, resource governor 500 does not perform any action in response to these events.

When resource governor 500 is in "complete tasks" state 512, resource governor 500 may transition to a "stopped" state 528. When resource governor 500 is in "stopped" state 528, the resource governed by resource governor 500 has stopped naturally. Resource governor 500 may perform this transition when the value returned by invoking the "getTaskCount" method equals zero, and the value of "restingState" equals "stopped". When resource governor 500 performs this transition, resource governor 500 may invoke the "process Event" method of the service governor to provide the service governor with a "resource stopped" event.

When resource governor 500 is in "stopped" state 528, resource governor 500 may transition back to "stopped" state 528 in response to several events. For instance, resource governor 500 may transition back to "stopped" state 528 when resource governor 500 receives a "start chain" event from chain assembly module 112, a "get ready" event from a higher-level resource governor, a "stop" event from the service governor or a higher-level resource governor, or a "dependent running" event from a lower-level resource governor. When resource governor 500 performs any of these transitions, resource governor 500 may invoke the "publish" method in order to provide higher-level resource governors with a "dependent failed" event. Resource governor 500 may also transition from "stopped" state 528 back to "stopped" state 528 or when resource governor 500 receives a "recover" event from the service governor. When resource governor 500 performs this transition, resource governor 500 may invoke the "publish" method in order to provide higher-level resource governors with a "recover" event. Resource governor 500 may transition from "stopped" state 528 back to "stopped" state 528 when resource governor 500 receives a "task complete" event. In this example, resource governor 500 does not perform any action in response to this event.

Resource governor 500 may also transition from "complete tasks" state 512 to a "failed" state 530. When resource governor 500 is in "failed" state 530, the resource governed by resource governor 500 has failed. Resource governor 500 may perform this transition when the value returned by invoking the "getTaskCount" method equals zero, the value returned by invoking the "uses" method equals zero, and the value of "restingState" equals "failed". When resource governor 500 performs this transition, resource governor 500 may invoke the "processEvent" method of the service governor to provide the service governor with a "resource failed" event.

When resource governor 500 is in "failed" state 530, resource governor 500 may transition back to "failed" state 530 in response to several events. For instance, resource governor 500 may transition back to "failed" state 530 when resource governor 500 receives a "start chain" event from chain assembly module 112, a "get ready" event from a higher-level resource governor, a "stop" event from the service governor or a higher-level resource governor, or a "dependent running" event from a lower-level resource governor. When resource governor 500 performs any of these transitions, resource governor 500 may invoke the "publish" method in order to provide higher-level resource governor with a "dependent failed" event. Resource governor 500 may also transition from "failed" state 530 back to "failed" state 530 when resource governor 500 receives a "recover" event from the service governor. When resource governor 500 performs this transition, resource governor 500 may invoke the "publish" method in order to provide higher-level resource governors with a "recover" event. In addition, resource governor 500 may transition from "failed" state 530 back to "failed" state 530 when resource governor 500 receives a "task complete" event. In this example, resource governor 500 does not perform any action in response to this event.

Resource governor 500 may also transition from "complete tasks" state 512 to a "start failed" state 532. When resource governor 500 is in "start failed" state 532, the resource governed by resource governor 500 has failed to start after being allocated. Resource governor 500 may perform this transition when the value returned by invoking the "getTaskCount" method equals zero, the value returned by invoking the "uses" method equals zero, and the value of "restingState" equals "startFailed". When resource governor 500 performs this transition, resource governor 500 may invoke the "processEvent" method of the service governor to provide the service governor with a "resource start failed" event.

When resource governor 500 is in "start failed" state 532, resource governor 500 may transition back to "start failed" state 532 in response to several events. For instance, resource governor 500 may transition back to "start failed" state 532 when resource governor 500 receives a "start chain" event from chain assembly module 112, a "get ready" event from a higher-level resource governor, a "stop" event from the service governor or a higher-level resource governor, or a "dependent running" event from a lower-level resource governor. When resource governor 500 performs any of these transitions, resource governor 500 may invoke the "publish" method in order to provide higher-level resource governor with a "dependent failed" event. Resource governor 500 may also transition from "start failed" state 532 back to "start failed" state 532 when resource governor 500 receives a "recover" event from the service governor. When resource governor 500 performs this transition, resource governor 500 may invoke the "publish" method in order to provide higher-level resource governors with a "recover" event.

Resource governor 500 may also transition from "complete tasks" state 512 to a "stop failed" state 534. When resource governor 500 is in "stop failed" state 534, the resource governed by resource governor 500 has failed to stop when requested. Resource governor 500 may perform this transition when the value returned by invoking the "getTaskCount" method equals zero, the value returned by invoking the "uses" method equals zero, and the value of "restingState" equals "stopFailed". When resource governor 500 performs this transition, resource governor 500 may invoke the "processEvent" method of service governor 450 to provide service governor 450 with a "resource stop failed" event.

When resource governor 500 is in "stop failed" state 534, resource governor 500 may transition back to "stop failed" state 534 in response to several events. For instance, resource governor 500 may transition back to "stop failed" state 534 when resource governor 500 receives a "start chain" event chain assembly module 112, a "get ready" event from a higher-level resource governor, a "stop" event from service governor 450 or a higher-level resource governor, or a "dependent running" event from a lower-level resource governor. When resource governor 500 performs any of these transitions, resource governor 500 may invoke the "publish" method in order to provide higher-level resource governors with a "dependent failed" event. Resource governor 500 may also transition from "stop failed" state 534 back to "stop failed" state 534 when resource governor 500 receives a "recover" event from service governor 450. When resource governor 500 performs this transition, resource governor 500 may invoke the "publish" method in order to provide higher-level resource governors with a "recover" event. Resource governor 500 may transition from "stop failed" event 534 back to "stop failed" event 534 when resource governor 500 receives a "dependent failed" event or a "task complete" event. In this example, resource governor 500 does not perform any action in response to these events.

Resource governor 500 may transition from "stopped" state 528, from "failed" state 530, from "start failed" state 532, and from "stop failed" state 534 to "final" state 506 when resource governor 500 receives a "destroy" event from service governor 450. The "destroy" event instructs resource governor 500 to destroy the resource governed by resource governor 500. When resource governor 500 is in "final" state 506, the resource governed by resource governor 500 has been destroyed.

When resource governor 500 is in "final" state 506, resource governor 500 may transition back to "final" state 506 when resource governor 500 receives any of several events. For instance, resource governor 500 may transition back to "final" state 506 when resource governor 500 receives a "start chain" event from chain assembly module 112, a "get ready" event from a higher-level resource governor, a "stop" event from service governor 450 or a higher-level resource governor, a "harvest" event from chain assembly module 112, or a "start" event from a higher-level resource governor. When resource governor 500 performs any of these transitions, resource governor 500 may invoke the "publish" method in order to provide higher-level resource governors with a "dependent failed" event. In addition, resource governor 500 may transition from "final" state 506 back to "final" state 506 when resource governor 500 receives a "dependent ready" event, a "dependent running" event, an "I am failed" event, a "dependent failed" event, a "recover" event, or a "task complete" event. In this example, resource governor 500 does not perform any action in response to these events.

In the example of FIG. 16, resource governor 500 may persist the state variables resource governor 500 when resource governor 500 transitions into "unallocated" state 502, "allocated" state 504, "ready" state 516, "wait to run" state 514, "booting" state 518, "running" state 522, "wait to stop" state 524, "stopped" state 528, "failed" sate 530, "start failed" state 532, "stop failed" state 534, and "final" state 506.

Figure 17:
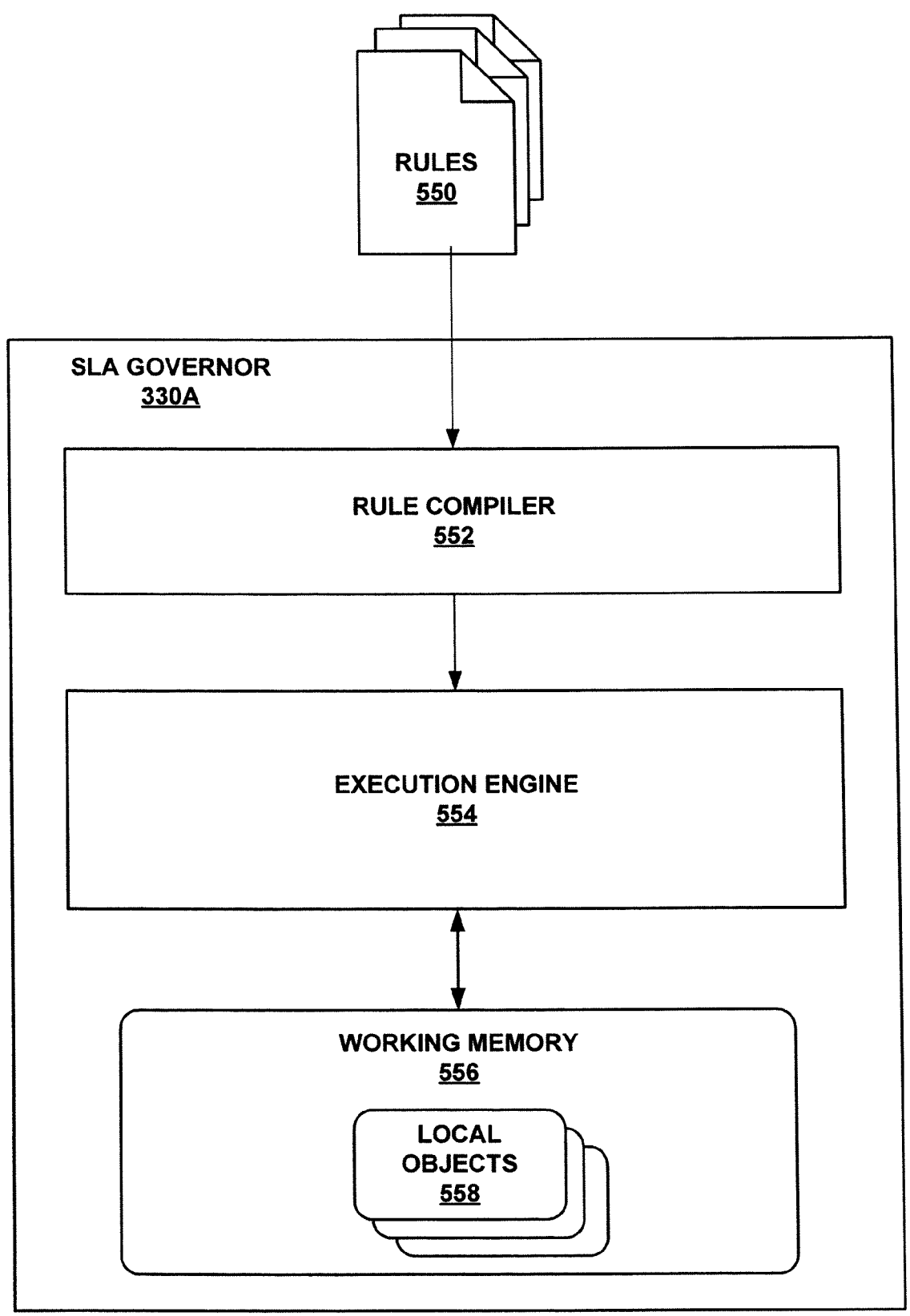
FIG. 17 is a block diagram illustrating example details of a Service-Level Agreement (SLA) governor.

FIG. 17 is a block diagram illustrating example details of SLA governor 430A. While FIG. 17 is explained with regard to SLA governor 430A, it will be understood that SLA governors 430B through 430N may also include the same details. In the illustrated embodiment, SLA governor 430A includes a rule compiler 552 and an execution engine 554. Each of rules 550 represents a unit of code that conforms to a rule language and expresses a set of triggering conditions and a set of implied actions. When the conditions are met, the actions are eligible to be performed. The following is one example of a configuration rule:

```
rule checkServiceCapacity {
    Service s where status != "overloaded";
    LoadParameter p where p.currentResponseTime <
        s.requireResponseTime;
} > {
    s.status = "overloaded";
};
}
```

When installed, this example rule marks a service as "overloaded" when the current response time of a service is less than the response time required for the service by a service-level agreement. The following represents another example rule for automatically outputting an event to a service governor of a service to increase the capacity of distributed computing system 2 to provide the service:

```
rule serviceOverload {
    Service s where status == "overloaded";
} > {
    uctl(s.serviceGovernor);
}
```

Rule compiler 552 may compile each of rules 550 and translate match conditions of the rules into a discrimination network that avoids redundant tests during rule execution. Execution engine 554 handles rule administration, object insertion and retrieval, rule invocation and execution of rule actions. In general, execution engine 554 first matches a current set of rules 550 against a current state of working memory 556 and local objects 558. Execution engine 554 then collects all rules that match as well as the matched objects and selects a particular rule instantiation to fire. Next, execution engine 554 fires (executes) the instantiated rule and propagates any changes to working memory 556. Execution engine 554 repeats the process until no more matching rule instantiations can be found.

Firing of a rule typically produces a very small number of changes to working memory 556. This allows sophisticated rule engines to scale by retaining match state between cycles. Only the rules and rule instantiations affected by changes are updated, thereby avoiding the bulk of the matching process. One exemplary algorithm that may be used by execution engine 554 to handle the matching process includes the RETE algorithm that creates a decision tree that combines the patterns in all the rules and is intended to improve the speed of forward-chained rule system by limiting the effort required to recompute a conflict set after a rule is fired. One example of a RETE algorithm is described in Forgy, C. L.: 1982, "RETE: a fast algorithm for the many pattern/many object pattern match problem", Artificial Intelligence 19, 1737, hereby incorporated by reference. Other alternatives include the TREAT algorithms, and LEAPS algorithm, as described by Miranker, D. P.: "TREAT: A New and Efficient Match Algorithm for AI Production Systems". ISBN 0934613710 Daniel P. Miranker, David A. Brant, Bernie Lofaso, David Gadbois: On the Performance of Lazy Matching in Production Systems. AAAI 1990: 685692, each of which are hereby incorporated by reference.

Figure 18:
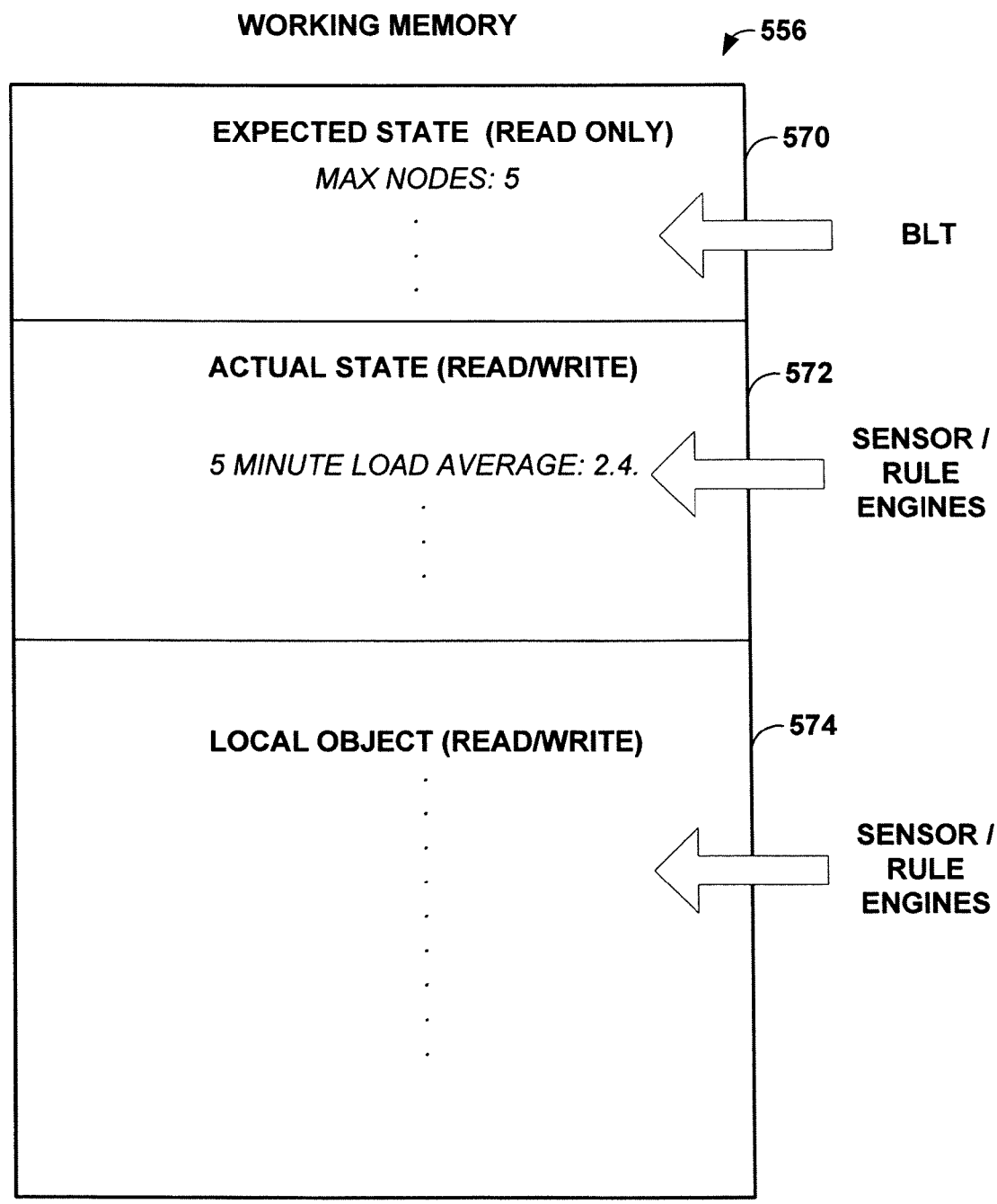
FIG. 18 is a block diagram of an example working memory associated with the SLA governor.

FIG. 18 is a block diagram of an example working memory 556 associated with SLA governor 430A as illustrated in FIG. 17. In this example, working memory 556 includes a first data region 570 that stores the data representing a service-level agreement. In this example working memory, data region 570 may only be modified in response to a trigger from sensor subsystem 420 or by execution engine 554 without notification from administrating interface module 112.

In addition, working memory 556 includes a second data region 572 that is modifiable (i.e., read/write) and may be updated by monitoring infrastructure 102 or used internally by execution engine 554. In general, data region 572 stores aggregated data representing the actual state of the fabric and can be updated by sensor subsystem 420 or by execution engine 554. The actual state may consist of a set of property annotations that can be attached to services defined in a service-level agreement, or to services locally defined within a rule engine, such as local object 574.

The functions described in this disclosure may be implemented in hardware, software, firmware, or any combination thereof. If implemented in software, the functions may be stored as one or more instructions or code on a computer-readable medium. Computer-readable media includes both computer storage media and communication media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where "disks" usually reproduce data magnetically, while "discs" reproduce data optically with lasers. Combinations of the above should also be included within the scope of computer-readable media.

Various embodiments of the invention have been described. These and other embodiments are within the scope of the following claims.

What is claimed is:

1. A system comprising:
a first set of resource governors, each of which implement a finite state machine, the first set of resource governors configured to cause an individual resource in a first set of resources to start providing or stop providing a flux service, the resources in the first set of resources configured to provide the flux service, the flux service being a top-level service that represents a defined set of functionalities, the first set of resources using interpretation services provided by a second set of resources, each of the interpretation services representing a defined set of functionalities;
a first service governor distinct from the first set of resource governors, the first service governor implementing a finite state machine that controls whether resource governors in the first set of resource governors initiate the processes that cause resources in the first set of resources to start providing or stop providing the flux service;
a service-level agreement governor that receives monitoring data that indicates a current service level of the flux service and causes the first service governor to enhance a service level of the flux service when the current service level of the flux service does not satisfy a service-level agreement, wherein the service-level agreement describes an expected level of service for the flux service; and
wherein the service-level agreement governor uses a set of rules to determine whether the current service level of the flux service satisfies the service-level agreement and causes the first service governor to enhance the service level of the flux service when the current service level of the flux service does not satisfy the service-level agreement.

2. The system of claim 1, wherein each rule in the set of rules conforms to a rule language and expresses a set of triggering conditions and a set of actions, such that when the triggering conditions are met, the actions are eligible to be performed.

3. The system of claim 1,
wherein the first set of resources comprises a first resource that is capable of providing the flux service;
wherein the first set of resource governors comprises a first resource governor that governs the first resource;
wherein the second set of resources comprises a second resource that is capable of providing a first interpretation service to the first resource;
wherein the control node further comprises a second resource governor that governs the second resource;
wherein the first resource governor is configured to provide a first event to the second resource governor that causes the second resource governor to cause the second resource to start providing the second service; and
wherein the second resource governor provides a second event to the first resource governor when the second resource has started providing the second service, the second event causing the first resource governor to cause the first resource to start providing the flux service.

4. The system of claim 1, wherein the control node further comprises a monitoring infrastructure that receives status data from resources in the first set of resources and the second set of resources and outputs the monitoring data to the service-level agreement governor, the status data representing an actual state of the first set of resources.

5. The system of claim 4, wherein the monitoring infrastructure comprises a plurality of collector modules, and wherein each of the collector modules is a pluggable software object that collects status data from one or more of the resources.

6. The system of claim 1, wherein the service-level agreement governor is configured to implement a finite state machine that determines whether the current service level of the flux service satisfies the service-level agreement and cause the first service governor to enhance the service level of the flux service when the current service level of the flux service does not satisfy the service-level agreement.

7. The system of claim 1, wherein the service-level agreement governor is configured to:
   determine whether the monitoring data indicates that the current service level of the flux service is greater than is required by the service-level agreement; and
   output an event that instructs the first service governor to reduce the current service level of the flux service in response to determining that the current service level of the flux service is greater than is required by the service-level agreement.

8. The system of claim 1, wherein the service-level agreement governor is configured to:
   determine that the current service level of the flux service does not satisfy the service-level agreement;
   provide an event to the first service governor in response to determining that the current service level of the flux service does not satisfy the service-level agreement, the event instructing the first service governor to enhance the current service level of the flux service.

9. The system of claim 8, wherein:
   the control node comprises a chain assembly module configured to dynamically assemble a resource chain, the resource chain comprising a plurality of resources that are ordered according to services provided by the plurality of resources, the plurality of resources comprising the first resource and one or more resources in the second set of resources; and
   in response to the event provided by the service-level agreement governor, the first service governor is configured to enhance the service level of the flux service by instructing the chain assembly module to assemble the resource chain when the finite state machine of the first service governor is in a first state.

10. The system of claim 9, wherein, in response to the event from the service-level agreement governor, the first service governor is configured not to instruct the chain assembly module to assemble the resource chain when the finite state machine of the first service governor is in a second state.

11. The system of claim 9, wherein the chain assembly module comprises:
   a service matching module configured to identify one or more service chains that include the flux service, wherein each service chain of the one or more service chains comprises a plurality of resources that are ordered according to services provided the plurality of resources;
   a resource chain identification module configured to identify one or more candidate resource chains for each of the identified service chains;
   a cost analysis module configured to select one of the candidate resource chains based on the assembly cost of the one or more candidate resource chains; and
   a resource reservation module configured to cause the selected candidate resource to chain to be assembled.

12. The system of claim 11, wherein:
   the first service governor is configured to update the status of each resource in the first set of resources; and
   the cost analysis module is configured to use a status of the first resource when determining the assembly cost associated with the one or more candidate resource chains that include the first resource.

13. The system of claim 12, wherein the first service governor is configured to update the status of the first resource in response to an event from the first resource governor.

14. The system of claim 9, wherein the first resource governor is configured to cause the first resource to start providing the first service chain when the assembly module assembles the resource chain.

15. The system of claim 1, wherein:
   the finite state machine of the first service governor is configured to transition from a first state to a second state in response to an event provided by a user to the service governor; and
   the first service governor is configured to instruct at least one resource governor in the first set of resource governors to cause at least one resource in the first set of resources to stop providing the flux service.

16. The system of claim 1, wherein the service-level agreement specifies an expected level of performance of the flux service.

17. The system of claim 1, wherein the second set of resources comprises:
   a first resource that is implemented as hardware; and
   a second resource that is implemented as software.

18. The system of claim 1, wherein the control node further comprises:
   a second set of resource governors, each of which implement a finite state machine that governs a process that causes an individual resource in the second set of resource governors to start providing or stop providing one of the interpretation services; and
   a set of service governors, wherein each service governor in the set of service governors implements a finite state machine that controls whether resource governors in the second set of resource governors cause resources in the second set of resources to start providing or stop providing the interpretation services.

19. The system of claim 1, wherein at least two different resources in the first set of resources work together to provide the flux service.

20. A method comprising:
   receiving status data from resources that provide services in a distributed computing system, wherein each of the services provides a defined set of functionalities;
   determining, using at least one processor, whether a current service level of a flux service provided by the distributed computer system satisfies a service-level agreement by comparing the status data to a set of rules;
   wherein the flux service is a top-level service;
   wherein the service-level agreement describes an expected level of service for the flux service;
   instructing, using the at least one processor, when a finite state machine of a first service governor is in a first state and when the current service level of the flux service does not satisfy the service-level agreement, a first resource governor distinct from the first service governor to cause a first resource in a first set of resources to start providing the flux service;
   wherein each resource in the first set of resources is capable of providing the flux service; and
   causing, using the at least one processor and a finite state machine of the first resource governor, the first resource in the first set of resources to start providing the flux service.

21. The method of claim 20, wherein each rule in the set of rules conforms to a rule language and expresses a set of triggering conditions and a set of actions, such that when the triggering conditions are met, the actions are eligible to be performed.

22. The method of claim 20, wherein causing the first resource in the first set of resources to start providing the flux service comprises:
providing, with the first resource governor, an event to a second resource governor that instructs the second resource governor to cause a second resource in the second set of resources to start providing an interpretation service to the first resource; and
causing, with a finite state machine of the second resource governor, the second resource to start providing the interpretation service.

23. The method of claim 20, wherein causing the first resource in the first set of resources to start providing the flux service comprises:
in response to the finite state machine of the first resource performing a state transition, communicating, with a first resource action module, instructions to the first resource to cause the first resource to start providing the flux service.

24. The method of claim 20, wherein receiving the status data further comprises receiving the status data using one or more of collector modules specified by a service definition object.

25. The method of claim 20, further comprising:
using the status data to determine whether the current service level of the flux service is greater than is required by the service-level agreement;
instructing, when the finite state machine of the first service governor is in the first state and when the current service level of a flux service is greater than is required by the service-level agreement, the first resource governor to cause the first resource to stop providing the flux service; and
causing, with the finite state machine of the first resource governor, the first resource to stop providing the flux service.

26. The method of claim 20, further comprising communicating an event to the first service governor that causes the first service governor to enhance the current service level of the flux service when the current service level of flux service does not satisfy the service-level agreement.

27. The method of claim 26, further comprising:
dynamically assembling, when the finite state machine of the first service governor is in the first state and the first service governor receives the event, a resource chain that includes the first resource and one or more additional resources;
wherein the one or more additional resources provide interpretation services;
wherein the resource chain comprises a plurality of resources that are ordered according to services provided by the plurality of resources; and
enhancing the current service level of the flux service by causing the resources in the resource chain to start operating.

28. The method of claim 27, further comprising generating an error message in response to the first service governor receiving the event when the finite state machine of the first service governor is in a second state different than the first state.

29. The method of claim 27, wherein dynamically assembling the resource chain comprises:
identifying one or more service chains that include the flux service;
identifying one or more candidate resource chains based on the identified service chains;
selecting one of the candidate resource chains based on the assembly cost of each of the candidate resource chains; and
assembling the selected candidate resource chain.

30. The method of claim 29, further comprising:
updating, with the first service governor, statuses of the resources in the first set of resources; and
wherein selecting one of the candidate resource chains comprises using a status of the first resource to determine the assembly costs of the candidate resource chains that include the first resource.

31. The method of claim 27, wherein causing resources in the resource chain to start operating comprises:
instructing, when a finite state machine of a second service governor is in a third state, a second resource governor to cause a second resource to start providing an interpretation service; and
causing, with the finite state machine of the second resource governor, the second resource to start providing the interpretation service.

32. The method of claim 20, further comprising:
receiving an event from a user;
transitioning, in response to the event from the user, from the first state of the finite state machine of the first service governor to a second state of the finite state machine of the first service governor;
instructing, with the first service governor when the finite state machine of the first service governor transitions from the first state to the second state, at least one resource governor in the first set of resource governors to cause at least one resource in the first set of resources to stop providing the flux service.

33. The method of claim 20, wherein the service-level agreement specifies an expected level of performance of the flux service.

34. At least one non-transitory, computer-readable medium comprising code that, when executed by at least one processor, is configured to:
receive status data from resources that provide services in a distributed computing system, wherein each of the services provides a defined set of functionalities;
determine whether a current service level of a flux service provided by the distributed computer system satisfies a service-level agreement by comparing the status data to a set of rules;
wherein the flux service is a top-level service;
wherein the service-level agreement describes an expected level of service for the flux service;
instruct, when a finite state machine of a first service governor is in a first state and when the current service level of the flux service does not satisfy the service-level agreement, a first resource governor distinct from the first service governor to cause a first resource in a first set of resources to start providing the flux service;
wherein each resource in the first set of resources is capable of providing the flux service; and
cause the first resource in the first set of resources to start providing the flux service.

35. The at least one computer-readable medium of claim 34, wherein each rule in the set of rules conforms to a rule language and expresses a set of triggering conditions and a set of actions, such that when the triggering conditions are met, the actions are eligible to be performed.

36. The at least one computer-readable medium of claim 34, wherein the code configured to cause the first resource in the first set of resources to start providing the flux service comprises code configured to:
provide an event to a second resource governor that instructs the second resource governor to cause a second resource in the second set of resources to start providing an interpretation service to the first resource; and
cause the second resource to start providing the interpretation service.

37. The at least one computer-readable medium of claim 34, wherein the code configured to cause the first resource in the first set of resources to start providing the flux service comprises code configured to:
in response to the finite state machine of the first resource performing a state transition, communicate instructions to the first resource to cause the first resource to start providing the flux service.

38. The at least one computer-readable medium of claim 34, wherein the code configured to receive the status data further comprises code configured to receive the status data using one or more of collector modules specified by a service definition object.

39. The at least one computer-readable medium of claim 34, wherein the code is further configured to:
use the status data to determine whether the current service level of the flux service is greater than is required by the service-level agreement;
instruct, when the finite state machine of the first service governor is in the first state and when the current service level of a flux service is greater than is required by the service-level agreement, the first resource governor to cause the first resource to stop providing the flux service; and
cause the first resource to stop providing the flux service.

40. The at least one computer-readable medium of claim 34, wherein the code is further configured to communicate an event to the first service governor that causes the first service governor to enhance the current service level of the flux service when the current service level of flux service does not satisfy the service-level agreement.

41. The at least one computer-readable medium of claim 40, wherein the code is further configured to:
dynamically assemble, when the finite state machine of the first service governor is in the first state and the first service governor receives the event, a resource chain that includes the first resource and one or more additional resources;
wherein the one or more additional resources provide interpretation services;
wherein the resource chain comprises a plurality of resources that are ordered according to services provided by the plurality of resources; and
enhance the current service level of the flux service by causing the resources in the resource chain to start operating.

42. The at least one computer-readable medium of claim 41, wherein the code is further configured to generate an error message in response to the first service governor receiving the event when the finite state machine of the first service governor is in a second state different than the first state.

43. The at least one computer-readable medium of claim 41, wherein the code configured to dynamically assemble the resource chain comprises the code configured to:
identify one or more service chains that include the flux service;
identify one or more candidate resource chains based on the identified service chains;
select one of the candidate resource chains based on the assembly cost of each of the candidate resource chains; and
assemble the selected candidate resource chain.

44. The at least one computer-readable medium of claim 43, wherein the code is further configured to:
update, with the first service governor, statuses of the resources in the first set of resources; and
wherein the code configured to select one of the candidate resource chains comprises code configured to use a status of the first resource to determine the assembly costs of the candidate resource chains that include the first resource.

45. The at least one computer-readable medium of claim 41, wherein the code configured to cause resources in the resource chain to start operating comprises code configured to:
instruct, when a finite state machine of a second service governor is in a third state, a second resource governor to cause a second resource to start providing an interpretation service; and
cause the second resource to start providing the interpretation service.

46. The at least one computer-readable medium of claim 34, wherein the code is further configured to:
receive an event from a user;
cause, in response to the event from the user, the finite state machine of the first service governor to transition from the first state to a second state;
instruct, when the finite state machine of the first service governor transitions from the first state to the second state, at least one resource governor in the first set of resource governors to cause at least one resource in the first set of resources to stop providing the flux service.

47. The at least one computer-readable medium of claim 34, wherein the service-level agreement specifies an expected level of performance of the flux service.

* * * * *